United States Patent
Martin et al.

(10) Patent No.: US 12,375,895 B2
(45) Date of Patent: *Jul. 29, 2025

(54) SYSTEMS AND METHODS FOR INTELLIGENTLY MANAGING MULTIMEDIA FOR EMERGENCY RESPONSE

(71) Applicant: RapidSOS, Inc., New York, NY (US)

(72) Inventors: Michael John Martin, Long Island City, NY (US); John Paul Lawrence, Brooklyn, NY (US); Nicholas Edward Horelik, Long Island City, NY (US); Zvika Ferentz, Rye Brook, NY (US); Ahmed Hassan, Brooklyn, NY (US)

(73) Assignee: RapidSOS, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/392,703

(22) Filed: Dec. 21, 2023

(65) Prior Publication Data

US 2024/0276193 A1 Aug. 15, 2024

Related U.S. Application Data

(63) Continuation of application No. 16/539,946, filed on Aug. 13, 2019, now Pat. No. 11,917,514.
(Continued)

(51) Int. Cl.
*H04W 4/90* (2018.01)
*G06F 3/0482* (2013.01)
(Continued)

(52) U.S. Cl.
CPC ............ *H04W 4/90* (2018.02); *G06F 3/0482* (2013.01); *G06F 16/9035* (2019.01);
(Continued)

(58) Field of Classification Search
CPC ....... H04W 4/90; H04W 4/022; H04W 4/025; H04W 76/50; G06F 3/0482;
(Continued)

(56) References Cited

U.S. PATENT DOCUMENTS 5,379,337 A   1/1995  Castillo
5,479,482 A  12/1995  Grimes
(Continued)

FOREIGN PATENT DOCUMENTS

CA   2662606 A1  10/2009
CA   2697986 A1   9/2010
(Continued)

OTHER PUBLICATIONS

U.S. Appl. No. 16/684,366 Office Action dated Jul. 1, 2022.
(Continued)

*Primary Examiner* — Marcus Hammonds
(74) *Attorney, Agent, or Firm* — Fitch, Even, Tabin & Flannery LLP

(57) ABSTRACT

Described herein are systems, devices, methods, and media for connecting a user for transmitting multimedia from electronic devices to emergency service providers. In some embodiments, a method for transmitting multimedia from an electronic device to an emergency service provider by an emergency management system includes the steps of: detecting an emergency alert indicative of an emergency; wherein each sensor within the set of pertinent sensors is determined to be associated with the emergency; obtaining a first set of multimedia contents from the set of pertinent sensors; determining, based on at least one of the set of pertinent sensors and the first set of multimedia contents, a set of relevant sensors from the set of pertinent sensors; and transmitting a second set of multimedia contents from the set of relevant sensors to an emergency service provider.

24 Claims, 24 Drawing Sheets

Related U.S. Application Data

(60) Provisional application No. 62/718,798, filed on Aug. 14, 2018.

(51) Int. Cl.
| | | |
|---|---|---|
| *G06F 16/9035* | (2019.01) | |
| *H04M 1/72421* | (2021.01) | |
| *H04M 1/72439* | (2021.01) | |
| *H04M 3/51* | (2006.01) | |
| *H04W 4/02* | (2018.01) | |
| *H04W 4/021* | (2018.01) | |
| *H04W 76/50* | (2018.01) | |

(52) U.S. Cl.
CPC ... *H04M 1/72421* (2021.01); *H04M 1/72439* (2021.01); *H04M 3/5116* (2013.01); *H04W 4/022* (2013.01); *H04W 4/025* (2013.01); *H04W 76/50* (2018.02)

(58) Field of Classification Search
CPC ............ G06F 16/9035; G06F 3/04817; H04M 1/72421; H04M 1/72439; H04M 3/5116; H04M 1/72424; H04M 1/7243; H04M 3/42348; H04M 7/0039
See application file for complete search history.

(56) References Cited

U.S. PATENT DOCUMENTS

| | | |
|---|---|---|
| 5,563,931 A | 10/1996 | Bishop |
| 5,596,625 A | 1/1997 | Leblanc |
| 5,710,803 A | 1/1998 | Kowal |
| 5,742,666 A | 4/1998 | Alpert |
| 6,014,555 A | 1/2000 | Tendler |
| 6,133,853 A | 10/2000 | Obradovich |
| 6,167,255 A | 12/2000 | Kennedy, III |
| 6,249,674 B1 | 6/2001 | Verdonk |
| 6,252,943 B1 | 6/2001 | Johnson |
| 6,256,489 B1 | 7/2001 | Lichter |
| 6,262,655 B1 | 7/2001 | Yoshioka |
| 6,292,687 B1 | 9/2001 | Lowell |
| 6,363,138 B1 | 3/2002 | Aprile |
| 6,459,782 B1 | 10/2002 | Bedrosian |
| 6,477,362 B1 | 11/2002 | Raith |
| 6,502,030 B2 | 12/2002 | Hilleary |
| 6,510,315 B1 | 1/2003 | Arnson |
| 6,556,816 B1 | 4/2003 | Gafrick |
| 6,571,092 B2 | 5/2003 | Faccin |
| 6,574,323 B1 | 6/2003 | Manuel |
| 6,587,545 B1 | 7/2003 | Antonucci |
| 6,594,666 B1 | 7/2003 | Biswas |
| 6,600,812 B1 | 7/2003 | Gentillin |
| 6,628,933 B1 | 9/2003 | Humes |
| 6,680,998 B1 | 1/2004 | Bell |
| 6,707,421 B1 | 3/2004 | Drury |
| 6,731,610 B2 | 5/2004 | Sajikawa |
| 6,993,118 B2 | 1/2006 | Antonucci |
| 7,031,663 B2 | 4/2006 | Heinonen |
| 7,054,611 B2 | 5/2006 | Eisner |
| 7,058,385 B2 | 6/2006 | Lauper |
| 7,177,400 B2 | 2/2007 | Eisner |
| 7,224,773 B2 | 5/2007 | Croak |
| 7,271,704 B2 | 9/2007 | Mcsheffrey |
| 7,277,705 B2 | 10/2007 | Casaccia |
| 7,313,402 B1 | 12/2007 | Rahman |
| 7,324,801 B2 | 1/2008 | Droste |
| 7,349,706 B2 | 3/2008 | Kim |
| 7,409,044 B2 | 8/2008 | Leduc |
| 7,409,428 B1 | 8/2008 | Brabec |
| 7,436,938 B2 | 10/2008 | Savaglio |
| 7,437,143 B1 | 10/2008 | Williams |
| 7,469,138 B2 | 12/2008 | Dayar |
| 7,483,519 B2 | 1/2009 | Binning |
| 7,519,351 B2 | 4/2009 | Malone, III |
| 7,519,372 B2 | 4/2009 | MacDonald |
| 7,548,158 B2 | 6/2009 | Titus |
| 7,565,131 B2 | 7/2009 | Rollender |
| 7,646,854 B2 | 1/2010 | Anderson |
| 7,676,215 B2 | 3/2010 | Chin |
| 7,684,782 B2 | 3/2010 | Ashley, Jr. |
| 7,848,733 B2 | 12/2010 | Bull |
| 7,937,067 B2 | 5/2011 | Maier |
| 7,949,326 B2 | 5/2011 | Gallagher |
| 8,009,810 B2 | 8/2011 | Seidberg |
| 8,027,658 B2 | 9/2011 | Suryanarayana |
| 8,041,335 B2 | 10/2011 | Khetawat |
| 8,041,341 B1 | 10/2011 | Malackowski |
| 8,045,954 B2 | 10/2011 | Barbeau |
| 8,068,881 B2 | 11/2011 | Schrager |
| 8,102,972 B2 | 1/2012 | Poremba |
| 8,126,424 B2 | 2/2012 | Piett |
| 8,150,367 B1 | 4/2012 | Malladi |
| 8,165,560 B2 | 4/2012 | Stenquist |
| 8,165,562 B2 | 4/2012 | Piett |
| 8,185,087 B2 | 5/2012 | Mitchell, Jr. |
| 8,195,121 B2 | 6/2012 | Dunn |
| 8,219,135 B2 | 7/2012 | De Amorim |
| 8,244,205 B2 | 8/2012 | Wu |
| 8,249,546 B1 | 8/2012 | Shah |
| 8,249,547 B1 | 8/2012 | Fellner |
| 8,289,953 B2 | 10/2012 | Ray |
| 8,306,501 B2 | 11/2012 | Moodbidri |
| 8,326,260 B1 | 12/2012 | Bradish |
| 8,369,488 B2 | 2/2013 | Sennett |
| 8,396,970 B2 | 3/2013 | Black |
| 8,401,565 B2 | 3/2013 | Sandberg |
| 8,417,090 B2 | 4/2013 | Fleming |
| 8,417,212 B2 | 4/2013 | Cepuran |
| 8,442,481 B2 | 5/2013 | Maier |
| 8,442,482 B2 | 5/2013 | Maier |
| 8,472,973 B2 | 6/2013 | Lin |
| 8,484,352 B2 | 7/2013 | Piett |
| 8,489,062 B2 | 7/2013 | Ray |
| 8,494,868 B2 | 7/2013 | Saalsaa |
| 8,509,729 B2 | 8/2013 | Shaw |
| 8,516,122 B2 | 8/2013 | Piett |
| 8,538,370 B2 | 9/2013 | Ray |
| 8,538,468 B2 | 9/2013 | Daly |
| 8,588,733 B2 | 11/2013 | Ferguson |
| 8,594,015 B2 | 11/2013 | Dunn |
| 8,606,218 B2 | 12/2013 | Ray |
| 8,625,578 B2 | 1/2014 | Roy |
| 8,626,112 B2 | 1/2014 | Ray |
| 8,630,609 B2 | 1/2014 | Ray |
| 8,644,301 B2 | 2/2014 | Tamhankar |
| 8,649,806 B2 | 2/2014 | Cuff |
| 8,682,279 B2 | 3/2014 | Rudolf |
| 8,682,281 B2 | 3/2014 | Dunn |
| 8,682,286 B2 | 3/2014 | Dickinson |
| 8,712,366 B2 | 4/2014 | Greene |
| 8,747,336 B2 | 6/2014 | Tran |
| 8,751,265 B2 | 6/2014 | Piett |
| 8,755,767 B2 | 6/2014 | Maier |
| 8,760,290 B2 | 6/2014 | Piett |
| 8,761,721 B2 | 6/2014 | Li |
| 8,792,867 B1 | 7/2014 | Negahban |
| 8,811,935 B2 | 8/2014 | Faccin |
| 8,825,687 B2 | 9/2014 | Marceau |
| 8,848,877 B2 | 9/2014 | Seidberg |
| 8,866,606 B1 | 10/2014 | Will |
| 8,868,028 B1 | 10/2014 | Kaltsukis |
| 8,880,021 B2 | 11/2014 | Hawkins |
| 8,890,685 B1 | 11/2014 | Sookman |
| 8,903,355 B2 | 12/2014 | Biage |
| 8,918,075 B2 | 12/2014 | Maier |
| 8,948,732 B1 | 2/2015 | Negahban |
| 8,971,839 B2 | 3/2015 | Hong |
| 8,983,424 B2 | 3/2015 | Binning |
| 8,984,143 B2 | 3/2015 | Serra |
| 9,008,078 B2 | 4/2015 | Kamdar |
| 9,014,657 B2 | 4/2015 | Rohde |
| 9,019,870 B2 | 4/2015 | Khan |
| 9,020,462 B2 | 4/2015 | Hodgson |

(56) References Cited

U.S. PATENT DOCUMENTS

| | | |
|---|---|---|
| 9,071,643 B2 | 6/2015 | Saito |
| 9,077,676 B2 | 7/2015 | Price |
| 9,078,092 B2 | 7/2015 | Piett |
| 9,094,816 B2 | 7/2015 | Maier |
| 9,129,219 B1 | 9/2015 | Robertson |
| 9,167,379 B1 | 10/2015 | Hamilton |
| 9,244,922 B2 | 1/2016 | Marceau |
| 9,258,680 B2 | 2/2016 | Drucker |
| 9,277,389 B2 | 3/2016 | Saito |
| 9,351,142 B2 | 5/2016 | Basore |
| 9,369,847 B2 | 6/2016 | Borghei |
| 9,384,491 B1 | 7/2016 | Briggs |
| 9,390,625 B2 | 7/2016 | Green |
| 9,402,159 B1 | 7/2016 | Self |
| 9,408,051 B2 | 8/2016 | Finney |
| 9,420,099 B1 | 8/2016 | Krishnan |
| 9,426,638 B1 | 8/2016 | Johnson |
| 9,497,585 B1 | 11/2016 | Cooley |
| 9,503,876 B2 | 11/2016 | Ghen |
| 9,544,260 B2 | 1/2017 | Cuff |
| 9,544,750 B1 | 1/2017 | Self |
| 9,591,467 B2 | 3/2017 | Piett |
| 9,609,128 B2 | 3/2017 | Dahan |
| 9,629,185 B1 | 4/2017 | Gluckman |
| 9,635,534 B2 | 4/2017 | Maier |
| 9,648,479 B2 | 5/2017 | Michaelis |
| 9,659,484 B1 | 5/2017 | Mehta |
| 9,693,213 B2 | 6/2017 | Self |
| 9,734,721 B2 | 8/2017 | Stenneth |
| 9,736,670 B2 | 8/2017 | Mehta |
| 9,756,169 B2 | 9/2017 | Mehta |
| 9,794,755 B1 | 10/2017 | South |
| 9,805,430 B2 | 10/2017 | Miasnik |
| 9,838,858 B2 | 12/2017 | Anand |
| 9,877,177 B2 | 1/2018 | Lesage |
| 9,924,043 B2 | 3/2018 | Mehta |
| 9,942,739 B2 | 4/2018 | Bozik |
| 9,986,404 B2 | 5/2018 | Mehta |
| 9,992,655 B2 | 6/2018 | Anand |
| 9,994,218 B2 | 6/2018 | Pal |
| 9,998,507 B2 | 6/2018 | Mehta |
| 10,002,375 B1 | 6/2018 | Scythes |
| 10,089,854 B2 | 10/2018 | Hender |
| 10,136,294 B2 | 11/2018 | Mehta |
| 10,140,482 B2 | 11/2018 | White |
| 10,140,842 B2 | 11/2018 | Mehta |
| 10,142,213 B1 | 11/2018 | Hart |
| 10,142,469 B2 | 11/2018 | Klaban |
| 10,142,816 B2 | 11/2018 | Cavendish |
| 10,149,116 B1 | 12/2018 | Kerr |
| 10,165,431 B2 | 12/2018 | Bozik |
| 10,375,558 B2 | 8/2019 | Katz |
| 10,419,915 B2 | 9/2019 | Mehta |
| 10,524,106 B1 * | 12/2019 | Skertich ............ H04M 3/42221 |
| 10,708,412 B1 | 7/2020 | Killpack |
| 10,795,870 B1 | 10/2020 | Kulkarni |
| 10,922,776 B2 | 2/2021 | Kumar |
| 10,977,927 B2 | 4/2021 | Katz |
| 11,197,145 B2 | 12/2021 | Martin |
| 11,330,664 B1 | 5/2022 | Martin |
| 11,496,874 B2 | 11/2022 | Katz |
| 11,917,514 B2 | 2/2024 | Martin |
| 2001/0036224 A1 | 11/2001 | Demello |
| 2001/0051849 A1 | 12/2001 | Boone |
| 2002/0001367 A1 | 1/2002 | Lee |
| 2002/0027975 A1 | 3/2002 | Oxley |
| 2002/0057678 A1 | 5/2002 | Jiang |
| 2002/0103622 A1 | 8/2002 | Burge |
| 2002/0120698 A1 | 8/2002 | Tamargo |
| 2003/0069035 A1 | 4/2003 | Shurvinton |
| 2003/0109245 A1 | 6/2003 | Mccalmont |
| 2003/0195775 A1 | 10/2003 | Hampton |
| 2004/0166828 A1 | 8/2004 | Yosioka |
| 2004/0203572 A1 | 10/2004 | Aerrabotu |
| 2004/0229620 A1 | 11/2004 | Zhao |
| 2004/0266390 A1 | 12/2004 | Faucher |
| 2005/0002516 A1 | 1/2005 | Shtivelman |
| 2005/0085215 A1 | 4/2005 | Kokko |
| 2005/0104745 A1 | 5/2005 | Bachelder |
| 2005/0111630 A1 | 5/2005 | Potorny |
| 2005/0151642 A1 | 7/2005 | Tupler |
| 2005/0176403 A1 | 8/2005 | Lalos |
| 2005/0190053 A1 | 9/2005 | Dione |
| 2005/0190892 A1 | 9/2005 | Dawson |
| 2005/0192746 A1 | 9/2005 | King |
| 2005/0220277 A1 | 10/2005 | Blalock |
| 2005/0222829 A1 | 10/2005 | Dumas |
| 2005/0239477 A1 | 10/2005 | Kim |
| 2005/0242944 A1 | 11/2005 | Bankert |
| 2005/0282518 A1 | 12/2005 | D Evelyn |
| 2005/0285181 A1 | 12/2005 | Yasui |
| 2006/0077053 A1 | 4/2006 | Park |
| 2006/0085275 A1 | 4/2006 | Stokes |
| 2006/0109960 A1 | 5/2006 | D Evelyn |
| 2006/0154642 A1 | 7/2006 | Scannell, Jr. |
| 2006/0217105 A1 | 9/2006 | Kumar P S |
| 2006/0234726 A1 | 10/2006 | Ashley, Jr. |
| 2006/0293024 A1 | 12/2006 | Benco |
| 2007/0003024 A1 | 1/2007 | Olivier |
| 2007/0030144 A1 | 2/2007 | Titus |
| 2007/0030146 A1 | 2/2007 | Shepherd |
| 2007/0033095 A1 | 2/2007 | Hodgin |
| 2007/0049287 A1 | 3/2007 | Dunn |
| 2007/0053308 A1 | 3/2007 | Dumas |
| 2007/0058528 A1 | 3/2007 | Massa |
| 2007/0060097 A1 | 3/2007 | Edge |
| 2007/0161383 A1 | 7/2007 | Caci |
| 2007/0164872 A1 | 7/2007 | Monroe |
| 2007/0171854 A1 | 7/2007 | Chen |
| 2007/0218895 A1 | 9/2007 | Saito |
| 2008/0019268 A1 | 1/2008 | Rollins |
| 2008/0063153 A1 | 3/2008 | Krivorot |
| 2008/0077474 A1 | 3/2008 | Dumas |
| 2008/0081646 A1 | 4/2008 | Morin |
| 2008/0175356 A1 | 7/2008 | Seidberg |
| 2008/0188198 A1 | 8/2008 | Patel |
| 2008/0194238 A1 | 8/2008 | Kwon |
| 2008/0253535 A1 | 10/2008 | Sherry |
| 2008/0274721 A1 | 11/2008 | Stagnetto |
| 2008/0294058 A1 | 11/2008 | Shklarski |
| 2008/0309486 A1 | 12/2008 | Mckenna |
| 2009/0018875 A1 | 1/2009 | Monatesti |
| 2009/0041206 A1 | 2/2009 | Hobby |
| 2009/0077045 A1 | 3/2009 | Kirchmeier |
| 2009/0094602 A1 | 4/2009 | Ziskind |
| 2009/0134982 A1 | 5/2009 | Robertson |
| 2009/0186596 A1 | 7/2009 | Kaltsukis |
| 2009/0214000 A1 | 8/2009 | Patel |
| 2009/0233573 A1 | 9/2009 | Gray |
| 2009/0257345 A1 | 10/2009 | King |
| 2009/0258913 A1 | 10/2009 | Waddell |
| 2009/0280771 A1 | 11/2009 | Bolin |
| 2009/0284348 A1 | 11/2009 | Pfeffer |
| 2009/0311987 A1 | 12/2009 | Edge |
| 2009/0322513 A1 | 12/2009 | Hwang |
| 2010/0002846 A1 | 1/2010 | Ray |
| 2010/0003954 A1 | 1/2010 | Greene |
| 2010/0003964 A1 | 1/2010 | Khare |
| 2010/0093305 A1 | 4/2010 | Reich |
| 2010/0156626 A1 | 6/2010 | Story |
| 2010/0159871 A1 | 6/2010 | Tester |
| 2010/0159976 A1 | 6/2010 | Marocchi |
| 2010/0161727 A1 | 6/2010 | Shaffer |
| 2010/0166153 A1 | 7/2010 | Guleria |
| 2010/0190468 A1 | 7/2010 | Scott |
| 2010/0202368 A1 | 8/2010 | Hans |
| 2010/0238018 A1 | 9/2010 | Kelly |
| 2010/0261448 A1 | 10/2010 | Peters |
| 2010/0262668 A1 | 10/2010 | Piett |
| 2010/0291907 A1 | 11/2010 | Macnaughtan |
| 2010/0293106 A1 | 11/2010 | Rhoads |
| 2010/0317317 A1 | 12/2010 | Maier |
| 2011/0009086 A1 | 1/2011 | Poremba |
| 2011/0029600 A1 | 2/2011 | Theimer |

(56) References Cited

U.S. PATENT DOCUMENTS

| | | |
|---|---|---|
| 2011/0044444 A1 | 2/2011 | Abramson |
| 2011/0051658 A1 | 3/2011 | Jin |
| 2011/0071880 A1 | 3/2011 | Spector |
| 2011/0086607 A1 | 4/2011 | Wang |
| 2011/0103266 A1 | 5/2011 | Andreasen |
| 2011/0111728 A1 | 5/2011 | Ferguson |
| 2011/0134897 A1 | 6/2011 | Montemurro |
| 2011/0151829 A1 | 6/2011 | Velusamy |
| 2011/0153368 A1 | 6/2011 | Pierre |
| 2011/0201357 A1 | 8/2011 | Garrett |
| 2011/0263219 A1 | 10/2011 | Hasenfang |
| 2011/0263319 A1 | 10/2011 | Haemaelaeinen |
| 2011/0281547 A1 | 11/2011 | Cordero |
| 2012/0002792 A1 | 1/2012 | Chang |
| 2012/0028599 A1 | 2/2012 | Hatton |
| 2012/0029970 A1 | 2/2012 | Stiles |
| 2012/0040636 A1 | 2/2012 | Kazmi |
| 2012/0066139 A1 | 3/2012 | Guzman |
| 2012/0092161 A1 | 4/2012 | West |
| 2012/0144019 A1 | 6/2012 | Zhu |
| 2012/0146809 A1 | 6/2012 | Oh |
| 2012/0157795 A1 | 6/2012 | Chiu |
| 2012/0202428 A1 | 8/2012 | Mirbaha |
| 2012/0210325 A1 | 8/2012 | De Lind Van Wijngaarden |
| 2012/0218102 A1 | 8/2012 | Bivens |
| 2012/0256745 A1 | 10/2012 | Piett |
| 2012/0257729 A1 | 10/2012 | Piett |
| 2012/0258680 A1 | 10/2012 | Piett |
| 2012/0289243 A1 | 11/2012 | Tarlow |
| 2012/0295575 A1 | 11/2012 | Nam |
| 2012/0295576 A1 | 11/2012 | Peterson |
| 2012/0309341 A1 | 12/2012 | Ward |
| 2012/0320912 A1 | 12/2012 | Estrada |
| 2013/0005295 A1 | 1/2013 | Park |
| 2013/0012155 A1 | 1/2013 | Forstall |
| 2013/0030825 A1 | 1/2013 | Bagwandeen |
| 2013/0036175 A1 | 2/2013 | Lau |
| 2013/0052983 A1 | 2/2013 | Fletcher |
| 2013/0065569 A1 | 3/2013 | Leipzig |
| 2013/0082837 A1 | 4/2013 | Cosentino |
| 2013/0084824 A1 | 4/2013 | Hursey |
| 2013/0100268 A1 | 4/2013 | Mihailidis |
| 2013/0102351 A1 | 4/2013 | Mo |
| 2013/0120106 A1 | 5/2013 | Cauwels |
| 2013/0120459 A1 | 5/2013 | Dickinson |
| 2013/0122932 A1 | 5/2013 | Patel |
| 2013/0138791 A1 | 5/2013 | Thomas |
| 2013/0143530 A1 | 6/2013 | Ehrlich |
| 2013/0183924 A1 | 7/2013 | Saigh |
| 2013/0185368 A1 | 7/2013 | Nordstrom |
| 2013/0203373 A1 | 8/2013 | Edge |
| 2013/0203376 A1 | 8/2013 | Maier |
| 2013/0222133 A1 | 8/2013 | Schultz |
| 2013/0226369 A1 | 8/2013 | Yorio |
| 2013/0237175 A1 | 9/2013 | Piett |
| 2013/0237181 A1 | 9/2013 | Ray |
| 2013/0260710 A1 | 10/2013 | H R |
| 2013/0309994 A1 | 11/2013 | Karl |
| 2013/0331055 A1 | 12/2013 | Mckown |
| 2013/0331058 A1 | 12/2013 | Harvey |
| 2014/0031000 A1 | 1/2014 | Hanover |
| 2014/0045450 A1 | 2/2014 | Ballantyne |
| 2014/0051379 A1 | 2/2014 | Ganesh |
| 2014/0057590 A1* | 2/2014 | Romero ............... G08B 25/08 455/404.2 |
| 2014/0059060 A1 | 2/2014 | Yang |
| 2014/0086108 A1 | 3/2014 | Dunn |
| 2014/0086145 A1 | 3/2014 | Ramkumar |
| 2014/0087680 A1 | 3/2014 | Luukkala |
| 2014/0087780 A1* | 3/2014 | Abhyanker ............ G06Q 30/02 455/521 |
| 2014/0096195 A1 | 4/2014 | Morgan |
| 2014/0113606 A1 | 4/2014 | Morken |
| 2014/0126356 A1 | 5/2014 | Lee |
| 2014/0134969 A1 | 5/2014 | Jin |
| 2014/0142979 A1 | 5/2014 | Mitsunaga |
| 2014/0148117 A1 | 5/2014 | Basore |
| 2014/0148120 A1 | 5/2014 | Buck |
| 2014/0155017 A1 | 6/2014 | Fan |
| 2014/0155018 A1 | 6/2014 | Fan |
| 2014/0164505 A1 | 6/2014 | Daly |
| 2014/0199959 A1 | 7/2014 | Hassan |
| 2014/0213212 A1 | 7/2014 | Clawson |
| 2014/0218537 A1 | 8/2014 | Nepo |
| 2014/0222462 A1 | 8/2014 | Shakil |
| 2014/0248848 A1 | 9/2014 | Mufti |
| 2014/0253326 A1 | 9/2014 | Cho |
| 2014/0257846 A1 | 9/2014 | Hermiz |
| 2014/0302810 A1 | 10/2014 | Inha |
| 2014/0324351 A1 | 10/2014 | Dannevik |
| 2014/0359008 A1 | 12/2014 | Finney |
| 2014/0368601 A1* | 12/2014 | deCharms ............... H04N 7/148 348/14.02 |
| 2014/0370836 A1 | 12/2014 | Gladstone |
| 2014/0370839 A1 | 12/2014 | Hatton |
| 2014/0370841 A1 | 12/2014 | Roberts |
| 2015/0011176 A1 | 1/2015 | Zhu |
| 2015/0029836 A1 | 1/2015 | Hans |
| 2015/0031324 A1 | 1/2015 | Zentner |
| 2015/0038102 A1 | 2/2015 | Yoakum |
| 2015/0038109 A1 | 2/2015 | Salahshour |
| 2015/0054639 A1 | 2/2015 | Rosen |
| 2015/0055453 A1 | 2/2015 | Chaki |
| 2015/0055554 A1 | 2/2015 | Sedlacek |
| 2015/0065082 A1 | 3/2015 | Sehgal |
| 2015/0080021 A1 | 3/2015 | Bietz |
| 2015/0081209 A1 | 3/2015 | Yeh |
| 2015/0081927 A1 | 3/2015 | Xu |
| 2015/0085997 A1 | 3/2015 | Biage |
| 2015/0087259 A1 | 3/2015 | Hinsen |
| 2015/0094095 A1 | 4/2015 | Johnson |
| 2015/0099481 A1 | 4/2015 | Maitre |
| 2015/0109125 A1 | 4/2015 | Kaib |
| 2015/0111524 A1 | 4/2015 | South |
| 2015/0112883 A1 | 4/2015 | Orduna |
| 2015/0137972 A1 | 5/2015 | Nepo |
| 2015/0140936 A1 | 5/2015 | Sachs |
| 2015/0147995 A1 | 5/2015 | Bontu |
| 2015/0172897 A1 | 6/2015 | Mariathasan |
| 2015/0201316 A1 | 7/2015 | Khatibi |
| 2015/0289121 A1 | 10/2015 | Lesage |
| 2015/0289122 A1 | 10/2015 | Friesen |
| 2015/0296351 A1 | 10/2015 | Tham |
| 2015/0304827 A1 | 10/2015 | Price |
| 2015/0317809 A1 | 11/2015 | Chellappan |
| 2015/0319284 A1 | 11/2015 | Leonessi |
| 2015/0350262 A1 | 12/2015 | Rainisto |
| 2015/0350836 A1 | 12/2015 | Smith |
| 2015/0358794 A1 | 12/2015 | Nokhoudian |
| 2015/0365319 A1 | 12/2015 | Finn |
| 2016/0004224 A1 | 1/2016 | Pi |
| 2016/0012702 A1 | 1/2016 | Hart |
| 2016/0026768 A1 | 1/2016 | Singh |
| 2016/0057595 A1 | 2/2016 | Ahmed |
| 2016/0065748 A1 | 3/2016 | Li |
| 2016/0088455 A1 | 3/2016 | Bozik |
| 2016/0110991 A1 | 4/2016 | Hunter |
| 2016/0173689 A1 | 6/2016 | Klaban |
| 2016/0210581 A1 | 7/2016 | Braun |
| 2016/0219084 A1 | 7/2016 | Abiezzi |
| 2016/0219397 A1 | 7/2016 | Mayor |
| 2016/0227589 A1 | 8/2016 | Marshall |
| 2016/0269535 A1 | 9/2016 | Balabhadruni |
| 2016/0307436 A1 | 10/2016 | Nixon |
| 2016/0315923 A1 | 10/2016 | Riscombe-Burton |
| 2016/0316493 A1 | 10/2016 | Davis |
| 2016/0330769 A1 | 11/2016 | Edge |
| 2016/0337831 A1 | 11/2016 | Piett |
| 2016/0345171 A1 | 11/2016 | Kulkarni |
| 2016/0353266 A1 | 12/2016 | Winkler |
| 2016/0363931 A1 | 12/2016 | Yang |
| 2016/0371973 A1 | 12/2016 | Holleczek |
| 2017/0004427 A1 | 1/2017 | Bruchal |
| 2017/0005914 A1 | 1/2017 | Edge |

(56) References Cited

U.S. PATENT DOCUMENTS

| | | |
|---|---|---|
| 2017/0012815 A1 | 1/2017 | Nekrestyanov |
| 2017/0046216 A1 | 2/2017 | Stenneth |
| 2017/0078226 A1 | 3/2017 | Daly |
| 2017/0093594 A1 | 3/2017 | Peak |
| 2017/0099579 A1 | 4/2017 | Ryan |
| 2017/0108862 A1 | 4/2017 | Mikkelsen |
| 2017/0116845 A1 | 4/2017 | See |
| 2017/0124670 A1 | 5/2017 | Becker |
| 2017/0124852 A1 | 5/2017 | Pauws |
| 2017/0140637 A1 | 5/2017 | Thurlow |
| 2017/0142568 A1 | 5/2017 | Saito |
| 2017/0142570 A1 | 5/2017 | Self |
| 2017/0150335 A1 | 5/2017 | Self |
| 2017/0161614 A1 | 6/2017 | Mehta |
| 2017/0180963 A1 | 6/2017 | Cavendish |
| 2017/0180966 A1 | 6/2017 | Piett |
| 2017/0188218 A1 | 6/2017 | Corley |
| 2017/0208543 A1 | 7/2017 | Zhang |
| 2017/0213251 A1 | 7/2017 | Nunally |
| 2017/0238129 A1 | 8/2017 | Maier |
| 2017/0238136 A1 | 8/2017 | Smith |
| 2017/0245113 A1 | 8/2017 | Hooker |
| 2017/0287085 A1 | 10/2017 | Smith |
| 2017/0310827 A1 | 10/2017 | Mehta |
| 2017/0316698 A1 | 11/2017 | Stenneth |
| 2017/0323209 A1 | 11/2017 | Rinzler |
| 2017/0325056 A1 | 11/2017 | Mehta |
| 2017/0331954 A1 | 11/2017 | Kotnis |
| 2017/0359712 A1 | 12/2017 | Meredith |
| 2017/0374538 A1 | 12/2017 | Gellens |
| 2018/0020091 A1 | 1/2018 | Self |
| 2018/0020329 A1 | 1/2018 | Smith |
| 2018/0053394 A1 | 2/2018 | Gersten |
| 2018/0053401 A1 | 2/2018 | Martin |
| 2018/0077282 A1 | 3/2018 | Herron |
| 2018/0077553 A1 | 3/2018 | Gideon, III |
| 2018/0089718 A1 | 3/2018 | Raisi |
| 2018/0150928 A1 | 5/2018 | Dejewski |
| 2018/0152563 A1 | 5/2018 | Mehta |
| 2018/0176271 A1 | 6/2018 | Laurent |
| 2018/0242133 A1 | 8/2018 | Anand |
| 2018/0262544 A1 | 9/2018 | Mehta |
| 2018/0310159 A1 | 10/2018 | Katz |
| 2018/0352408 A1 | 12/2018 | Baer |
| 2019/0020993 A1 | 1/2019 | Nguyen |
| 2019/0073894 A1 | 3/2019 | Mehta |
| 2019/0104395 A1 | 4/2019 | Mehta |
| 2019/0130719 A1 | 5/2019 | D'Amico |
| 2019/0149661 A1 | 5/2019 | Klaban |
| 2019/0166244 A1 | 5/2019 | Ravichandran |
| 2019/0166480 A1 | 5/2019 | Rauner |
| 2019/0172335 A1 | 6/2019 | Johnston-Mitchell |
| 2019/0174288 A1 | 6/2019 | Bozik |
| 2019/0174289 A1 | 6/2019 | Martin |
| 2019/0205120 A1 | 7/2019 | Sheedy |
| 2019/0230476 A1 | 7/2019 | Qi |
| 2019/0246260 A1 | 8/2019 | Edge |
| 2019/0253861 A1 | 8/2019 | Horelik |
| 2019/0261145 A1 | 8/2019 | South |
| 2019/0281165 A1 | 9/2019 | Mehta |
| 2019/0306664 A1 | 10/2019 | Mehta |
| 2019/0320310 A1 | 10/2019 | Horelik |
| 2019/0324825 A1 | 10/2019 | Schwartz |
| 2019/0327597 A1 | 10/2019 | Katz |
| 2019/0335310 A1 | 10/2019 | Anand |
| 2019/0342526 A1* | 11/2019 | Drako ............ H04N 7/181 |
| 2019/0380020 A1 | 12/2019 | Pellegrini |
| 2020/0015058 A1 | 1/2020 | Wu |
| 2020/0059776 A1 | 2/2020 | Martin |
| 2020/0068374 A1 | 2/2020 | Mehta |
| 2020/0100084 A1 | 3/2020 | Martin |
| 2020/0126174 A1 | 4/2020 | Halse |
| 2020/0135005 A1 | 4/2020 | Katz |
| 2020/0242138 A1 | 7/2020 | Russ |
| 2020/0258374 A1 | 8/2020 | Mehta |
| 2020/0344602 A1 | 10/2020 | Li |
| 2021/0006961 A1 | 1/2021 | King-Berkman |
| 2021/0014659 A1 | 1/2021 | Mehta |
| 2021/0037368 A1 | 2/2021 | Pellegrini |
| 2021/0110686 A1 | 4/2021 | Slavin |
| 2021/0127228 A1 | 4/2021 | Baarman |
| 2021/0266722 A1 | 8/2021 | Pellegrini |
| 2021/0289334 A1 | 9/2021 | Martin |
| 2021/0390844 A1 | 12/2021 | Katz |
| 2022/0014895 A1 | 1/2022 | Horelik |
| 2022/0030109 A1 | 1/2022 | Leavitt |
| 2022/0103995 A1 | 3/2022 | Horelik |
| 2022/0131637 A1 | 4/2022 | Sangal |
| 2022/0172599 A1 | 6/2022 | Mehta |
| 2022/0174468 A1 | 6/2022 | Anand |
| 2022/0201458 A1 | 6/2022 | Pellegrini |
| 2022/0264274 A1 | 8/2022 | Bozik |
| 2022/0303380 A1 | 9/2022 | Martin |
| 2022/0322061 A1 | 10/2022 | King-Berkman |
| 2022/0353662 A1 | 11/2022 | Martin |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2947936 A1 | 11/2014 |
| CA | 2646607 C | 9/2016 |
| CA | 2886535 A1 | 10/2016 |
| CA | 2697986 C | 5/2018 |
| CN | 104487976 A | 4/2015 |
| CN | 104539776 A | 4/2015 |
| CN | 205220594 U | 5/2016 |
| CN | 106021508 A | 10/2016 |
| EP | 2161912 A2 | 3/2010 |
| JP | H10314133 A | 12/1998 |
| JP | H1170086 A | 3/1999 |
| JP | 2003272070 A | 9/2003 |
| JP | 2006319946 A | 11/2006 |
| JP | 2006334369 A | 12/2006 |
| JP | 4107777 B2 | 6/2008 |
| JP | 2011223285 A | 11/2011 |
| JP | 2012222443 A | 11/2012 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20140093568 A | 7/2014 |
| KR | 20150097031 A | 8/2015 |
| KR | 101602482 B1 | 3/2016 |
| KR | 101612423 B1 | 4/2016 |
| KR | 20160097933 A | 8/2016 |
| KR | 20170100422 A | 9/2017 |
| WO | 9723104 A1 | 6/1997 |
| WO | 0022593 A1 | 4/2000 |
| WO | 0165763 A2 | 9/2001 |
| WO | 0167419 A2 | 9/2001 |
| WO | 2007109599 A2 | 9/2007 |
| WO | 2011060335 A1 | 5/2011 |
| WO | 2012129561 A1 | 9/2012 |
| WO | 2014025563 A1 | 2/2014 |
| WO | 2014063121 A1 | 4/2014 |
| WO | 2014074420 A1 | 5/2014 |
| WO | 2014087157 A1 | 6/2014 |
| WO | 2014176646 A1 | 11/2014 |
| WO | 2015127867 A1 | 9/2015 |
| WO | 2015196155 A1 | 12/2015 |
| WO | 2016044540 A1 | 3/2016 |
| WO | 2016093553 A1 | 6/2016 |
| WO | 2017079354 A1 | 5/2017 |
| WO | 2017083571 A1 | 5/2017 |
| WO | 2017100220 A1 | 6/2017 |
| WO | 2017106775 A1 | 6/2017 |
| WO | 2017112820 A1 | 6/2017 |
| WO | 2017189610 A2 | 11/2017 |
| WO | 2017196753 A1 | 11/2017 |
| WO | 2018039142 A1 | 3/2018 |

(56) References Cited

FOREIGN PATENT DOCUMENTS

| | | | |
|---|---|---|---|
| WO | 2019113129 A1 | 6/2019 |
| WO | 2020172612 A1 | 8/2020 |
| WO | 2020205033 A1 | 10/2020 |
| WO | 2021034859 A1 | 2/2021 |
| WO | 2021203037 A1 | 10/2021 |

OTHER PUBLICATIONS

U.S. Appl. No. 17/065,337 Office Action dated Aug. 12, 2022.
U.S. Appl. No. 17/143,819 Office Action dated May 26, 2022.
U.S. Appl. No. 17/196,438 Office Action dated Dec. 29, 2022.
U.S. Appl. No. 17/378,045 Office Action dated Jul. 20, 2022.
U.S. Appl. No. 17/448,610 Office Action dated Oct. 5, 2022.
U.S. Appl. No. 17/448,817 Office Action dated Dec. 7, 2022.
U.S. Appl. No. 17/468,392 Office Action dated Nov. 2, 2022.
U.S. Appl. No. 17/479,471 Ex Parte Quayle dated Oct. 14, 2022.
U.S. Appl. No. 17/545,244 Office Action dated Apr. 1, 2022.
U.S. Appl. No. 17/671,493 Office Action dated May 10, 2022.
U.S. Appl. No. 17/671,510 Office Action dated Aug. 4, 2022.
U.S. Appl. No. 17/856,796 Office Action dated Sep. 13, 2022.
U.S. Appl. No. 17/932,993 Office Action dated Jan. 5, 2023.
Botega et al. Saw-Oriented User Interfaces For Emergency Dispatch Systems. Computer Vision—Eccv 2020 : 16th European Conference, Glasgow, Uk, Aug. 23-28, 2020 : Proceedings; Part Of The Lecture Notes In Computer Science (Jul. 21, 2015).
U.S. Appl. No. 15/976,600 Office Action dated Jan. 28, 2022.
U.S. Appl. No. 15/976,600 Office Action dated May 13, 2021.
U.S. Appl. No. 16/162,171 Office Action dated Apr. 8, 2021.
U.S. Appl. No. 16/378,363 Office Action dated Sep. 17, 2021.
U.S. Appl. No. 16/384,600 Office Action dated Jun. 9, 2021.
U.S. Appl. No. 16/421,355 Office Action dated Jan. 7, 2022.
U.S. Appl. No. 16/421,355 Office Action dated May 12, 2021.
U.S. Appl. No. 16/537,377 Office Action dated Apr. 16, 2021.
U.S. Appl. No. 16/537,377 Office Action dated Dec. 27, 2021.
U.S. Appl. No. 16/684,366 Office Action dated Oct. 5, 2021.
U.S. Appl. No. 16/798,049 Office Action dated Mar. 8, 2021.
U.S. Appl. No. 16/865,170 Office Action dated Feb. 24, 2022.
U.S. Appl. No. 16/865,170 Office Action dated Jul. 9, 2021.
U.S. Appl. No. 16/936,856 Office Action dated Aug. 16, 2021.
U.S. Appl. No. 16/940,043 Office Action dated Oct. 18, 2021.
U.S. Appl. No. 17/065,337 Office Action dated Nov. 8, 2021.
U.S. Appl. No. 17/115,098 Office Action dated Mar. 9, 2021.
U.S. Appl. No. 17/143,819 Office Action dated Dec. 6, 2021.
U.S. Appl. No. 17/196,438 Office Action dated May 10, 2022.
U.S. Appl. No. 17/221,568 Office Action dated May 2, 2022.
U.S. Appl. No. 17/332,863 Office Action dated Sep. 9, 2021.
U.S. Appl. No. 17/671,510 Office Action dated Apr. 22, 2022.
U.S. Appl. No. 16/378,363 Office Action dated Feb. 17, 2021.
U.S. Appl. No. 16/684,366 Office Action dated Dec. 23, 2020.
PCT/US2020/046857 International Search Report and Written Opinion dated Nov. 18, 2020.
U.S. Appl. No. 16/823,192 Office Action dated Dec. 4. 2020.
U.S. Appl. No. 16/834,914 Office Action dated Dec. 2, 2020.
PCT/US2020/019341 International Search Report and Written Opinion dated Jun. 29, 2020.
U.S. Appl. No. 15/976,600 Office Action dated Aug. 3, 2020.
U.S. Appl. No. 16/162,171 Office Action dated Sep. 24, 2020.
U.S. Appl. No. 16/384,600 Office Action dated Oct. 2, 2020.
U.S. Appl. No. 16/421,355 Office Action dated Oct. 19, 2020.
U.S. Appl. No. 16/509,296 Office Action dated Sep. 3, 2020.
U.S. Appl. No. 16/740,207 Office Action dated Aug. 17, 2020.
U.S. Appl. No. 16/798,049 Office Action dated Jul. 17, 2020.
Co-pending U.S. Appl. No. 16/740,207, filed Jan. 10, 2020.
Co-pending U.S. Appl. No. 16/798,049, filed Feb. 21, 2020.
Co-pending U.S. Appl. No. 16/823,192, filed Mar. 18, 2020.
Co-pending U.S. Appl. No. 16/834,914, filed Mar. 30, 2020.
PCT/US2020/013176 International Search Report and Written Opinion dated May 8, 2020.
Song. Next Generation Emergency Call System with Enhanced Indoor Positioning, Columbia University. Thesis [online] [retrieved Apr. 20, 2020 from < url:https://scholar.google.co.kr/citations/?user=h_4uUqAAAAAJ&hl=ko > (156 pgs) (2014).
U.S. Appl. No. 15/976,600 Office Action dated Jan. 30, 2020.
U.S. Appl. No. 16/162,171 Office Action dated Apr. 9, 2020.
U.S. Appl. No. 16/162,171 Office Action dated Nov. 4, 2019.
U.S. Appl. No. 16/271,634 Office Action dated Dec. 16, 2019.
U.S. Appl. No. 16/384,600 Office Action dated Apr. 2, 2020.
U.S. Appl. No. 16/421,355 Office Action dated Feb. 4, 2020.
U.S. Appl. No. 16/436,810 Office Action dated Dec. 17, 2019.
U.S. Appl. No. 16/526,195 Office Action dated Dec. 27, 2019.
U.S. Appl. No. 16/740,207 Office Action dated Mar. 11, 2020.
U.S. Appl. No. 16/378,363 Office Action dated Jan. 14, 2020.
Abel et al. Semantics + Filtering + Search—Twitcident exploring information in social web streams. HT'12—Proceedings of 23rd ACM Conference on Hypertext and Social Media (10 pgs) (Jun. 25-28, 2012).
ArcGIS REST Services Directory. Folder: TIGERWeb. Available at https://tigerweb.geo.census.gov/arcgis/rest/services/TIGERweb. (1 pg.) (Accessed Sep. 2017).
Chowdhury et al. Tweet4act: Using incident-specific profiles for classifying crisis-related messages. Proceedings of the 10th International ISCRAM Conference (pp. 834-839) (2013).
Cipolla et al. A tool for Emergency Detection with Deep Learning Neural Networks. KDWeb (2016) How to predict a disaster. ICAR—National Research Council of Italy—Palermo, Italy (Dec. 1, 2016) (10 pgs).
Homeland Security Science and Technology. Using Social Media for Enhanced Situational Awareness and Decision Support. Virtual Social Medial Working Group and DHS First Responders Group. (44 pgs.) (Jun. 2014).
Marcus et al. TwitInfo: Aggregating and Visualizing Microblogs for Event Exploration. ACM CHI Conference May 7-12, 2011, 2011 (10 pgs).
Meier. MatchApp: Next Generation Disaster Response App? !Revolution (12 pgs.) (Feb. 27, 2013).
National Emergency Number Association (nena) Technical Committee Chairs, "NENA Functional and Interface Standards for Next Generation 9-1-1 Version 1.0 (i3)", (Dec. 18, 2007), URL: https://c.ymcdn.com/sites/nena.site-ym.com/resource/collection/2851C951-69FF-40F0-A6B8-36A714CB085D/NENA_08-002_v1_Functional_Interface_Standards_NG911_i3.pdf, (Feb. 5, 2018), XP055447667.
National Emergency Number Association (NENA). Social Networking in 9-1-1 PSAPs Information Document. Available at https://c.ymcdn.com/sites/www.nena.org/resource/resmgr/Standards/NENA- INF-001.1.1-2012_Social (18 pgs) (2012).
PCT/US2015/050609 International Preliminary Report on Patentability dated Mar. 30, 2017.
PCT/US2015/050609 International Search Report and Written Opinion dated Dec. 16, 2015.
PCT/US2016/060189 International Preliminary Report on Patentability dated May 17, 2018.
PCT/US2016/060189 International Search Report and Written Opinion dated Feb. 24, 2017.
PCT/US2016/065212 International Preliminary Report on Patentability dated Jun. 21, 2018.
PCT/US2016/065212 International Search Report and Written Opinion dated Feb. 20, 2017.
PCT/US2016/067366 International Preliminary Report on Patentability dated Jun. 28, 2018.
PCT/US2016/067366 International Search Report and Written Opinion dated Mar. 31, 2017.
PCT/US2016/068134 International Preliminary Report on Patentability dated Jul. 5, 2018.
PCT/US2016/068134 International Search Report and Written Opinion dated Apr. 21, 2017.
PCT/US2017/029465 International Preliminary Report on Patentability dated Nov. 8, 2018.
PCT/US2017/029465 International Search Report and Written Opinion dated Aug. 9, 2017.
PCT/US2017/031605 International Search Report and Written Opinion dated Jul. 31, 2017.

(56) References Cited

OTHER PUBLICATIONS

PCT/US2017/047854 International Preliminary Report on Patentability dated Mar. 7, 2019.
PCT/US2017/047854 International Search Report and Written Opinion dated Nov. 28, 2017.
PCT/US2018/063935 International Search Report and Written Opinion dated Mar. 22, 2019.
PCT/US2019/027538 International Search Report and Written Opinion dated Aug. 2, 2019.
Seattle Real Time Fire 911 Calls. Available at https://catalog.data.gov/dataset/seattle-real-time-fire-911-calls-6cdf3 (3 pgs.) (Accessed Sep. 2017).
Tazaki. Floating Ground: An Architecture for Network Mobility and Ad Hoc Network Convergence. Thesis. Graduate School of Media and Governance Keio University 5322 Endo Fujisawa, Kanagawa, Japan 2520882 (pp. 1-162) (Jan. 2011).
U.S. Census Bureau. Developers: Population Estimates APIs. Available at https://www.census.gov/data/developers/data-sets/popest-popproj/popest.html (2 pgs.) (Accessed Sep. 2017).
U.S. Appl. No. 14/794,780 Office Action dated Feb. 2, 2016.
U.S. Appl. No. 14/794,780 Office Action dated Mar. 7, 2017.
U.S. Appl. No. 14/794,780 Office Action dated Nov. 15, 2016.
U.S. Appl. No. 14/856,818 Office Action dated Apr. 12, 2017.
U.S. Appl. No. 15/371,117 Office Action dated Aug. 5, 2019. .
U.S. Appl. No. 15/387,363 Office Action dated Jul. 6, 2017.
U.S. Appl. No. 15/387,363 Office Action dated Mar. 15, 2017.
U.S. Appl. No. 15/436,379 Office Action dated Apr. 6, 2017.
U.S. Appl. No. 15/436,379 Office Action dated Nov. 2, 2017.
U.S. Appl. No. 15/436,484 Office Action dated May 8, 2017.
U.S. Appl. No. 15/436,484 Office Action dated Sep. 14, 2017.
U.S. Appl. No. 15/444,133 Office Action dated Apr. 4, 2017.
U.S. Appl. No. 15/444,133 Office Action dated Aug. 17, 2017.
U.S. Appl. No. 15/497,067 Office Action dated Jun. 23, 2017.
U.S. Appl. No. 15/588,343 Office Action dated Feb. 26, 2018.
U.S. Appl. No. 15/589,847 Office Action dated Jun. 23, 2017.
U.S. Appl. No. 15/589,847 Office Action dated Nov. 30, 2017.
U.S. Appl. No. 15/589,847 Office Action dated Nov. 6, 2018.
U.S. Appl. No. 15/667,531 Office Action dated Apr. 5, 2018.
U.S. Appl. No. 15/667,531 Office Action dated Nov. 8, 2017.
U.S. Appl. No. 15/682,440 Office Action dated Jul. 10, 2019.
U.S. Appl. No. 15/880,208 Office Action dated Aug. 7, 2018.
U.S. Appl. No. 15/958,186 Office Action dated Oct. 18, 2018.
U.S. Appl. No. 15/958,398 Office Action dated Oct. 12, 2018.
U.S. Appl. No. 16/150,099 Office Action dated Jun. 25, 2019.
U.S. Appl. No. 16/178,476 Office Action dated May 30, 2019.
U.S. Appl. No. 16/209,892 Office Action dated Feb. 8, 2019.
U.S. Appl. No. 16/271,634 Office Action dated Jun. 13, 2019.
U.S. Appl. No. 16/378,363 Office Action dated Jul. 19, 2019.
U.S. Appl. No. 16/436,810 Office Action dated Aug. 9, 2019.
Weather Company Data for IBM Bluemix APIs. Available at https://twcservice.mybluemix.net/rest-api/ (100 pgs) (Accessed Sep. 2017).

* cited by examiner

"Help, I've been shot and I can't get up. Active shooter." 656A

"Officer down!" 656B

"Oh my god, look, did that man just get run over?" 656C

"I think he just got hit by that van!" 656D

"Someone call 9-1-1! Quick! That man needs help!" 656E

Media Type: Video

Device Type: Camera

Location: Lat/Long

Timestamp: 14:10:30

Summary:

Fire in living room. Three human occupants. One animal.

View Media (ii) Video Summary

Media Type: Audio

Device Type: Car System

Location: Lat/Long

Timestamp: 12:08:00

Summary:

Possible accident involving vehicle and pedestrian.

View Media (i) Audio Summary

FIG. 8

SYSTEMS AND METHODS FOR INTELLIGENTLY MANAGING MULTIMEDIA FOR EMERGENCY RESPONSE

CROSS-REFERENCE TO RELATED APPLICATIONS

This application is a continuation of U.S. application Ser. No. 16/539,946, filed Aug. 13, 2019, which claims the benefit of U.S. Provisional Application No. 62/718,798 filed Aug. 14, 2018. The entire contents of these applications are incorporated by reference herein.

BACKGROUND OF THE INVENTION

A person in an emergency situation may request help using a mobile communication device such as a cell phone to dial a designated emergency number like 9-1-1 or a direct access phone number for the local emergency service provider (e.g., an emergency dispatch center). This call is assigned to one or more first responders by the emergency service provider. However, these communications are typically limited to audio calls with narrow functionality since most emergency service providers that receive emergency calls currently lack the capacity for more sophisticated communications.

SUMMARY OF THE INVENTION

Disclosed herein are systems, servers, devices, methods, and media for managing emergency communications such as multimedia data communications. The present disclosure takes advantage of recent technological advancements that have led to the dramatic rise in the number and popularity of sophisticated electronic devices in home, office, mobile, and outdoor environments—commonly referred to the Internet of Things (IoT)—that are capable of sensing and recording information from the environment that they are placed in. In some embodiments, IoT devices, when in the vicinity of an emergency, are leveraged to provide valuable information, or insight, into the emergency. For example, smart cameras in the vicinity of an emergency may be able to provide video streams of the environment surrounding the emergency. Emergency service providers may be able to use this information to be better prepared to respond to emergencies and provide life-saving services to those involved.

One advantage provided by the systems, servers, devices, methods, and media of the instant application is the ability to identify sensors in the vicinity of an emergency. In some embodiments, when a person generates an emergency alert (such as by dialing 9-1-1 on a mobile phone in the United States), an emergency management system (EMS) receives a location of the mobile phone (e.g., the location of the emergency) from the mobile phone. In some embodiments, the EMS is configured to use the location, or any other data, received from the mobile phone to identify devices that may be capable of recording information regarding the emergency. In some embodiments, the EMS then accesses the identified devices and receive data and multimedia collected by the identified devices. In some embodiments, the EMS facilitates the collection and transfer of such data to emergency service providers (ESPs) such as emergency dispatch centers (EDCs) and/or public safety answering points (PSAPs).

Another advantage provided by the systems, servers, devices, methods, and media of the instant application is an intelligent multimedia system capable of intelligently determining the devices most relevant to an emergency. In some embodiments, after the EMS identifies devices that may be capable of recording information regarding an emergency, the intelligent multimedia system can determine, based on the devices and the data collected by the devices, which of the devices identified by the EMS may provide the most relevant information pertaining to the emergency. For example, in some embodiments, the intelligent multimedia system determines which video camera from a set of three video cameras in the vicinity of an emergency has the best angle or clearest view of the emergency.

Another advantage provided by the systems, servers, devices, methods, and media of the instant application is the ability to transmit multimedia received by the EMS to emergency service providers (ESPs), such as public safety answering points (PSAPs) and emergency responders (e.g., police officers or firemen). For example, in some embodiments, after receiving data or multimedia from a device in the vicinity of an emergency, the EMS identifies an ESP or a member of an ESP that is responding to the emergency and transmit the data or multimedia to a device associated with the EPS or member of the ESP. In some embodiments, the EMS then monitors and manages the transmission of the data or multimedia to the ESP or member of the ESP. For example, in some embodiments, the EMS samples the connection strength of the transmission and, in response to a weak connection strength, downgrade the quality of the transmission.

Another advantage provided by the systems, servers, devices, methods, and media of the instant application is a system for controlling emergency access to connected devices. For example, in some embodiments, an emergency management system (EMS) provides a web interface that allows users to assign different levels or permissions of emergency access to different electronic devices that the user possesses. During an emergency, the EMS accesses the electronic devices according to the levels or permissions of emergency access assigned to the respective devices.

Another advantage provided by the systems, servers, devices, methods, and media of the instant application is the ability to request multimedia from a device or a user of the device and transmit multimedia from the device to an emergency service provider (ESP). For example, in some embodiments, a member of an ESP can submit a multimedia request regarding an emergency to an emergency management system (EMS), such as by selecting a multimedia access button within an emergency response application. The EMS can then identify an electronic device associated with the emergency and deliver a multimedia inquiry to the electronic device. In response to receiving positive confirmation of the multimedia inquiry, the EMS can then establish a communication link between the electronic device and the ESP and transmit multimedia from the electronic device to the ESP via the communication link.

In various embodiments, described herein are systems, servers, devices, methods, and media for transmitting multimedia from electronic devices to emergency service providers. In one aspect, disclosed herein is a method for transmitting multimedia from an electronic device to an emergency service provider (ESP) by an emergency management system (EMS), the method comprising: a) detecting an emergency alert indicative of an emergency; b) identifying a set of pertinent sensors that is determined to be associated with the emergency based on at least one sensor attribute; c) obtaining a first set of multimedia contents from the set of pertinent sensors; d) determining a set of relevant sensors based on the first set of multimedia contents and optionally the at least one sensor attribute; and e) transmitting a second set of multimedia contents from the set of relevant sensors to an emergency service provider (ESP). In some embodiments, the first set of multimedia contents comprises at least one of audio or video. In some embodiments, the first set of multimedia contents comprises at least one of still images or text files. In some embodiments, the first set of multimedia contents comprises at least one of audio or video feeds. In some embodiments, the ESP is a public safety answering point (PSAP). In some embodiments, the ESP is a dispatch center. In some embodiments, transmitting the second set of multimedia contents comprises transmitting the second set of multimedia contents to a member of the dispatch center. In some embodiments, transmitting the second set of multimedia contents comprises delivering a weblink to a website hosting the second set of multimedia contents to the ESP. In some embodiments, the ESP is a public safety answering point (PSAP) and the method further comprises: a) receiving, from a member of the PSAP, selection of a third set of multimedia contents from the second set of multimedia contents; and b) transmitting the third set of multimedia contents to an electronic device associated with an emergency responder. In some embodiments, the ESP is a dispatch center and the method further comprises: a) receiving selection of a third set of multimedia contents from the second set of multimedia contents by a member of the dispatch center; and b) transmitting the third set of multimedia contents to an electronic device associated with an emergency responder. In some embodiments, the second set of multimedia contents is transmitted to the ESP in response to a multimedia request received from a member of the ESP. In some embodiments, the emergency alert comprises a location associated with the emergency; and the set of relevant sensors is determined based at least in part on distance between each sensor of the set of pertinent sensors and the location associated with the emergency. In some embodiments, determining the set of relevant sensors further comprises calculating a relevancy score for each multimedia content from the first set of multimedia contents. In some embodiments, calculating a relevancy score for each multimedia content from the first set of multimedia contents further comprises processing the first set of multimedia contents for at least one of audio or visual cues. In some embodiments, the audio cues comprise key words. In some embodiments, the audio cues comprise volume level. In some embodiments, the visual cues comprise at least one of light intensity, activity, objects, or people. In some embodiments, the method further comprises comparing an audio or visual cue to a threshold value and discarding the audio or visual cue if the audio or visual cue fails to exceed the threshold value. In some embodiments, calculating a relevancy score further comprises: a) accessing a database of historical relevancy scores; b) obtaining a machine learning algorithm trained using data comprising the historical relevancy scores; and c) applying the machine learning algorithm to each of the multimedia contents from the first set of multimedia contents to calculate the relevancy score. In some embodiments, the method further comprises receiving relevancy feedback from the ESP regarding the second set of multimedia contents and storing relevancy scores for the second set of multimedia contents in the database of historical relevancy scores. In some embodiments, calculating the relevancy score further comprises obtaining and processing a transcription of a multimedia content. In some embodiments, the set of relevant sensors is determined by identifying each sensor from the set of pertinent sensors that has a multimedia content with a relevancy score that exceeds a threshold relevancy value. In some embodiments, the emergency alert comprises a location associated with the emergency and the method further comprises: a) displaying a virtual map comprising indicators of at least one of the second set of multimedia contents or the set of relevant sensors shown in relation to the location associated with the emergency at an electronic device associated with the ESP; and b) receiving, from a member of the ESP, selection of multimedia contents from at least one of the second set of multimedia contents or the set of relevant sensors displayed on the virtual map. In some embodiments, the virtual map further comprises an indicator of a relevancy score for the multimedia content of each of the sensors from the set of relevant sensors. In some embodiments, the method further comprises receiving a radius of restriction on the set of relevant sensors through the virtual map from the member of the ESP and displaying only sensors located within the radius of restriction. In some embodiments, the method further comprises: a) receiving selection of a third set of multimedia contents by the member of the ESP from the virtual map; and b) transmitting the third set of multimedia contents to the ESP. In some embodiments, the method further comprises: a) displaying a list of relevant sensors from the set of relevant sensors at an electronic device associated with the ESP; and b) receiving selection of the second set of multimedia contents by a member of the ESP from the list of relevant sensors. In some embodiments, the list of relevant sensors further comprises an indicator of a relevancy score for multimedia content of each of the sensors from the set of relevant sensors. In some embodiments, the method further comprises: a) receiving selection of a third set of multimedia contents by the member of the ESP from the list of relevant sensors; and b) transmitting the third set of multimedia contents from the set of relevant sensors to the ESP. In some embodiments, the method further comprises: a) sampling a connection quality of the transmission of a multimedia content within the second set of multimedia contents to the ESP; and b) in response to the connection quality falling below a threshold value, downgrading the multimedia content. In some embodiments, the multimedia content is a video stream; and the video stream is downgraded to image stills or reduced frame rate or resolution. In some embodiments, the multimedia content is an audio stream; and the audio stream is downgraded to a text transcription. In some embodiments, the text transcription is transmitted to the ESP in the form of an SMS text message. In some embodiments, the multimedia content is a video file; and the video file is downgraded to a summarization. In some embodiments, the method further comprises: a) processing the first set of multimedia contents for at least one of audio or visual cues; b) summarizing the at least one of the audio or visual cues into one or more summarizations of the first set of multimedia contents; c) transmitting the one or more summarizations to the ESP; and d) selecting the set of relevant sensors by receiving selection of the second set of multimedia contents by a member of the ESP from the one or more summarizations. In some embodiments, the set of pertinent sensors is a subset of sensors communicatively coupled to the EMS and continuously, periodically, or aperiodically providing multimedia contents to the EMS. In some embodiments, the method further comprises establishing a communicative link with the set of pertinent sensors. In some embodiments, the method further comprises: a) determining, based on at least one of the set of pertinent sensors and the first set of multimedia contents, a second set of relevant sensors; and b) transmitting a third set of multimedia contents from the second set of relevant sensors to the ESP. In some embodiments, determining the set of relevant sensors further comprises calculating a relevancy score for each multimedia content within the first set of multimedia contents; and selecting the second set of relevant sensors further comprises: i) calculating a second relevancy score for each multimedia content from the first set of multimedia contents; and ii) selecting each sensor from the set of pertinent sensors that has a multimedia content with a second relevancy score that exceeds a threshold relevancy value as a relevant sensor. In some embodiments, the method further comprises: a) determining that one or more multimedia contents within the second set of multimedia contents is unavailable; and b) determining the second set of relevant sensors in response to determining that the one or more of the multimedia contents within the second set of multimedia contents is unavailable. In some embodiments, the emergency alert comprises a location associated with the emergency; and identifying the set of pertinent sensors comprises searching for sensors located within a predetermined radius of the location associated with the emergency. In some embodiments, the emergency alert is received from an electronic device communicatively coupled to a network; and identifying the set of pertinent sensors comprises detecting sensors communicatively coupled to the network. In some embodiments, the emergency alert is received from an electronic device communicatively coupled to a network; and identifying the set of pertinent sensors comprises detecting sensors recently communicatively coupled to the network. In some embodiments, the emergency alert is received from an electronic device; and identifying the set of pertinent sensors comprises detecting sensors communicatively coupled to the electronic device. In some embodiments, identifying the set of pertinent sensors comprises parsing a sensor database. In some embodiments, the emergency alert is generated by a sensor device. In some embodiments, the emergency alert is transmitted to the EMS by an electronic device communicatively coupled to the sensor device. In some embodiments, the sensor device is a wearable device. In some embodiments, the set of relevant sensors is determined at least partially by applying a prioritization rule to at least one of the set of pertinent sensors and the first set of multimedia contents. In some embodiments, the prioritization rule prioritizes the first set of multimedia contents based at least in part on content type. In some embodiments, the prioritization rule prioritizes the set of sensors pertinent to the emergency based at least in part on sensor type. In some embodiments, the prioritization rule prioritizes the set of sensors pertinent to the emergency based at least in part on device type. In some embodiments, the prioritization rule prioritizes the set of sensors pertinent to the emergency based at least in part on an emergency type of the emergency. In some embodiments, the prioritization rule prioritizes the first set of multimedia contents based at least in part on capabilities of the ESP user. In some embodiments, identifying the set of pertinent sensors comprises detecting active and inactive sensors and selecting only active sensors as the set of pertinent sensors.

In another aspect, disclosed herein is a method for transmitting multimedia from an electronic device to an emergency service provider (ESP) by an emergency management system (EMS), the method comprising: a) detecting an emergency alert indicative of an emergency from an electronic device; b) identifying a set of pertinent sensors, wherein each sensor within the set of pertinent sensors is determined to be associated with the emergency based on at least one sensor attribute; c) obtaining a first set of multimedia contents comprising multimedia content from the set of pertinent sensors, wherein the multimedia content comprises at least one of audio or video; d) determining, based on at least one of the set of pertinent sensors and the first set of multimedia contents, a set of relevant sensors from the set of pertinent sensors; e) processing a second set of multimedia contents from the set of relevant sensors for audio or visual cues; f) summarizing the audio or visual cues into one or more summarizations of the second set of multimedia contents; and g) transmitting the one or more summarizations to the ESP user.

In another aspect, disclosed herein is a method for transmitting multimedia from an electronic device to an emergency service provider (ESP) by an emergency management system (EMS), the method comprising: a) detecting an emergency alert indicative of an emergency from an electronic device, wherein the emergency alert comprises a location associated with the emergency; b) identifying a set of pertinent sensors, wherein each sensor within the set of pertinent sensors is determined to be associated with the emergency, by searching for sensors located within a predetermined radius of the location associated with the emergency; c) obtaining a first set of multimedia contents from the set of pertinent sensors, wherein the first set of multimedia contents comprises audio or video; d) determining, based on at least one of the set of sensors pertinent to the emergency and the first set of multimedia contents, a set of relevant sensors from the set of pertinent sensors; e) receiving a request for multimedia from an emergency service provider (ESP); and f) in response to receiving the request for multimedia, transmitting a second set of multimedia contents from the set of relevant sensors to the ESP. In some embodiments, the method further comprises: a) displaying a virtual map comprising at least one of the second set of multimedia contents or the set of relevant sensors shown in relation to the location associated with the emergency at an electronic device associated with the ESP; and b) receiving, from a member of the ESP, selection of multimedia contents from at least one of the second set of multimedia contents or the set of relevant sensors displayed on the virtual map. In some embodiments, the virtual map further comprises an indicator of a relevancy score for the multimedia content from each of the sensors from the set of relevant sensors. In some embodiments, the method further comprises: a) sampling a connection quality of the transmission of a multimedia content within the second set of multimedia contents to the ESP; and b) in response to the connection quality falling below a threshold value, downgrading the multimedia content. In some embodiments, the multimedia content is a video stream; and the video stream is downgraded to image stills. In some embodiments, the method further comprises: a) processing the first set of multimedia contents for audio or visual cues; b) summarizing the audio or visual cues into one or more summarizations of the first set of multimedia contents; c) transmitting the one or more summarizations to the ESP; and d) selecting the set of relevant sensors by receiving selection of the second set of multimedia contents by a member of the ESP from the one or more summarizations. In some embodiments, determining the set of relevant sensors further comprises calculating a relevancy score for each multimedia content within the first set of multimedia contents. In some embodiments, calculating a relevancy score for each multimedia content within the first set of multimedia contents further comprises processing the first set of multimedia contents for audio or visual cues. In some embodiments, the audio cues comprise key words or volume level. In some embodiments, the visual cues comprise light intensity, activity, objects, or people. In some embodiments, the method further comprises comparing an audio or visual cue to a threshold value and discarding the audio or visual cue if the audio or visual cue fails to exceed the threshold value. In some embodiments, the method further comprises: a) determining, based on at least one of the set of pertinent sensors and the first set of multimedia contents, a second set of relevant sensors; and b) transmitting a third set of multimedia contents from the second set of relevant sensors to the ESP. In some embodiments, determining the set of relevant sensors further comprises calculating a relevancy score for each multimedia content within the first set of multimedia contents; and selecting the second set of relevant sensors comprises: i) calculating a second relevancy score for each multimedia content within the first set of multimedia contents; and ii) selecting each sensor from the set of pertinent sensors having a multimedia content with a second relevancy score that exceeds a threshold relevancy value as a relevant sensor. In some embodiments, the method further comprises: a) determining that one or more multimedia contents within the second set of multimedia contents is unavailable; and b) selecting the second set of relevant sensors in response to determining that the one or more multimedia contents within the second set of multimedia contents is unavailable. In some embodiments, the emergency alert is received from an electronic device communicatively coupled to a network; and identifying the set of pertinent sensors comprises detecting sensors communicatively coupled to the network. In some embodiments, the emergency alert is received from an electronic device; and identifying the set of pertinent sensors comprises detecting sensors communicatively coupled to the electronic device.

In another aspect, disclosed herein is a system for transmitting multimedia from an electronic device to an emergency service provider (ESP) by an emergency management system (EMS), the system comprising: a) a network server; b) an emergency service provider (ESP); and c) an emergency management system (EMS) communicatively coupled to the network server and the ESP, and configured to: i) detect an emergency alert indicative of an emergency; ii) identify a set of pertinent sensors, wherein each sensor within the set of pertinent sensors is determined to be associated with the emergency based on at least one sensor attribute; iii) obtain a first set of multimedia contents from the set of pertinent sensors; iv) determine, based on the first set of multimedia contents and optionally the at least one sensor attribute, a set of relevant sensors from the set of pertinent sensors; and v) transmit a second set of multimedia contents from the set of relevant sensors to the ESP. In some embodiments, the first set of multimedia contents comprises at least one of audio or video. In some embodiments, the first set of multimedia contents comprises at least one of still images or text files. In some embodiments, the first set of multimedia contents comprises at least one of audio or video feeds. In some embodiments, the ESP is a public safety answering point (PSAP). In some embodiments, the ESP is a dispatch center. In some embodiments, the EMS is further configured to transmit the second set of multimedia contents to a member of the dispatch center. In some embodiments, the EMS is further configured to deliver a weblink to a website hosting the second set of multimedia contents to the ESP. In some embodiments, the ESP is a public safety answering point (PSAP) and the EMS is further configured to: a) receive, from a member of the PSA, selection of a third set of multimedia contents from the second set of multimedia contents; and b) transmit the third set of multimedia contents to an electronic device associated with an emergency responder. In some embodiments, the ESP is a dispatch center and the EMS is further configured to: a) receive selection of a third set of multimedia contents from the second set of multimedia contents by a member of the dispatch center; and b) transmit the third set of multimedia contents to an electronic device associated with an emergency responder. In some embodiments, the EMS transmits the second set of multimedia contents to the ESP in response to a multimedia request received from a member of the ESP. In some embodiments, the emergency alert comprises a location associated with the emergency; and the EMS determines the set of relevant sensors based at least in part on distance between each sensor of the set of pertinent sensors and the location associated with the emergency. In some embodiments, the EMS is further configured to determine the set of relevant sensors by calculating a relevancy score for each multimedia content from the first set of multimedia contents. In some embodiments, the EMS is further configured to calculate a relevancy score for each multimedia content from the first set of multimedia contents by processing the first set of multimedia contents for at least one of audio and visual cues. In some embodiments, the audio cues comprise key words. In some embodiments, the audio cues comprise volume level. In some embodiments, the visual cues comprise at least one of light intensity, activity, objects, or people. In some embodiments, the EMS is further configured to compare an audio or visual cue to a threshold value and discard the audio or visual cue if the audio or visual cue fails to exceed the threshold value. In some embodiments, the EMS is further configured to calculate a relevancy score for each of the multimedia contents from the first set of multimedia contents by: a) accessing a database of historical relevancy scores; b) obtaining a machine learning algorithm trained using data comprising the historical relevancy scores; and c) applying the machine learning algorithm to each of the multimedia contents from the first set of multimedia contents. In some embodiments, the EMS is further configured to receive relevancy feedback from the ESP regarding the second set of multimedia contents and store relevancy scores for the second set of multimedia contents in the database of historical relevancy scores. In some embodiments, the EMS is further configured to calculate the relevancy score by obtaining and processing a transcription of a multimedia content. In some embodiments, the EMS is further configured to determine the set of relevant sensors by determining each sensor from the set of pertinent sensors that has a multimedia content with a relevancy score that exceeds a threshold relevancy value. In some embodiments, the emergency alert comprises a location associated with the emergency and the EMS is further configured to: a) display a virtual map comprising indicators of at least one of the second set of multimedia contents or the set of relevant sensors shown in relation to the location associated with the emergency at an electronic device associated with the ESP; and b) receive, from a member of the ESP, selection of multimedia contents from at least one of the second set of multimedia contents or the set of relevant sensors displayed on the virtual map. In some embodiments, the virtual map further comprises an indicator of a relevancy score for the multimedia content of each of the sensors from the set of relevant sensors. In some embodiments, the EMS is further configured to receive a radius of restriction on the set of relevant sensors through the virtual map from the member of the ESP and displaying only sensors located within the radius of restriction. In some embodiments, the EMS is further configured to: a) receive selection of a third set of multimedia contents by the member of the ESP from the virtual map; and b) transmit the third set of multimedia contents to the ESP. In some embodiments, the EMS is further configured to: a) display a list of relevant sensors at an electronic device associated with the ESP; and b) receive selection of the second set of multimedia contents by a member of the ESP from the list of relevant sensors. In some embodiments, the list of relevant sensors further comprises an indicator of a relevancy score for the multimedia content of each of the sensors from the set of relevant sensors. In some embodiments, the EMS is further configured to: a) receive selection of a third set of multimedia contents by the member of the ESP from the list of relevant sensors; and b) transmit the third set of multimedia contents from the set of relevant sensors to the ESP. In some embodiments, the EMS is further configured to: a) sample a connection quality of the transmission of a multimedia content within the second set of multimedia contents to the ESP; and b) in response to the connection quality falling below a threshold value, downgrade the multimedia content. In some embodiments, the multimedia content is a video stream; and the EMS downgrades the video stream to image stills or reduced frame rate or resolution. In some embodiments, the multimedia content is an audio stream; and the EMS downgrades the audio stream to a text transcription. In some embodiments, the EMS transmits the text transcription to the ESP in the form of an SMS text message. In some embodiments, the multimedia content is a video file; and the EMS downgrades the video file to a summarization. In some embodiments, the EMS is further configured to: a) process the first set of multimedia contents for at least one of audio or visual cues; b) summarize the at least one of the audio or visual cues into one or more summarizations of the first set of multimedia contents; c) transmit the one or more summarizations to the ESP; and d) select the set of relevant sensors by receiving selection of the second set of multimedia contents by a member of the ESP from the one or more summarizations. In some embodiments, the set of pertinent sensors is a subset of sensors communicatively coupled to the EMS and continuously, periodically, or aperiodically providing multimedia contents to the EMS. In some embodiments, the EMS is further configured to establish a communicative link with the set of pertinent sensors. In some embodiments, the EMS is further configured to: a) determine, based on at least one of the set of pertinent sensors and the first set of multimedia contents, a second set of relevant sensors; and b) transmit a third set of multimedia contents from the second set of relevant sensors to the ESP. In some embodiments, the EMS is further configured to determine the set of relevant sensors by calculating a relevancy score for each multimedia content within the first set of multimedia contents; and the EMS is further configured to select the second set of relevant sensors by: i) calculating a second relevancy score for each of the multimedia content from the first set of multimedia contents; and ii) selecting each sensor from the set of pertinent sensors that has a multimedia content with a second relevancy score that exceeds a threshold relevancy value as a relevant sensor. In some embodiments, the EMS is further configured to: a) determine that one or more multimedia contents within the second set of multimedia contents is unavailable; and b) determine the second set of relevant sensors in response to determining that the one or more of the multimedia contents within the second set of multimedia contents is unavailable. In some embodiments, the emergency alert comprises a location associated with the emergency; and the EMS is further configured to identify the set of pertinent sensors by searching for sensors located within a predetermined radius of the location associated with the emergency. In some embodiments, the EMS receives the emergency alert from an electronic device communicatively coupled to a network; and the EMS identifies the set of pertinent sensors by detecting sensors communicatively coupled to the network. In some embodiments, the EMS receives the emergency alert from an electronic device communicatively coupled to a network; and the EMS identifies the set of pertinent sensors by detecting sensors communicatively recently coupled to the network. In some embodiments, the EMS receives the emergency alert from an electronic device; and the EMS identifies the set of pertinent sensors by detecting sensors communicatively coupled to the electronic device. In some embodiments, the EMS is further configured to identify the set of pertinent sensors by parsing a sensor database. In some embodiments, the emergency alert is generated by a sensor device. In some embodiments, the EMS receives the emergency alert from electronic device communicatively coupled to the sensor device. In some embodiments, the sensor device is a wearable device. In some embodiments, the EMS is further configured to determine the set of relevant sensors at least partially by applying a prioritization rule to at least one of the set of pertinent sensors and the first set of multimedia contents. In some embodiments, the prioritization rule prioritizes the first set of multimedia contents based at least in part on content type. In some embodiments, the prioritization rule prioritizes the set of sensors pertinent to the emergency based at least in part on sensor type. In some embodiments, the prioritization rule prioritizes the set of sensors pertinent to the emergency based at least in part on device type. In some embodiments, the prioritization rule prioritizes the set of sensors pertinent to the emergency based at least in part on an emergency type of the emergency. In some embodiments, the prioritization rule prioritizes the first set of multimedia contents based at least in part on capabilities of the ESP user. In some embodiments, the EMS is further configured to identify the set of pertinent sensors by detecting active and inactive sensors and selecting only active sensors as the set of pertinent sensors.

In another aspect, disclosed herein is a system for transmitting multimedia from an electronic device to an emergency service provider (ESP) by an emergency management system (EMS), the system comprising: a) a network server; b) an emergency service provider (ESP); and c) an emergency management system (EMS) communicatively coupled to the network server and the ESP, and configured to: i) detect an emergency alert indicative of an emergency from an electronic device; ii) identify a set of pertinent sensors, wherein each sensor within the set of pertinent sensors is determined to be associated with the emergency based on at least one sensor attribute; iii) obtain a first set of multimedia contents from the set of pertinent sensors; iv) determine, based on the first set of multimedia contents and optionally at least one sensor attribute, a set of relevant sensors from the set of pertinent sensors; v) process a second set of multimedia contents from the set of relevant sensors for audio or visual cues; vi) summarize the audio or visual cues into one or more summarizations of the second set of multimedia contents; and vii) transmit the one or more summarizations to the ESP.

In another aspect, disclosed herein is a system for transmitting multimedia from an electronic device to an emergency service provider (ESP) by an emergency management system (EMS), the system comprising: a) a network server; b) an emergency service provider (ESP); and c) an emergency management system (EMS) communicatively coupled to the network server and the ESP, and configured to: i) detect an emergency alert indicative of an emergency from an electronic device, wherein the emergency alert comprises a location associated with the emergency; ii) identify a set of pertinent sensors, wherein each sensor within the set of pertinent sensors is determined to be associated with the emergency, by searching for sensors located within a predetermined radius of the location associated with the emergency; iii) obtain a first set of multimedia contents from the set of pertinent sensors, wherein the first set of multimedia contents comprises audio or video; iv) determine, based on at least one of the set of pertinent sensors and the first set of multimedia contents, a set of relevant sensors from the set of pertinent sensors; v) receive a request for multimedia from the ESP; and vi) in response to receiving the request for multimedia, transmit a second set of multimedia contents from the set of relevant sensors to the ESP. In some embodiments, the EMS is further configured to: a) display a virtual map comprising at least one of the second set of multimedia contents or the set of relevant sensors shown in relation to the location associated with the emergency at an electronic device associated with the ESP; and b) receive, from a member of the ESP, selection of multimedia contents from at least one of the second set of multimedia contents or the set of relevant sensors displayed on the virtual map. In some embodiments, the virtual map further comprises an indicator of a relevancy score for multimedia content from each sensor from the set of relevant sensors. In some embodiments, the EMS is further configured to: a) sample a connection quality of the transmission of a multimedia content within the second set of multimedia contents to the ESP; and b) in response to the connection quality falling below a threshold value, downgrade the multimedia content. In some embodiments, the multimedia content is a video stream; and the EMS downgrades the video stream to image stills. In some embodiments, the EMS is further configured to: a) process the first set of multimedia contents for audio or visual cues; b) summarize the audio or visual cues into one or more summarizations of the first set of multimedia contents; c) transmit the one or more summarizations to the ESP; and d) select the set of relevant sensors by receiving selection of the second set of multimedia contents by a member of the ESP from the one or more summarizations. In some embodiments, the EMS is further configured to determine the set of relevant sensors by calculating a relevancy score for each multimedia content within the first set of multimedia contents. In some embodiments, the EMS is further configured to calculate a relevancy score for each multimedia content within the first set of multimedia contents by processing the first set of multimedia contents for audio or visual cues. In some embodiments, the audio cues comprise key words or volume level. In some embodiments, the visual cues comprise light intensity, activity, objects, or people. In some embodiments, the EMS is further configured to compare an audio or visual cue to a threshold value and discard the audio or visual cue if the audio or visual cue fails to exceed the threshold value. In some embodiments, the EMS is further configured to: a) determine, based on at least one of the set of pertinent sensors and the first set of multimedia contents, a second set of relevant sensors; and b) transmit a third set of multimedia contents from the second set of relevant sensors to the ESP. In some embodiments, the EMS is further configured to determine the set of relevant sensors by calculating a relevancy score for each multimedia content within the first set of multimedia contents; and the EMS is further configured to determine the second set of relevant sensors by: i) calculating a second relevancy score for each multimedia content within the first set of multimedia contents; and ii) selecting each sensor from the set of pertinent sensors having a multimedia content with a second relevancy score that exceeds a threshold relevancy value as a relevant sensor. In some embodiments, the EMS is further configured to: a) determine that one or more multimedia contents within the second set of multimedia contents is unavailable; and b) select the second set of relevant sensors in response to determining that the one or more multimedia contents within the second set of multimedia contents is unavailable. In some embodiments, the EMS receives the emergency alert from an electronic device communicatively coupled to a network; and the EMS is further configured to identify the set of pertinent sensors by detecting sensors communicatively coupled to the network. In some embodiments, the EMS receives the emergency alert from an electronic device; and the EMS is further configured to identify the set of pertinent sensors by detecting sensors communicatively coupled to the electronic device.

In another aspect, disclosed herein is a non-transitory computer readable storage media encoded with a computer program including instructions executable by at least one processor for: a) detecting an emergency alert indicative of an emergency; b) identifying a set of pertinent sensors, wherein each sensor within the set of pertinent sensors is determined to be associated with the emergency; c) obtaining a first set of multimedia contents from the set of pertinent sensors; d) determining, based on at least one of the set of pertinent sensors and the first set of multimedia contents, a set of relevant sensors from the set of pertinent sensors; and e) transmitting a second set of multimedia contents from the set of relevant sensors to an emergency service provider (ESP). In some embodiments, the first set of multimedia contents comprises at least one of audio or video. In some embodiments, the first set of multimedia contents comprises at least one of still images or text files. In some embodiments, the first set of multimedia contents comprises at least one of audio or video feeds. In some embodiments, the ESP is a public safety answering point (PSAP). In some embodiments, the ESP is a dispatch center. In some embodiments, transmitting the second set of multimedia contents comprises transmitting the second set of multimedia contents to a member of the dispatch center. In some embodiments, transmitting the second set of multimedia contents comprises delivering a weblink to a website hosting the second set of multimedia contents to the ESP. In some embodiments, the ESP is a public safety answering point (PSAP) and the media further includes instructions for: a) receiving, from a member of the PSAP, selection of a third set of multimedia contents from the second set of multimedia contents; and b) transmitting the third set of multimedia contents to an electronic device associated with an emergency responder. In some embodiments, the ESP is a dispatch center and the media further includes instructions for: a) receiving selection of a third set of multimedia contents from the second set of multimedia contents by a member of the dispatch center; and b) transmitting the third set of multimedia contents to an electronic device associated with an emergency responder. In some embodiments, the second set of multimedia contents is transmitted to the ESP in response to a multimedia request received from a member of the ESP. In some embodiments, the emergency alert comprises a location associated with the emergency; and the set of relevant sensors is determined based at least in part on distance between each sensor of the set of pertinent sensors and the location associated with the emergency. In some embodiments, determining the set of relevant sensors further comprises calculating a relevancy score for each multimedia content from the first set of multimedia contents. In some embodiments, calculating a relevancy score for each multimedia content from the first set of multimedia contents further comprises processing the first set of multimedia contents for at least one of audio or visual cues. In some embodiments, the audio cues comprise key words. In some embodiments, the audio cues comprise volume level. In some embodiments, the visual cues comprise at least one of light intensity, activity, objects, or people. In some embodiments, the media further includes instructions for comparing an audio or visual cue to a threshold value and discarding the audio or visual cue if the audio or visual cue fails to exceed the threshold value. In some embodiments, calculating a relevancy score further comprises: a) accessing a database of historical relevancy scores; b) obtaining a machine learning algorithm trained using data comprising the historical relevancy scores; and c) applying the machine learning algorithm to each of the multimedia contents from the first set of multimedia contents to calculate the relevancy score. In some embodiments, the media further includes instructions for receiving relevancy feedback from the ESP regarding the second set of multimedia contents and storing relevancy scores for the second set of multimedia contents in the database of historical relevancy scores. In some embodiments, calculating the relevancy score further comprises obtaining and processing a transcription of a multimedia content. In some embodiments, the set of relevant sensors is determined by determining each sensor from the set of pertinent sensors that has a multimedia content with a relevancy score that exceeds a threshold relevancy value. In some embodiments, the emergency alert comprises a location associated with the emergency and the media further comprises instructions for: a) displaying a virtual map comprising indicators of at least one of the second set of multimedia contents or the set of relevant sensors shown in relation to the location associated with the emergency at an electronic device associated with the ESP; and b) receiving, from a member of the ESP, selection of multimedia contents from at least one of the second set of multimedia contents or the set of relevant sensors displayed on the virtual map. In some embodiments, the virtual map further comprises an indicator of a relevancy score for the multimedia content of each of the sensors from the set of relevant sensors. In some embodiments, the media further includes instructions for receiving a radius of restriction on the set of relevant sensors through the virtual map from the member of the ESP and displaying only sensors located within the radius of restriction. In some embodiments, the media further includes instructions for: a) receiving selection of a third set of multimedia contents by the member of the ESP from the virtual map; and b) transmitting the third set of multimedia contents to the ESP. In some embodiments, the media further includes instructions for: a) displaying a list of relevant sensors at an electronic device associated with the ESP; and b) receiving selection of the second set of multimedia contents by a member of the ESP from the list of relevant sensors. In some embodiments, the list of relevant sensors further comprises an indicator of a relevancy score for multimedia content of each of the sensors from the set of relevant sensors. In some embodiments, the media further includes instructions for: a) receiving selection of a third set of multimedia contents by the member of the ESP from the list of relevant sensors; and b) transmitting the third set of multimedia contents from the set of relevant sensors to the ESP. In some embodiments, the media further includes instructions for: a) sampling a connection quality of the transmission of a multimedia content within the second set of multimedia contents to the ESP; and b) in response to the connection quality falling below a threshold value, downgrading the multimedia content. In some embodiments, the multimedia content is a video stream; and the video stream is downgraded to image stills or reduced frame rate or resolution. In some embodiments, the multimedia content is an audio stream; and the audio stream is downgraded to a text transcription. In some embodiments, the text transcription is transmitted to the ESP in the form of an SMS text message. In some embodiments, the multimedia content is a video file; and the video file is downgraded to a summarization. In some embodiments, the media further includes instructions for: a) processing the first set of multimedia contents for at least one of audio or visual cues; b) summarizing the at least one of the audio or visual cues into one or more summarizations of the first set of multimedia contents; c) transmitting the one or more summarizations to the ESP; and d) selecting the set of relevant sensors by receiving selection of the second set of multimedia contents by a member of the ESP from the one or more summarizations. In some embodiments, the set of pertinent sensors is a subset of sensors communicatively coupled to the EMS and continuously, periodically, or aperiodically providing multimedia contents to the EMS. In some embodiments, the media further includes instructions for establishing a communicative link with the set of pertinent sensors. In some embodiments, the media further includes instructions for: a) determining, based on at least one of the set of pertinent sensors and the first set of multimedia contents, a second set of relevant sensors; and b) transmitting a third set of multimedia contents from the second set of relevant sensors to the ESP. In some embodiments, determining the set of relevant sensors further comprises calculating a relevancy score for each multimedia content within the first set of multimedia contents; and selecting the second set of relevant sensors further comprises: i) calculating a second relevancy score for each multimedia content from the first set of multimedia contents; and ii) selecting each sensor from the set of pertinent sensors that has a multimedia content with a second relevancy score that exceeds a threshold relevancy value as a relevant sensor. In some embodiments, the media further includes instructions for: a) determining that one or more multimedia contents within the second set of multimedia contents is unavailable; and b) determining the second set of relevant sensors in response to determining that the one or more of the multimedia contents within the second set of multimedia contents is unavailable. In some embodiments, the emergency alert comprises a location associated with the emergency; and identifying the set of pertinent sensors comprises searching for sensors located within a predetermined radius of the location associated with the emergency. In some embodiments, the emergency alert is received from an electronic device communicatively coupled to a network; and identifying the set of pertinent sensors comprises detecting sensors communicatively coupled to the network. In some embodiments, the emergency alert is received from an electronic device communicatively coupled to a network; and identifying the set of pertinent sensors comprises detecting sensors recently communicatively coupled to the network. In some embodiments, the emergency alert is received from an electronic device; and identifying the set of pertinent sensors comprises detecting sensors communicatively coupled to the electronic device. In some embodiments, identifying the set of pertinent sensors comprises parsing a sensor database. In some embodiments, the emergency alert is generated by a sensor device. In some embodiments, the emergency alert is transmitted to the EMS by an electronic device communicatively coupled to the sensor device. In some embodiments, the sensor device is a wearable device. In some embodiments, the set of relevant sensors is determined at least partially by applying a prioritization rule to at least one of the set of pertinent sensors and the first set of multimedia contents. In some embodiments, the prioritization rule prioritizes the first set of multimedia contents based at least in part on content type. In some embodiments, the prioritization rule prioritizes the set of sensors pertinent to the emergency based at least in part on sensor type. In some embodiments, the prioritization rule prioritizes the set of sensors pertinent to the emergency based at least in part on device type. In some embodiments, the prioritization rule prioritizes the set of sensors pertinent to the emergency based at least in part on an emergency type of the emergency. In some embodiments, the prioritization rule prioritizes the first set of multimedia contents based at least in part on capabilities of the ESP user. In some embodiments, identifying the set of pertinent sensors comprises detecting active and inactive sensors and selecting only active sensors as the set of pertinent sensors.

In another aspect, disclosed herein is a non-transitory computer readable storage media encoded with a computer program including instructions executable by at least one processor for: a) detecting an emergency alert indicative of an emergency from an electronic device; b) identifying a set of pertinent sensors, wherein each sensor within the set of pertinent sensors is determined to be associated with the emergency; c) obtaining a first set of multimedia contents comprising multimedia content from the set of pertinent sensors, wherein the multimedia content comprises at least one of audio or video; d) determining, based on at least one of the set of pertinent sensors and the first set of multimedia contents, a set of relevant sensors from the set of pertinent sensors; e) processing a second set of multimedia contents from the set of relevant sensors for audio or visual cues; f) summarizing the audio or visual cues into one or more summarizations of the second set of multimedia contents; and g) transmitting the one or more summarizations to the ESP user.

In another aspect, disclosed herein is a non-transitory computer readable storage media encoded with a computer program including instructions executable by at least one processor for: a) detecting an emergency alert indicative of an emergency from an electronic device, wherein the emergency alert comprises a location associated with the emergency; b) identifying a set of pertinent sensors, wherein each sensor within the set of pertinent sensors is determined to be associated with the emergency, by searching for sensors located within a predetermined radius of the location associated with the emergency; c) obtaining a first set of multimedia contents from the set of pertinent sensors, wherein the first set of multimedia contents comprises audio or video; d) determining, based on at least one of the set of sensors pertinent to the emergency and the first set of multimedia contents, a set of relevant sensors from the set of pertinent sensors; e) receiving a request for multimedia from an emergency service provider (ESP); and f) in response to receiving the request for multimedia, transmitting a second set of multimedia contents from the set of relevant sensors to the ESP. In some embodiments, the media further includes instructions for: a) displaying a virtual map comprising at least one of the second set of multimedia contents or the set of relevant sensors shown in relation to the location associated with the emergency at an electronic device associated with the ESP; and b) receiving, from a member of the ESP, selection of multimedia contents from at least one of the second set of multimedia contents or the set of relevant sensors displayed on the virtual map. In some embodiments, the virtual map further comprises an indicator of a relevancy score for the multimedia content from each of the sensors from the set of relevant sensors. In some embodiments, the media further includes instructions for: a) sampling a connection quality of the transmission of a multimedia content within the second set of multimedia contents to the ESP; and b) in response to the connection quality falling below a threshold value, downgrading the multimedia content. In some embodiments, the multimedia content is a video stream; and the video stream is downgraded to image stills. In some embodiments, the media further includes instructions for: a) processing the first set of multimedia contents for audio or visual cues; b) summarizing the audio or visual cues into one or more summarizations of the first set of multimedia contents; c) transmitting the one or more summarizations to the ESP; and d) selecting the set of relevant sensors by receiving selection of the second set of multimedia contents by a member of the ESP from the one or more summarizations. In some embodiments, determining the set of relevant sensors further comprises calculating a relevancy score for each multimedia content within the first set of multimedia contents. In some embodiments, calculating a relevancy score for each multimedia content within the first set of multimedia contents further comprises processing the first set of multimedia contents for audio or visual cues. In some embodiments, the audio cues comprise key words or volume level. In some embodiments, the visual cues comprise light intensity, activity, objects, or people. In some embodiments, the media further includes instructions for comparing an audio or visual cue to a threshold value and discarding the audio or visual cue if the audio or visual cue fails to exceed the threshold value. In some embodiments, the media further includes instructions for: a) determining, based on at least one of the set of pertinent sensors and the first set of multimedia contents, a second set of relevant sensors; and b) transmitting a third set of multimedia contents from the second set of relevant sensors to the ESP. In some embodiments, determining the set of relevant sensors further comprises calculating a relevancy score for each multimedia content within the first set of multimedia contents; and selecting the second set of relevant sensors comprises: i) calculating a second relevancy score for each multimedia content within the first set of multimedia contents; and ii) selecting each sensor from the set of pertinent sensors having a multimedia content with a second relevancy score that exceeds a threshold relevancy value as a relevant sensor. In some embodiments, the media further includes instructions for: a) determining that one or more multimedia contents within the second set of multimedia contents is unavailable; and b) selecting the second set of relevant sensors in response to determining that the one or more multimedia contents within the second set of multimedia contents is unavailable. In some embodiments, the emergency alert is received from an electronic device communicatively coupled to a network; and identifying the set of pertinent sensors comprises detecting sensors communicatively coupled to the network. In some embodiments, the emergency alert is received from an electronic device; and identifying the set of pertinent sensors comprises detecting sensors communicatively coupled to the electronic device.

In another aspect, disclosed herein is a computer-implemented system for transmitting multimedia from an electronic device to an emergency service provider (ESP), the system comprising: a) a network server comprising one or more processors; and b) an emergency management system (EMS) executed on the network server and configured to: i) identify an electronic device as being associated with an emergency alert; ii) deliver a multimedia inquiry to the electronic device; iii) receive a confirmation of the multimedia inquiry from the electronic device; iv) determine the emergency service provider (ESP) to receive multimedia from the electronic device based on a location of the electronic device and a geofence system; v) establish a communication link between the electronic device and the ESP; and vi) transmit multimedia content from the electronic device to the ESP via the communication link. In some embodiments, the multimedia content comprises a video feed. In some embodiments, the EMS is configured to transmit the multimedia content from the electronic device to the ESP via the communication link by: a) hosting the video feed at a remote server; and b) providing the ESP with a web link to the video feed hosted on the remote server. In some embodiments, the EMS is configured to identify the electronic device as associated with the emergency alert by autonomously receiving the emergency alert from the electronic device when the electronic device executes an emergency phone call. In some embodiments, the EMS is further configured to: a) display a multimedia access button within an emergency response application executed on a computing device at the ESP; b) establish the communication link between the electronic device and the ESP in response to receiving selection of the multimedia access button; and c) display the multimedia content through the emergency response application. In some embodiments, the EMS is further configured to: a) display a multimedia access button within an emergency response application executed on a computing device at the ESP; b) receive selection of the multimedia access button; and c) deliver the multimedia inquiry to the electronic device in response to receiving the selection of the multimedia access button. In some embodiments, the emergency response application is a web application accessible via a web browser using a URL. In some embodiments, the EMS is configured to identify the electronic device as being associated with the emergency alert by receiving an emergency data request from the ESP, wherein the emergency data request is generated and transmitted by the emergency response application in response to receiving selection of the multimedia access button and wherein the emergency data request comprises an identifier of the electronic device. In some embodiments, the emergency alert is an emergency phone call made from the electronic device and wherein the EMS is configured to identify the electronic device as associated with the emergency alert by autonomously detecting the emergency phone call made by the electronic device. In some embodiments, the EMS is configured to determine the ESP to receive multimedia from the electronic device by: a) retrieving a plurality of geofences associated with a plurality of ESPs including the ESP; and b) determining that the location of the electronic device is within a geofence associated with the ESP. In some embodiments, the EMS is further configured to: a) receive credentials associated with an account of an ESP user through an emergency response application executed on a computing device at the ESP; b) identify an ESP ID associated with the account of the ESP user; and c) determine that the geofence associated with the ESP is associated with the ESP ID. In some embodiments, the multimedia inquiry is an SMS message comprising a web link and wherein confirmation of the multimedia inquiry comprises selection of the web link. In some embodiments, the multimedia inquiry is a push notification and wherein confirmation of the multimedia inquiry comprises selection of the push notification. In some embodiments, the EMS is further configured to: a) sample a connection quality of the transmission of the multimedia content; and b) in response to the connection quality falling below a threshold value, downgrading the multimedia content. In some embodiments: a) the multimedia content comprises a video feed; and b) the video feed is downgraded to image stills or reduced framerate or resolution. In some embodiments: a) the multimedia content comprises a video file; and b) the video file is downgraded to a summarization. In some embodiments: a) the multimedia content comprises an audio feed or audio file; and b) the audio feed or audio file is downgraded to a text transcription. In some embodiments, the EMS is further configured to determine an access level assigned to the electronic device and transmit the multimedia inquiry to the electronic device in response to determining that the EMS does not have permission to access the electronic device based on the access level assigned to the electronic device.

In another aspect, disclosed herein is a method for transmitting multimedia from an electronic device to an emergency service provider (ESP) by an emergency management system (EMS), the method comprising: a) identifying an electronic device associated with an emergency alert; b) delivering a multimedia inquiry to the electronic device; c) receiving a confirmation of the multimedia inquiry from the electronic device; d) determining an emergency service provider (ESP) to receive multimedia from the electronic device using a location of the electronic device and a geofence system; e) establishing a communication link between the electronic device and the ESP; and f) transmitting multimedia content from the electronic device to the ESP via the communication link. In some embodiments, the multimedia content comprises a video feed. In some embodiments, the EMS is configured to transmit the multimedia content from the electronic device to the ESP via the communication link by: a) hosting the video feed at a remote server; and b) providing the ESP with a web link to the video feed hosted on the remote server. In some embodiments, the EMS is configured to identify the electronic device as associated with the emergency alert by autonomously receiving the emergency alert from the electronic device when the electronic device executes an emergency phone call. In some embodiments, the EMS is further configured to: a) display a multimedia access button within an emergency response application executed on a computing device at the ESP; b) establish the communication link between the electronic device and the ESP in response to receiving selection of the multimedia access button; and c) display the multimedia content through the emergency response application. In some embodiments, the EMS is further configured to: a) display a multimedia access button within an emergency response application executed on a computing device at the ESP; b) receive selection of the multimedia access button; and c) deliver the multimedia inquiry to the electronic device in response to receiving the selection of the multimedia access button. In some embodiments, the emergency response application is a web application accessible via a web browser using a URL. In some embodiments, the EMS is configured to identify the electronic device as being associated with the emergency alert by receiving an emergency data request from the ESP, wherein the emergency data request is generated and transmitted by the emergency response application in response to receiving selection of the multimedia access button and wherein the emergency data request comprises an identifier of the electronic device. In some embodiments, the emergency alert is an emergency phone call made from the electronic device and wherein the EMS is configured to identify the electronic device as associated with the emergency alert by autonomously detecting the emergency phone call made by the electronic device. In some embodiments, the EMS is configured to determine the ESP to receive multimedia from the electronic device by: a) retrieving a plurality of geofences associated with a plurality of ESPs including the ESP; and b) determining that the location of the electronic device is within a geofence associated with the ESP. In some embodiments, the EMS is further configured to: a) receive credentials associated with an account of an ESP user through an emergency response application executed on a computing device at the ESP; b) identify an ESP ID associated with the account of the ESP user; and c) determine that the geofence associated with the ESP is associated with the ESP ID. In some embodiments, the multimedia inquiry is an SMS message comprising a web link and wherein confirmation of the multimedia inquiry comprises selection of the web link. In some embodiments, the multimedia inquiry is a push notification and wherein confirmation of the multimedia inquiry comprises selection of the push notification. In some embodiments, the EMS is further configured to: a) sample a connection quality of the transmission of the multimedia content; and b) in response to the connection quality falling below a threshold value, downgrading the multimedia content. In some embodiments: a) the multimedia content comprises a video feed; and b) the video feed is downgraded to image stills or reduced framerate or resolution. In some embodiments: a) the multimedia content comprises a video file; and b) the video file is downgraded to a summarization. In some embodiments: a) the multimedia content comprises an audio feed or audio file; and b) the audio feed or audio file is downgraded to a text transcription. In some embodiments, the EMS is further configured to determine an access level assigned to the electronic device and transmit the multimedia inquiry to the electronic device in response to determining that the EMS does not have permission to access the electronic device based on the access level assigned to the electronic device.

In another aspect, disclosed herein is non-transitory computer readable medium comprising instructions executable by a professor to create an application for transmitting multimedia from an electronic device to an emergency service provider (ESP) by an emergency management system (EMS), the application configured to: i) identify an electronic device as being associated with an emergency alert; ii) deliver a multimedia inquiry to the electronic device; iii) receive a confirmation of the multimedia inquiry from the electronic device; iv) determine the emergency service provider (ESP) to receive multimedia from the electronic device based on a location of the electronic device and a geofence system; v) establish a communication link between the electronic device and the ESP; and vi) transmit multimedia content from the electronic device to the ESP via the communication link. In some embodiments, the multimedia content comprises a video feed. In some embodiments, the EMS is configured to transmit the multimedia content from the electronic device to the ESP via the communication link by: a) hosting the video feed at a remote server; and b) providing the ESP with a web link to the video feed hosted on the remote server. In some embodiments, the EMS is configured to identify the electronic device as associated with the emergency alert by autonomously receiving the emergency alert from the electronic device when the electronic device executes an emergency phone call. In some embodiments, the EMS is further configured to: a) display a multimedia access button within an emergency response application executed on a computing device at the ESP; b) establish the communication link between the electronic device and the ESP in response to receiving selection of the multimedia access button; and c) display the multimedia content through the emergency response application. In some embodiments, the EMS is further configured to: a) display a multimedia access button within an emergency response application executed on a computing device at the ESP; b) receive selection of the multimedia access button; and c) deliver the multimedia inquiry to the electronic device in response to receiving the selection of the multimedia access button. In some embodiments, the emergency response application is a web application accessible via a web browser using a URL. In some embodiments, the EMS is configured to identify the electronic device as being associated with the emergency alert by receiving an emergency data request from the ESP, wherein the emergency data request is generated and transmitted by the emergency response application in response to receiving selection of the multimedia access button and wherein the emergency data request comprises an identifier of the electronic device. In some embodiments, the emergency alert is an emergency phone call made from the electronic device and wherein the EMS is configured to identify the electronic device as associated with the emergency alert by autonomously detecting the emergency phone call made by the electronic device. In some embodiments, the EMS is configured to determine the ESP to receive multimedia from the electronic device by: a) retrieving a plurality of geofences associated with a plurality of ESPs including the ESP; and b) determining that the location of the electronic device is within a geofence associated with the ESP. In some embodiments, the EMS is further configured to: a) receive credentials associated with an account of an ESP user through an emergency response application executed on a computing device at the ESP; b) identify an ESP ID associated with the account of the ESP user; and c) determine that the geofence associated with the ESP is associated with the ESP ID. In some embodiments, the multimedia inquiry is an SMS message comprising a web link and wherein confirmation of the multimedia inquiry comprises selection of the web link. In some embodiments, the multimedia inquiry is a push notification and wherein confirmation of the multimedia inquiry comprises selection of the push notification. In some embodiments, the EMS is further configured to: a) sample a connection quality of the transmission of the multimedia content; and b) in response to the connection quality falling below a threshold value, downgrading the multimedia content. In some embodiments: a) the multimedia content comprises a video feed; and b) the video feed is downgraded to image stills or reduced framerate or resolution. In some embodiments: a) the multimedia content comprises a video file; and b) the video file is downgraded to a summarization. In some embodiments: a) the multimedia content comprises an audio feed or audio file; and b) the audio feed or audio file is downgraded to a text transcription. In some embodiments, the EMS is further configured to determine an access level assigned to the electronic device and transmit the multimedia inquiry to the electronic device in response to determining that the EMS does not have permission to access the electronic device based on the access level assigned to the electronic device.

In another aspect, disclosed herein is a computer-implemented system for transmitting multimedia from an electronic device to an emergency service provider (ESP), the system comprising: a) a network server comprising one or more processors; and b) an emergency management system (EMS) executed on the network server and configured to: a) detect an emergency call made from an electronic device; b) in response to detecting the emergency call made from the electronic device, deliver a multimedia inquiry to the electronic device; c) receive a confirmation of the multimedia inquiry from the electronic device; d) obtain a location of the electronic device; e) determine an emergency service provider (ESP) to receive multimedia from the electronic device based on the location of the electronic device; f) display a multimedia access button within an emergency response application executed on a computing device at the ESP; and g) in response to receiving selection of the multimedia access button, establish a communication link between the electronic device and the ESP and transmit multimedia content from the electronic device to the ESP via the communication link. In some embodiments, the multimedia content comprises a video feed. In some embodiments, the EMS is configured to transmit the multimedia content from the electronic device to the ESP via the communication link by: a) hosting the video feed at a remote server; and b) providing the ESP with a web link to the video feed hosted on the remote server. In some embodiments, the EMS is configured to identify the electronic device as associated with the emergency alert by autonomously receiving the emergency alert from the electronic device when the electronic device executes an emergency phone call. In some embodiments, the EMS is further configured to: a) display a multimedia access button within an emergency response application executed on a computing device at the ESP; b) establish the communication link between the electronic device and the ESP in response to receiving selection of the multimedia access button; and c) display the multimedia content through the emergency response application. In some embodiments, the EMS is further configured to: a) display a multimedia access button within an emergency response application executed on a computing device at the ESP; b) receive selection of the multimedia access button; and c) deliver the multimedia inquiry to the electronic device in response to receiving the selection of the multimedia access button. In some embodiments, the emergency response application is a web application accessible via a web browser using a URL. In some embodiments, the EMS is configured to identify the electronic device as being associated with the emergency alert by receiving an emergency data request from the ESP, wherein the emergency data request is generated and transmitted by the emergency response application in response to receiving selection of the multimedia access button and wherein the emergency data request comprises an identifier of the electronic device. In some embodiments, the emergency alert is an emergency phone call made from the electronic device and wherein the EMS is configured to identify the electronic device as associated with the emergency alert by autonomously detecting the emergency phone call made by the electronic device. In some embodiments, the EMS is configured to determine the ESP to receive multimedia from the electronic device by: a) retrieving a plurality of geofences associated with a plurality of ESPs including the ESP; and b) determining that the location of the electronic device is within a geofence associated with the ESP. In some embodiments, the EMS is further configured to: a) receive credentials associated with an account of an ESP user through an emergency response application executed on a computing device at the ESP; b) identify an ESP ID associated with the account of the ESP user; and c) determine that the geofence associated with the ESP is associated with the ESP ID. In some embodiments, the multimedia inquiry is an SMS message comprising a web link and wherein confirmation of the multimedia inquiry comprises selection of the web link. In some embodiments, the multimedia inquiry is a push notification and wherein confirmation of the multimedia inquiry comprises selection of the push notification. In some embodiments, the EMS is further configured to: a) sample a connection quality of the transmission of the multimedia content; and b) in response to the connection quality falling below a threshold value, downgrading the multimedia content. In some embodiments: a) the multimedia content comprises a video feed; and b) the video feed is downgraded to image stills or reduced framerate or resolution. In some embodiments: a) the multimedia content comprises a video file; and b) the video file is downgraded to a summarization. In some embodiments: a) the multimedia content comprises an audio feed or audio file; and b) the audio feed or audio file is downgraded to a text transcription. In some embodiments, the EMS is further configured to determine an access level assigned to the electronic device and transmit the multimedia inquiry to the electronic device in response to determining that the EMS does not have permission to access the electronic device based on the access level assigned to the electronic device.

In another aspect, disclosed herein is a method for transmitting multimedia from an electronic device to an emergency service provider (ESP) by an emergency management system (EMS), the method comprising: a) detecting an emergency call made from an electronic device; b) in response to detecting the emergency call made from the electronic device, delivering a multimedia inquiry to the electronic device; c) receiving a confirmation of the multimedia inquiry from the electronic device; d) obtaining a location of the electronic device; e) determining an emergency service provider (ESP) to receive multimedia from the electronic device based on the location of the electronic device; f) displaying a multimedia access button within an emergency response application executed on a computing device at the ESP; and g) in response to receiving selection of the multimedia access button, establishing a communication link between the electronic device and the ESP and transmitting multimedia content from the electronic device to the ESP via the communication link. In some embodiments, the multimedia content comprises a video feed. In some embodiments, the EMS is configured to transmit the multimedia content from the electronic device to the ESP via the communication link by: a) hosting the video feed at a remote server; and b) providing the ESP with a web link to the video feed hosted on the remote server. In some embodiments, the EMS is configured to identify the electronic device as associated with the emergency alert by autonomously receiving the emergency alert from the electronic device when the electronic device executes an emergency phone call. In some embodiments, the EMS is further configured to: a) display a multimedia access button within an emergency response application executed on a computing device at the ESP; b) establish the communication link between the electronic device and the ESP in response to receiving selection of the multimedia access button; and c) display the multimedia content through the emergency response application. In some embodiments, the EMS is further configured to: a) display a multimedia access button within an emergency response application executed on a computing device at the ESP; b) receive selection of the multimedia access button; and c) deliver the multimedia inquiry to the electronic device in response to receiving the selection of the multimedia access button. In some embodiments, the emergency response application is a web application accessible via a web browser using a URL. In some embodiments, the EMS is configured to identify the electronic device as being associated with the emergency alert by receiving an emergency data request from the ESP, wherein the emergency data request is generated and transmitted by the emergency response application in response to receiving selection of the multimedia access button and wherein the emergency data request comprises an identifier of the electronic device. In some embodiments, the emergency alert is an emergency phone call made from the electronic device and wherein the EMS is configured to identify the electronic device as associated with the emergency alert by autonomously detecting the emergency phone call made by the electronic device. In some embodiments, the EMS is configured to determine the ESP to receive multimedia from the electronic device by: a) retrieving a plurality of geofences associated with a plurality of ESPs including the ESP; and b) determining that the location of the electronic device is within a geofence associated with the ESP. In some embodiments, the EMS is further configured to: a) receive credentials associated with an account of an ESP user through an emergency response application executed on a computing device at the ESP; b) identify an ESP ID associated with the account of the ESP user; and c) determine that the geofence associated with the ESP is associated with the ESP ID. In some embodiments, the multimedia inquiry is an SMS message comprising a web link and wherein confirmation of the multimedia inquiry comprises selection of the web link. In some embodiments, the multimedia inquiry is a push notification and wherein confirmation of the multimedia inquiry comprises selection of the push notification. In some embodiments, the EMS is further configured to: a) sample a connection quality of the transmission of the multimedia content; and b) in response to the connection quality falling below a threshold value, downgrading the multimedia content. In some embodiments: a) the multimedia content comprises a video feed; and b) the video feed is downgraded to image stills or reduced framerate or resolution. In some embodiments: a) the multimedia content comprises a video file; and b) the video file is downgraded to a summarization. In some embodiments: a) the multimedia content comprises an audio feed or audio file; and b) the audio feed or audio file is downgraded to a text transcription. In some embodiments, the EMS is further configured to determine an access level assigned to the electronic device and transmit the multimedia inquiry to the electronic device in response to determining that the EMS does not have permission to access the electronic device based on the access level assigned to the electronic device.

In another aspect, disclosed herein is non-transitory computer readable medium comprising instructions executable by a processor to create an application for transmitting multimedia from an electronic device to an emergency service provider (ESP) by an emergency management system (EMS), the application configured to: i) detect an emergency call made from an electronic device; ii) in response to detecting the emergency call made from the electronic device, deliver a multimedia inquiry to the electronic device; iii) receive a confirmation of the multimedia inquiry from the electronic device; iv) obtain a location of the electronic device; v) determine an emergency service provider (ESP) to receive multimedia from the electronic device based on the location of the electronic device; vi) display a multimedia access button within an emergency response application executed on a computing device at the ESP; and vii) in response to receiving selection of the multimedia access button, establish a communication link between the electronic device and the ESP and transmit multimedia content from the electronic device to the ESP via the communication link. In some embodiments, the multimedia content comprises a video feed. In some embodiments, the EMS is configured to transmit the multimedia content from the electronic device to the ESP via the communication link by: a) hosting the video feed at a remote server; and b) providing the ESP with a web link to the video feed hosted on the remote server. In some embodiments, the EMS is configured to identify the electronic device as associated with the emergency alert by autonomously receiving the emergency alert from the electronic device when the electronic device executes an emergency phone call. In some embodiments, the EMS is further configured to: a) display a multimedia access button within an emergency response application executed on a computing device at the ESP; b) establish the communication link between the electronic device and the ESP in response to receiving selection of the multimedia access button; and c) display the multimedia content through the emergency response application. In some embodiments, the EMS is further configured to: a) display a multimedia access button within an emergency response application executed on a computing device at the ESP; b) receive selection of the multimedia access button; and c) deliver the multimedia inquiry to the electronic device in response to receiving the selection of the multimedia access button. In some embodiments, the emergency response application is a web application accessible via a web browser using a URL. In some embodiments, the EMS is configured to identify the electronic device as being associated with the emergency alert by receiving an emergency data request from the ESP, wherein the emergency data request is generated and transmitted by the emergency response application in response to receiving selection of the multimedia access button and wherein the emergency data request comprises an identifier of the electronic device. In some embodiments, the emergency alert is an emergency phone call made from the electronic device and wherein the EMS is configured to identify the electronic device as associated with the emergency alert by autonomously detecting the emergency phone call made by the electronic device. In some embodiments, the EMS is configured to determine the ESP to receive multimedia from the electronic device by: a) retrieving a plurality of geofences associated with a plurality of ESPs including the ESP; and b) determining that the location of the electronic device is within a geofence associated with the ESP. In some embodiments, the EMS is further configured to: a) receive credentials associated with an account of an ESP user through an emergency response application executed on a computing device at the ESP; b) identify an ESP ID associated with the account of the ESP user; and c) determine that the geofence associated with the ESP is associated with the ESP ID. In some embodiments, the multimedia inquiry is an SMS message comprising a web link and wherein confirmation of the multimedia inquiry comprises selection of the web link. In some embodiments, the multimedia inquiry is a push notification and wherein confirmation of the multimedia inquiry comprises selection of the push notification. In some embodiments, the EMS is further configured to: a) sample a connection quality of the transmission of the multimedia content; and b) in response to the connection quality falling below a threshold value, downgrading the multimedia content. In some embodiments: a) the multimedia content comprises a video feed; and b) the video feed is downgraded to image stills or reduced framerate or resolution. In some embodiments: a) the multimedia content comprises a video file; and b) the video file is downgraded to a summarization. In some embodiments: a) the multimedia content comprises an audio feed or audio file; and b) the audio feed or audio file is downgraded to a text transcription. In some embodiments, the EMS is further configured to determine an access level assigned to the electronic device and transmit the multimedia inquiry to the electronic device in response to determining that the EMS does not have permission to access the electronic device based on the access level assigned to the electronic device.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 8 depicts multimedia summarizations in accordance with one embodiment of the present disclosure;

DETAILED DESCRIPTION

Figure 1A:
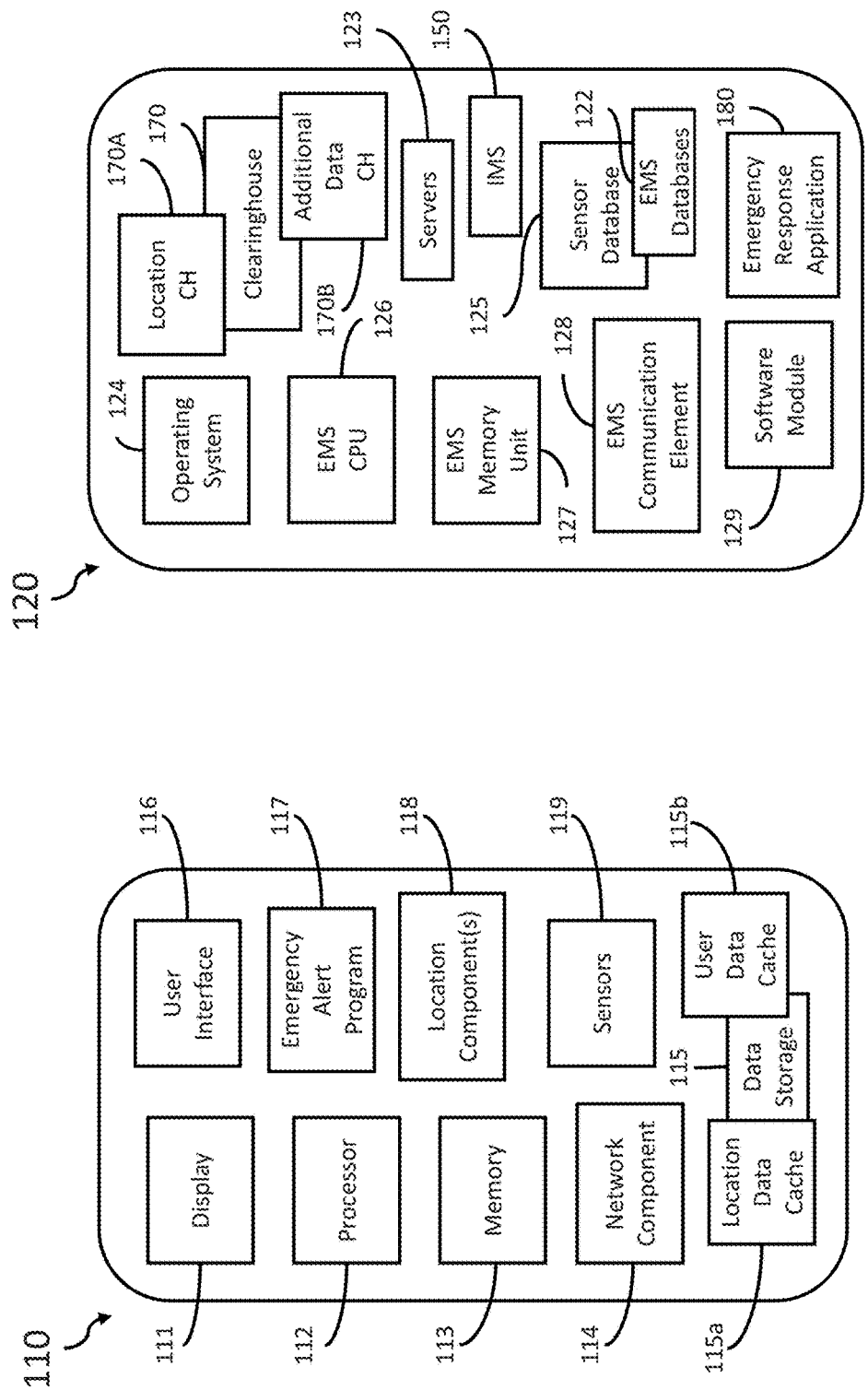
FIG. 1A depicts diagrams of (i) an electronic device, (ii) an emergency management system (EMS) in accordance with one embodiment of the present disclosure.

In certain embodiments, disclosed herein are devices, systems, and methods for managing emergency data for emergency response. FIG. 1A depicts diagrams of (i) an electronic device 110 and (ii) an emergency management system (EMS) 120 in accordance with one embodiment of the present disclosure. In some embodiments, the electronic device 110 is a digital processing device such as a communication device (e.g., mobile or cellular phone, computer, laptop, etc.). In some embodiments, the electronic device is a wearable device (e.g., a smartwatch). In some embodiments, the electronic device is an Internet of Things (IoT) device, such as a home assistant (e.g., an Amazon Echo) or a connected smoke detector (e.g., a Nest Protect smoke and carbon monoxide alarm). In some embodiments, the electronic device is a walkie-talkie or two-way radio.

In some embodiments, the electronic device 110 includes a display 111, a processor 112, a memory 113 (e.g., an EPROM memory, a RAM, or a solid-state memory), and several optional components such as one or more network component(s) 114 (e.g., an antenna and associated components, Wi-Fi adapters, Bluetooth adapters, etc.), a data storage 115, a user interface 116, a computer program such as an emergency alert program 117, one or more location components 118, and one or more sensors 119. In some embodiments, the processor 112 is implemented as one or more microprocessors, microcomputers, microcontrollers, digital signal processors, central processing units, state machines, logic circuitries, and/or devices that manipulate signals based on operational instructions. Among other capabilities, the processor 112 is configured to fetch and execute computer-readable instructions stored in the memory 113.

In some embodiments, the display 111 is part of the user interface 116 (e.g., a touchscreen is both a display and a user interface in that it provides an interface to receive user input or user interactions). In some embodiments, the user interface 116 includes physical buttons such as an on/off button or volume buttons. In some embodiments, the display 111 and/or the user interface 116 comprises a touchscreen (e.g., a capacitive touchscreen), which is capable of displaying information and receiving user input. In some embodiments, the user interface 116 does not include a touchscreen, but comprises one or more physical buttons and/or a microphone. In some embodiments, the display 111 does not include a touchscreen, but comprises one or more lights, indicators, and/or lighted buttons.

In some embodiments, the electronic device 110 includes various accessories that allow for additional functionality. In some embodiments, these accessories (not shown) include one or more of the following: a microphone, a camera, speaker, a fingerprint scanner/reader, health or environmental sensors, a USB or micro-USB port, a headphone jack, a card reader, a SIM card slot, or any combination thereof. In some embodiments, the one or more sensors include, but are not limited to: a gyroscope, an accelerometer, a thermometer, a heart rate sensor, a barometer, or a hematology analyzer. In some embodiments, the data storage 115 includes a location data cache 115a and a user data cache 115b. In some embodiments, the location data cache 115a is configured to store locations generated by the one or more location components 118.

In some embodiments, the computer program 117 is an emergency response application or emergency response mobile application. In some embodiments, the computer program 117 is configured to record user data, such as a name, address, or medical data of a user associated with the electronic device 110. In some embodiments, the computer program 117 is an emergency alert program configured to detect an emergency from the electronic device 110 (e.g., when a user 100 (not shown) uses the electronic device 110 to make an emergency call). In some embodiments, the user 100 initiates the emergency alert by interacting with the user interface 116. In some embodiments, the emergency is detected by one or more sensors (built in or peripheral to the device 110). In some embodiments, in response to detecting an emergency request for assistance (e.g., a native dial 9-1-1 call) generated or sent by the electronic device 110, the computer program is configured to deliver a notification to the EMS 120. In some embodiments, the notification is an HTTP post containing information regarding the emergency request. In some embodiments, the notification includes a location (e.g., a device-based hybrid location) generated by or for the electronic device 110. In some embodiments, in response to detecting an emergency request generated or sent by the electronic device 110, the computer program is configured to deliver user data to the emergency management system (EMS) 120.

In some embodiments, as depicted in FIG. 1A, the emergency management system (EMS) 120 includes an EMS operating system 124, an EMS CPU 126, an EMS memory unit 127, and an EMS communication element 128. In some embodiments, the EMS CPU 126 is implemented as one or more microprocessors, microcomputers, microcontrollers, digital signal processors, central processing units, state machines, logic circuitries, and/or devices that manipulate signals based on operational instructions. Among other capabilities, the EMS CPU 126 is configured to fetch and execute computer-readable instructions stored in the EMS memory unit 127. The EMS memory unit 127 optionally includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The EMS memory unit 127 optionally includes modules, routines, programs, objects, components, data structures, etc., which perform particular tasks or implement particular abstract data types.

In some embodiments, the EMS 120 includes one or more EMS databases 122, one or more servers 123, and an intelligent multimedia system 150. In some embodiments, the EMS 120 includes an emergency response application 180. In some embodiments, the intelligent multimedia system 150, as described in further detail below, comprises an input/output (I/O) interface configured to manage communications and data transfers to and from the EMS 120 and external systems and devices. In some embodiments, the intelligent multimedia system 150 includes a variety of software and hardware interfaces, for example, a web interface, a graphical user interface (GUI), and the like. In some embodiments, the EMS 120 includes one or more software modules 129. The intelligent multimedia system 150 optionally enables the EMS 120 to communicate with other computing devices, such as web servers and external data servers (not shown). In some embodiments, the intelligent multimedia system 150 facilitates multiple communications within a wide variety of networks and protocol types, including wired networks, for example, LAN, cable, etc., and wireless networks, such as WLAN, cellular, or satellite. In some embodiments, the intelligent multimedia system 150 includes one or more ports for connecting a number of devices to one another or to another server.

Figure 1B:
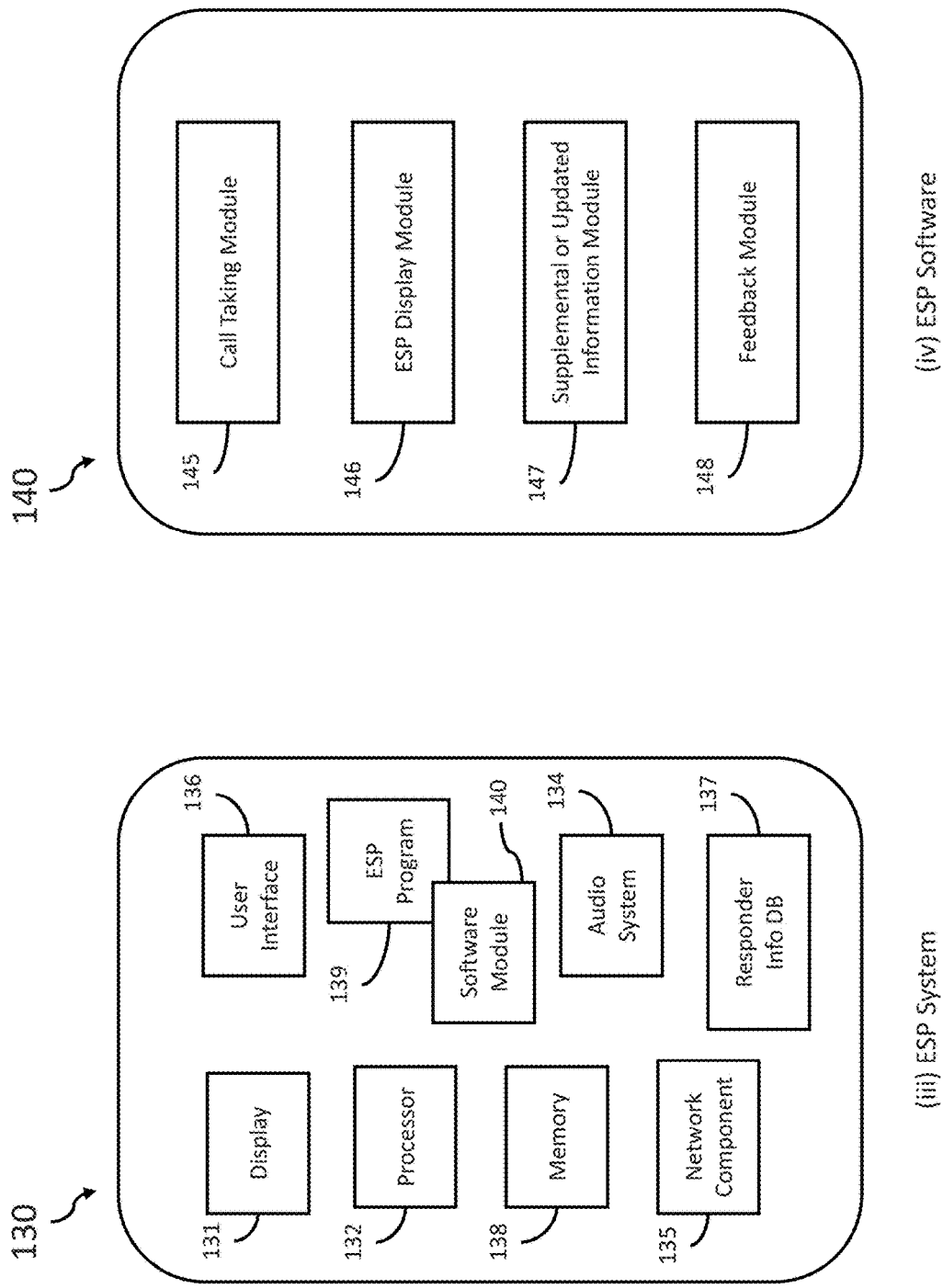
FIG. 1B depicts diagrams of (iii) an emergency service provider (ESP) system and (iv) ESP software in accordance with one embodiment of the present disclosure.

In some embodiments, as depicted in FIG. 1B, an ESP is an emergency service provider (ESP) system 130 includes one or more of a display 131, a processor 132, a memory 138, a user interface 136, at least one central processing unit or processor 132, a network component 135, an audio system 134 (e.g., microphone, speaker and/or a call-taking headset), and a computer program such as a ESP application or ESP program 139. In some embodiments, the ESP application or program 139 comprises one or more software modules 140. In some embodiments, the ESP system 130 comprises a database of emergency responders 137, such as medical assets, police assets, fire response assets, rescue assets, safety assets, etc.

In some embodiments, as depicted in FIG. 1B, the ESP application or program 139 installed on an ESP system 130 comprises at least one software module 140 such as a call taking module 145 (e.g., a computer aided dispatch system), an ESP display module 146, a supplemental or updated information module 147, a feedback module 148 (for ESP users to request specific type of data), or a combination thereof. In some embodiments, the ESP application 139 displays the information on a map (e.g., on the display 131). In some embodiments, the location feedback module 148 is configured to provide feedback from the ESP 130 to the EMS, as described below. In some embodiments, location and supplemental information is displayed for other emergency response providers (e.g., police, fire, medical, etc.) and/or responders on their devices. It is contemplated that responder devices have optionally installed a responder device program (not shown) similar to ESP display module 146. In some embodiments, the responder device program displays the emergency location on a map.

Emergency Clearinghouse

In some embodiments, as depicted by FIG. 1A, the emergency management system (EMS) 120 includes a clearinghouse 170 (also referred to as an "Emergency Clearinghouse") for storing and retrieving emergency data. In some embodiments, the clearinghouse 170 includes a location clearinghouse 170A and an additional data clearinghouse 170B. In some embodiments, the location clearinghouse 170A includes a location ingestion module and a location retrieval module, as described below with respect to FIG. 2. In some embodiments, the additional data clearinghouse 170B includes an additional data ingestion module and an additional data retrieval module, as described below with respect to FIG. 2. In other embodiments, additional data and location data (hereinafter "emergency data") are stored in one or more databases in a distributed manner. In some embodiments, the emergency data is stored in an external or third-party server that is accessible to the EMS 120. The clearinghouse 170 optionally functions as an interface that receives and stores emergency data from electronic or communication devices that are then retrieved, transmitted, and/or distributed to recipients (e.g., emergency personnel) before, during, or after emergencies. As described above, the clearinghouse optionally receives emergency data from electronic or communication devices such as mobile phones, wearable devices, laptop or desktop computers, personal assistants, intelligent vehicle systems, home security systems, IoT devices, camera feeds, and other sources. As described above and below, emergency data optionally includes locations or additional data such as medical history, personal information, or contact information. In some embodiments, during an emergency, the clearinghouse 170 detects the emergency and/or otherwise identifies the need to provide emergency data pertaining to the emergency. The clearinghouse 170 then identifies any emergency data pertaining to the emergency stored within the clearinghouse 170 and transmits the pertinent emergency data to the requesting ESP. Accordingly, in some embodiments, the clearinghouse 170 acts as a data pipeline that automatically pushes emergency data to the ESP that would otherwise be without access to emergency data that is critical to most effectively and efficiently responding to an emergency. Accordingly, location data stored within the clearinghouse 170 allows emergency responders to arrive at the scene of an emergency faster, and additional data stored within the clearinghouse 170 allows emergency responders to be better prepared for the emergencies they face.

For example, in one embodiment, an emergency alert is triggered by an electronic device 110 (e.g., by pressing a soft button, a physical button, voice command, or gesture) or autonomously based on sensor data (e.g., smoke alarms). In this example, the user then confirms the emergency and/or provides authorization for sending the emergency alert. Emergency data, such as an enhanced location and additional data regarding the user (e.g., the user's medical history) is delivered by the electronic device 110 to the EMS 120 and stored in the clearinghouse 170 (e.g., in the location clearinghouse 170A and the additional data clearinghouse 170B). In some embodiments, the EMS 120 or clearinghouse 170 formats the emergency data into a format that is compatible with industry standards for storing and sharing emergency data. For example, the emergency data is formatted to be compatible with National Emergency Number Association (NENA) standards. In some embodiments, the clearinghouse 170 transmits the emergency data to a receiving party in response to receiving a query from the receiving party, as described below. In some embodiments, the clearinghouse 170 automatically pushes the emergency data to a receiving party such as the PSAP. For example, in some embodiments, the emergency management system automatically pushes the emergency data to a receiving party using a subscription system, as described below.

In some embodiments, as mentioned above, a requesting party (such as a PSAP responding to an emergency alert) queries the clearinghouse 170 with an emergency data request (such as a HTTP GET request). In some embodiments, the emergency data request is in the form of the Location Information Server (LIS) protocol. In response to the emergency data request, the EMS 120 or clearinghouse 170 sends an appropriate response including relevant emergency data to the requesting party via an encrypted pathway. In some embodiments, the emergency data request is in the form of HTTP-Enabled Location Delivery (HELD) and the response from the EMS 120 or clearinghouse 170 is in the form of Presence Information Data Format Location Object (PIDF-LO). In some embodiments, the emergency data request includes an authorization code (also referred to as an "authorization token" or "temporary access token") in the body, header, or metadata of the request, and the EMS 120 checks that the authorization code is active before providing a response to the requesting party. In some embodiments, authorization is provided in the "Authorization" header of the emergency data request using HTTP Basic Authentication. For example, in some embodiments, authorization is base64-encoded user name and password for an account associated with the requesting party. In some embodiments, emergency data requests are sent over public networks using API access keys or credentials. In some embodiments, Transport Layer Security (TLS) is used in the requests and responses from the EMS 120 for encryption security. In some embodiments, the call taking module 145 includes a call-handling application, which is provided by a third-party vendor. In some embodiments, an ESP personnel interacts with the call-handling application to send an emergency data request to the EMS 120. In some embodiments, the response from the EMS 120 is displayed at the ESP display 131.

In some embodiments, as described above, emergency data includes locations and additional data. In some embodiments, emergency data includes one or more emergency data categories (also referred to as "data categories"). In some embodiments, the emergency data categories include: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments. In some embodiments, emergency data categories are tagged with tags for specific types of data such as "demographics" or "medical data." For example, in some embodiments, gender, height, weight, ethnicity, profile picture (image-url) are tagged as demographic data. In some embodiments, medical data protected under HIPAA and other laws are tagged as "HIPAA" or "private." In some embodiments, medical data includes information on one or more of allergies, medical condition(s) or illness(es), medication(s), disabilities, blood type, medical note(s), and other medical information. In some embodiments, medical information protected under HIPAA are encrypted and/or anonymized. In some embodiments, some data are tagged as "general" or another similar tag, wherein access is not specifically restricted.

An example of an additional data communication from the EMS 120 in a standard format compatible with industry standards, PIDF-LO, is shown below.

HTTP/1.1 200 OK
Date: Tue, 1 Dec. 2016 23:27:30 GMT
Content-Length: 489
Content-Type: application/EmergencyCallData.Device-Info+xml
<dev:EmergencyCallData.DeviceInfo
xmlns:dev="urn:ietf:params:xml:ns:EmergencyCall-Data:DeviceInfo">
<dev:
DataProviderReference>d4b3072df201409182208075@example.org In some embodiments, when the emergency data is stored at a third-party server and receives a request for emergency data from the EMS 120, as a database query, the third-party server formats the requested emergency data and stores this information in an alternate database, and forwards either a response or a reference to the alternate database for accessing the emergency data requested by the EMS 120, which is provided to the ESP 130 over a hybrid analog and/or a data communication channel, depending on the capabilities of ESP 130. In some embodiments, the third-party server stores the emergency data, requested by the EMS 120 or directly by the ESP 130, in the alternate database for a certain period of time after receiving the request for the emergency data regarding a user and any electronic devices 110. In some embodiments, this period of time is a timer value (e.g., a timer countdown or a set time point) defined by the EMS 120 and the third-party server in conjunction with each other prior to the addition of the requested emergency data to the alternate database at the third-party server. In some embodiments, once the timer value has passed and no new requests for the emergency data pertaining to the particular user and the electronic device 110, or other devices associated with the user, are received by the third-party server, then the third-party server marks the particular alternate database entries to be deleted and waits for another, different, time-out interval. In some embodiments, once this particular second time-out interval has also been completed and no new requests for location data for the particular user or associated electronic devices 110 are received by the third-party server, the third-party server removes the specific marked entries from the alternate database in the next cycle of updates for the alternate database. In some embodiments, after adding the emergency data in the alternate database by the third-party server, the third-party server keeps updating the emergency data in the alternate database on a periodic, or as-needed basis, for the purpose of keeping the emergency data about the user or electronic device 110 current for providing the most recent and accurate emergency data to the EMS 120 and the ESP 130 for the purposes of responding to a request for emergency assistance. In some embodiments, the third-party server is updated by the EMS 120 for all the emergency data pertaining to all users and their associated electronic devices 110 that are served by the EMS 120 at any current time.

In some non-emergency situations, there is a need to access location data, user data, emergency data or sensor data. For example, in some embodiments, a user of an electronic device 110 grants authorization to family members to access location data for the user. Accordingly, when a family member requests location data for a user, access is granted if there is proper authorization. As another example, in some embodiments, a taxi operations company requests and obtains location data of one or more fleet members to keep track of its vehicles (e.g., via onboard vehicle console or terminal).

Various embodiments and applications of the clearinghouse 170 are described in detail herein. However, the embodiments and applications described herein should not be considered exhaustive or limiting in any way.

Figure 2:
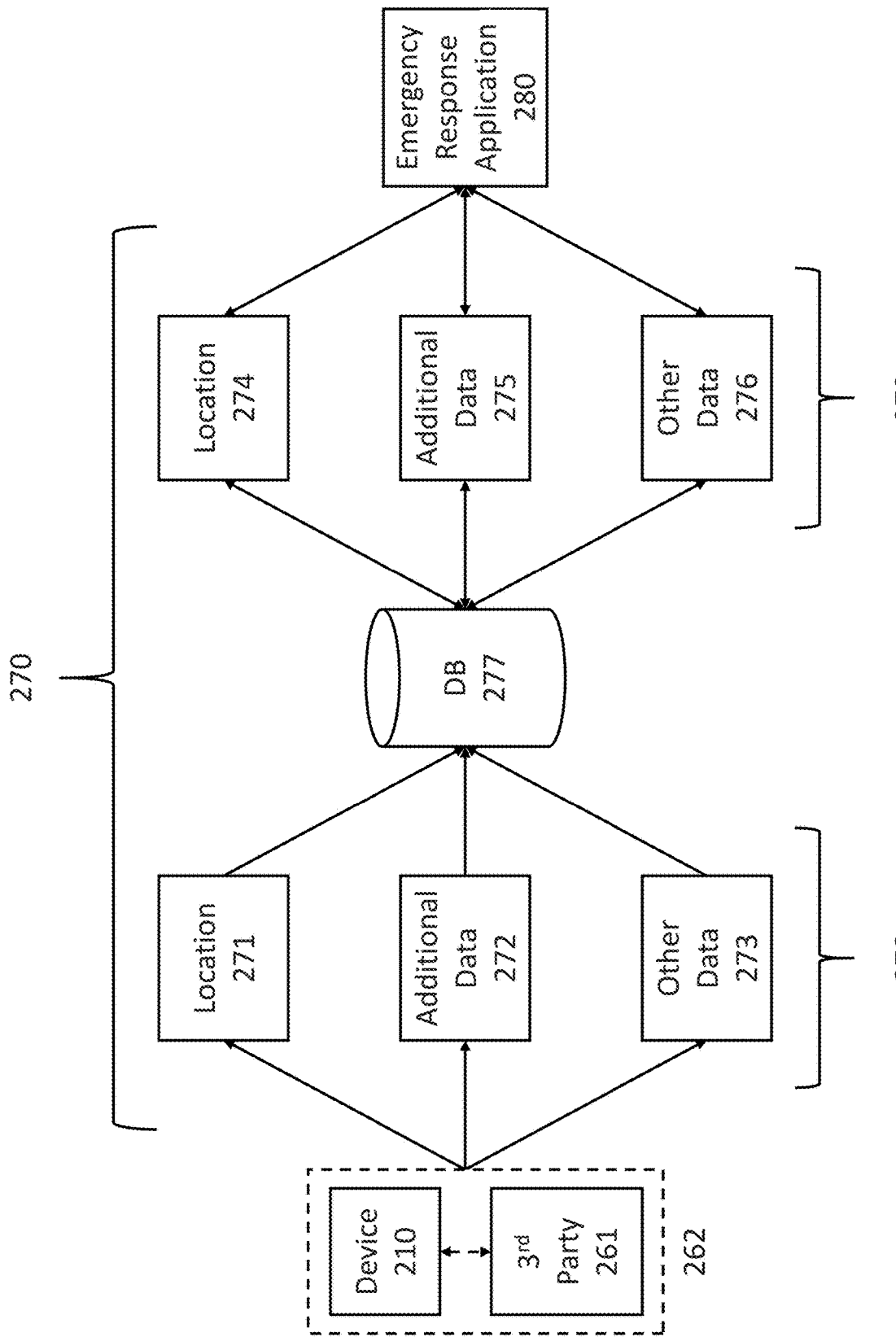
FIG. 2 depicts a diagram of a clearinghouse for emergency data in accordance within one embodiment of the present disclosure.

FIG. 2 depicts an embodiment of an Emergency Clearinghouse 270 for storing and retrieving emergency data. In some embodiments, the clearinghouse 270 includes a set of ingestion modules 278 (also referred to as "ingestion modules") and a set of retrieval modules 279 (also referred to as "retrieval modules"). The set of ingestion modules 278 is configured to receive various forms of emergency data from various emergency data sources 262, such as an electronic device 210 or a third-party server system 261 (hereinafter, "third-party server"). In some embodiments, an electronic device 210 is a communication device (e.g., a mobile phone), a wearable device (e.g., a smartwatch), or an internet of things (IoT) device (e.g., a smart speaker) that can communicate with one or more of the ingestion modules within the set of ingestion modules 278. In some embodiments, a third-party server 261 stores data that is not generated by or stored within an electronic device. For example, in some embodiments, a third-party server includes a database of static medical information that can be sent to the clearinghouse during an emergency. In some embodiments, when the emergency management system 120 detects an emergency (e.g., when a person calls 9-1-1), the clearinghouse can query an emergency data source 262 for emergency data regarding the emergency. For example, in some embodiments, in response to detecting a 9-1-1 call made from a mobile phone, the additional data ingestion module 272 (as described below) sends a query including the phone number of the mobile phone to a third-party server 261 that stores static medical information. The third-party server 261 can then return any available medical information associated with the phone number of the mobile phone to the additional data ingestion module. In some embodiments, multiple ingestion modules within the set of ingestion modules can receive emergency data for a single emergency. For example, in some embodiments, when a person calls 9-1-1 from a mobile phone, the mobile phone can send a device-based hybrid location to the location ingestion module 271 (as described below) and demographic data (as described above) to the additional data ingestion module 272. In some embodiments, the clearinghouse can receive emergency data from multiple emergency data sources 262 for a single emergency. For example, in some embodiments, when a person calls 9-1-1 from a mobile phone, the clearinghouse can receive a location from the mobile phone (such as through the location ingestion module 271) and a heartrate from a smartwatch that the person is wearing (such as through additional data ingestion module 272). Or for example, in some embodiments, when a person calls 9-1-1 from a mobile phone, the clearinghouse can receive a location from the mobile phone and medical information associated with the person from a third-party server 261.

The set of ingestion modules 278 optionally include a location ingestion module 271, an additional data ingestion module 272, and one or more other data ingestion modules 273. In some embodiments, the location ingestion module 271 is an emergency location service ingestion interface for posting or receiving emergency locations. In some embodiments, the location ingestion module 271 is a REST API that receives an HTTP POST including location data when an emergency alert is generated (e.g., when an emergency call is made from a cell phone). The location data includes a location generated concurrently or in response to the generation of the emergency alert. In some embodiments, the location data includes a location generated before the emergency alert. For example, when an emergency call is made from a cell phone, thereby generating an emergency alert, the location ingestion module 271 receives a location recently generated by the phone but before the emergency alert was generated, ensuring that a location for the emergency is available as quickly as possible. In some embodiments, the location data includes a device-based hybrid location generated by an electronic device 210 that generated the emergency alert. In some embodiments, the location data includes a location generated by a second electronic device communicatively coupled to the electronic device that generated the emergency alert. The location ingestion module 271 is integrated into an electronic device 210 through a mobile application installed on the device 210 or integrated into the firmware or operating system of the electronic device 210.

In some embodiments, the location data is generated by the electronic device 210 before the emergency and is accessible to a PSAP during an emergency. For example, a taxi company may have software that transmits the location of its cars or assets to the emergency clearinghouse 270 preemptively. Thus, when an emergency arises, the location of the affected taxi can be made accessible quicker to send help. In some embodiments, the location data is generated by the electronic device 210 after the emergency has commenced and is made accessible to a PSAP during the on-going emergency. For example, updated location data of a hijacked taxi is also periodically transmitted to the emergency clearinghouse 270 and made accessible to a PSAP.

In some embodiments, the additional data ingestion module 272 is an interface for posting or receiving static or dynamic emergency profile data (hereinafter, "additional data" or "additional information"). In some embodiments, additional data comprises medical data, personal data, demographic data, health data, or any combination thereof. Examples of medical data include information relating to a person's medical history, such as past surgeries or preexisting conditions. Examples of personal data include a person's name, date of birth, height, weight, occupation, address(es) (e.g., home address, work address, etc.), spoken languages, and other personal information. Examples of demographic data include a person's gender, ethnicity, age, etc. Examples of health data include information such as a person's blood type or heartrate. In some embodiments, additional data comprises data received from connected devices such as vehicles, IoT devices, and wearable devices. For example, some intelligent vehicle systems generate and send data regarding a crash, such as the speed at which the vehicle was moving just before the collision, where the vehicle was struck, the number of occupants, etc. In some embodiments, the additional data ingestion module 272 is a REST API (e.g., a JSON (JavaScript Object Notation) REST API). For example, in some embodiments, when an emergency call is made from a cell phone, thereby generating an emergency alert, the cell phone receives a heartrate of the person who made the emergency call from a smartwatch worn by the person and communicatively coupled to the cell phone (e.g., Wi-Fi or Bluetooth connectivity). The cell phone sends the heartrate to the additional data ingestion module 272, along with any other additional data, in an HTTP POST. In some embodiments, the additional data ingestion module 272 is integrated into an electronic device 210 through a mobile application installed on the device 210 or integrated into the firmware or operating system of the electronic device 210. In some embodiments, additional data is sent to the additional data ingestion module 272 from a network server. The additional data ingestion module 272 is accessed by any connected platform that receives data that might be relevant in an emergency. Connected platforms optionally send additional data to the additional data ingestion module 272 at any time. For example, in some embodiments, a website, web application, or mobile application integrated with the additional data ingestion module 272 that allows users to create profiles sends additional data included in the profiles to the additional data ingestion module 272 every time a profile is created or updated.

In some embodiments, the set of ingestion modules 278 includes one or more other data ingestion modules 273. Another data ingestion module 273 is optionally an interface for posting or receiving data relevant to emergencies that is not received by the location ingestion module 271 or the additional data ingestion module 272. In some embodiments, the other data ingestion module 273 receives audio or video streams during an emergency from electronic or communication devices associated with the emergency or proximal to the emergency. For example, an emergency alert is generated by an intelligent vehicle system installed in a vehicle in response to the vehicle experiencing a collision. In this example, the emergency alert is sent to the EMS 120 by the intelligent vehicle system or by an electronic device communicatively coupled to the intelligent vehicle system, such as a cell phone coupled to the intelligent vehicle system via Bluetooth. In response to generating the emergency alert, the intelligent vehicle system additionally begins streaming audio and video from microphones and cameras installed inside or outside of the vehicle to the clearinghouse 270 through the other data ingestion module 273. A cell phone communicatively coupled to the intelligent vehicle system additionally or alternatively streams audio or video from microphones and cameras integrated into the cell phone to the clearinghouse 270 through the other data ingestion module 273. In some embodiments, the one or more other data ingestion modules 273 are REST APIs that are accessed with an HTTP POST.

After receiving the relevant data, the set of ingestion modules 278 can store the data in one or more clearinghouse databases 277. For example, in some embodiments, the clearinghouse databases 277 include a location database and an additional data database. In some embodiments, as described above, the one or more clearinghouse databases 277 are stored on a third-party server communicatively coupled to or otherwise accessible by the EMS 120. In some embodiments, the set of ingestion modules 278 tags or otherwise associates the data received by the modules with an identifier of a user or device associated with the data. For example, the set of ingestions modules 278 tag the data the received by the modules with a user ID number, an email address, or a phone number (e.g., caller ID). In some embodiments, the ingestion modules 278 tag the data received by the clearinghouse 270 based on the data source (e.g., device name or type, application name, user name, phone number, corporate account, etc.).

In some embodiments, the emergency data maintained by the clearinghouse is purged. In some embodiments, the data is purged on a regular or periodic basis. In some embodiments, data that is older than a defined threshold is purged. In some embodiments, different data types are purged according to different schedules and/or thresholds. For example, dynamic data (e.g., data that is subject to constant or regular change) such as location data may be more likely to become out-of-date over time and so may be purged more frequently than static data such as a permanent home address, which may remain permanently in the database until it is replaced with an updated address.

In some embodiments, an individual or group of individuals are associated with multiple identifiers. For example, the location ingestion module 271 receives a location generated by a phone associated with the phone number+1-555-555-5555, associated with John Doe. The additional data ingestion module 272 also receives a heartrate from a smartwatch associated with the email address johndoe@email.com, also associated with John Doe. In this example, the set of ingestion modules 278 tag the location with the phone number "+1-555-555-5555," tag the heartrate with the email address "johndoe@email.com," and associate both the location and the heartrate with John Doe in the clearinghouse databases 277.

In some embodiments, as depicted in FIG. 2, the clearinghouse 270 includes a set of retrieval modules 279. The set of retrieval modules 279 optionally include a location retrieval module 274, an additional data retrieval module 275, and one or more other data retrieval modules 276. In some embodiments, the location retrieval module 274 is an interface for retrieving location data from the clearinghouse databases 277. In some embodiments, the location retrieval module 274 is a JSON REST API that receives a query or request (e.g., in the form of an HTTP GET request) from a requesting party, such as an ESP. In some embodiments, the request is sent from a call-taking application (e.g., call taking module 145) integrated into the ESP system 130. In some embodiments, the request (also referred to as an "emergency data request") is sent from an emergency response application 260. In some embodiments, the location retrieval module 274 provides a single GET endpoint for retrieving either the latest or paginated list of locations for a specific caller ID (e.g., an identifier of a user or an electronic device associated with a user, such as a phone number). For example, as described above, a phone number associated with a device 210 from which a location was received is included in the header, body, or metadata of the request sent to the location retrieval module 274. The clearinghouse 270 then retrieves a location or set of locations from the clearinghouse databases 277 and delivers the location or set of locations to the requesting party. In some embodiments, the location retrieval module 274 is a location information server (LIS). In some embodiments, the LIS is a NG911 standards-based XML API for the retrieval of location data from the clearinghouse databases 277. In some embodiments, as described above, the location retrieval module 274 accepts HELD requests from requesting parties and returns location data for a specific caller ID or anonymous reference. However, in some embodiments, the location retrieval module 274 automatically retrieves and transmits location data using a subscription system, as described below.

As depicted in FIG. 2, the set of retrieval modules 279 optionally include an additional data retrieval module 275. In some embodiments, the additional data retrieval module 275 is a JSON REST API for the retrieval of emergency or additional data. As described above, additional data optionally includes medical data, personal data, demographic data, and health data. Additional data also optionally includes data received from connected devices such as vehicles, IoT devices, and wearable devices. In some embodiments, the additional data retrieval module 275 receives a query or request (e.g., in the form of an HTTP GET request) from a requesting party, such as an ESP. In some embodiments, the request (also referred to as an "emergency data request") is sent from an emergency response application 280. The additional data then retrieves additional data associated with a specific or particular identifier of a user or an electronic device associated with the user, such as a phone number, and returns the data to the requesting party. In some embodiments, the set of retrieval modules 279 further includes one or more other data retrieval modules 276, which function similarly to the location retrieval module 274 and additional data retrieval module 275, for the retrieval of data stored in the clearinghouse databases 277 not retrieved by the location retrieval module 274 or additional data retrieval module 275. However, in some embodiments, the additional data retrieval module 275 automatically retrieves and transmits additional data using a subscription system, as described below.

In some embodiments, a retrieval module within the set of retrieval modules 279 and a corresponding ingestion module within the set of ingestion modules 278 form a sub-clearinghouse. For example, in some embodiments, location ingestion module 271 and location retrieval module 274 combine to form location clearinghouse 170A (as shown in FIG. 1B). Likewise, in some embodiments, additional data ingestion module 272 and additional data retrieval module 275 combine to form additional data clearinghouse 170B. In some embodiments, a requesting party is only given access to a particular sub-clearinghouse. For example, a police officer is only given access to the location clearinghouse 170A, while an EMT (emergency medical technician) is only given access to the additional data clearinghouse 170B. However, a requesting party is given differential access to the clearinghouse 170, sub-clearinghouses, or particular emergency data categories within the clearinghouse 170 based on any factor or set of factors. In some embodiments, a requesting party initiates a query or request (e.g., an emergency data request) using an emergency response application 260 (as described below), which in turn generates the query and transmits the query to the clearinghouse 270.

Emergency Data Subscription System

As described above, in some embodiments, an emergency management system (EMS) maintains a clearinghouse 270 that obtains and shares emergency data to aid emergency service providers (ESPs) in responding to emergencies. During an emergency, in some embodiments, an ESP can send an emergency data request to the EMS through the emergency response application 260, and, in response, the EMS can send any available emergency data associated with the emergency back to the emergency response application 280. In some embodiments, as described above, the emergency response application 280 includes an identifier associated with an emergency alert in the emergency data request. The EMS can then use the identifier associated with the emergency alert to retrieve emergency data associated with the emergency alert from the clearinghouse. For example, as described above, an ESP 230 (e.g., a public safety answering point (PSAP)) can receive an emergency alert in the form of a 9-1-1 phone call (representative of an emergency or potential emergency) from a mobile phone associated with a phone number (e.g., (555) 555-5555). The ESP 230 can then send an emergency data request including the phone number (e.g., the identifier of the emergency alert) to the EMS, which can then retrieve any emergency data within the clearinghouse associated with the phone number and return the available emergency data to the requesting ESP 230. This process of returning emergency data to the emergency response application 280 in response to an emergency data request is referred to as "pulling" emergency data from the clearinghouse.

However, in some embodiments, the EMS can "push" emergency data from the clearinghouse 270 to the emergency response application (e.g., the EMS can send emergency data to the emergency response application 280 without receiving an emergency data request). In some embodiments, the EMS pushes emergency data to the emergency response application 280 using an emergency data subscription system. Using the emergency data subscription, a recipient (or potential recipient) of emergency data from the clearinghouse 270 can subscribe to the clearinghouse 270 for a particular device identifier, user identifier, or ESP account (hereinafter, "subscription"). After subscribing to a subscription, the recipient (e.g., an ESP) may automatically receive updates regarding the subscription without first sending an emergency data request. For example, in some embodiments, if an ESP subscribes to a phone number, whenever the clearinghouse 270 receives updated emergency data associated with the phone number, the clearinghouse 270 can automatically send the updated emergency data associated with the phone number to the ESP (e.g., through the emergency response application 280), without first receiving an emergency data request including the phone number. For example, in some embodiments, if a recipient is subscribed to a particular phone number, and the clearinghouse 270 receives a new or updated location associated with the particular phone number, the clearinghouse 270 will instantly and automatically push the new or updated location associated with the particular phone number to the recipient the moment that the new or updated location is received by the clearinghouse 270, without the recipient having to send an emergency data request. In some embodiments, when an ESP or ESP personnel accesses the emergency response application 280 at a computing device associated with the ESP or ESP personnel, the EMS establishes a websocket connection with the computing device in order to push emergency data regarding a subscription to which the ESP or ESP personnel is subscribed to the emergency response application 280. WebSocket is a type of computer communications protocol. A websocket connection is a longstanding internet connection between a client and a server that allows for bidirectional communication between the client and server without the client needing to send data requests to the server, which differentiates the WebSocket computer communications protocol from other types of computer communications protocols such as the HyperTextual Transfer Protocol (HTTP). The WebSocket protocol is often used by chat clients to facilitate user to user webchats. In some embodiments, the EMS establishes a websocket connection with a computing device (e.g., an ESP console 130) in response to receiving an emergency data request. In some embodiments, the EMS establishes a websocket connection with an ESP console when an ESP personnel logs into the emergency response application 280 at the ESP console. In some embodiments, the EMS establishes a websocket connection with a responder device when an ESP personnel logs into the emergency response application 280 at the responder device. In some embodiments a websocket connection established between the EMS and a computing device associated with ESP personnel is maintained by the EMS for the duration of the ESP personnel's log-in session.

In some embodiments, the EMS automatically subscribes a recipient to a subscription (e.g., a particular device identifier or user identifier) in response to receiving an emergency data request including the subscription or an identifier of the subscription. For example, in some embodiments, when an ESP personnel sends an emergency data request including a phone number to the EMS through their ESP console (e.g., through the emergency response application 280), the EMS subscribes the ESP personnel to the phone number and establishes a websocket connection with the ESP console. Then, whenever the clearinghouse 270 receives updated emergency data associated with the phone number, the EMS can automatically push the updated emergency data associated with the phone number to the ESP console. For example, an ESP personnel logs into an emergency response application 280 in communication with the EMS on the ESP personnel's ESP console. Subsequently, the ESP personnel receives a 9-1-1 call from a mobile phone and then generates and sends an emergency data request including the phone number of the mobile phone to the EMS through the emergency response application 280. The EMS then uses the phone number of the mobile phone to retrieve the most recent location associated with the mobile phone received by the clearinghouse and returns the most recent location associated with the mobile phone to the ESP personnel through the emergency response application 280. The EMS simultaneously subscribes the ESP personnel to the phone number of the mobile phone and establishes a websocket connection between the EMS and the ESP console and automatically pushes any updated emergency data (e.g., locations) associated with the phone number received by the clearinghouse to the emergency response application 280 as soon as the updated emergency data associated with the phone number is received by the clearinghouse 270.

In some embodiments, an ESP is associated with a unique ESP account ID that an ESP or ESP personnel can subscribe to. The EMS can then establish a websocket connection with a computing device associated with an ESP or ESP personnel subscribed to the unique ESP account ID and push emergency data associated with the unique ESP account ID to the computing device (e.g., through the emergency response application 280) whenever new or updated emergency data associated with the unique ESP account ID is received by the clearinghouse 270. For example, in some embodiments, when the clearinghouse 270 receives a location associated with an emergency alert (e.g., when a person calls 9-1-1 from a mobile phone and the mobile phone responsively sends a current location of the mobile phone to the clearinghouse 270), the EMS retrieves one or more geofences (as described below) associated with each ESP registered with the EMS and determines which (if any) of the geofences that the location associated with the emergency alert falls within. The EMS then tags the location associated with the emergency alert with the unique ESP account IDs associated with each of the ESPs associated with geofences that the location associated with the emergency alert falls within. For example, if four ESPs are registered with the EMS—ESP A, ESP B, ESP C, and ESP D—and the clearinghouse 270 receives a location associated with an emergency that falls within the one or more of the geofences associated with ESP A and ESP D, the EMS can tag the location associated with the emergency alert with the unique ESP account ID associated with ESP A and the unique ESP account ID associated with ESP D. The EMS can then push the location associated with the emergency alert to any ESPs or ESP personnel with an established websocket connection with the EMS and currently subscribed to either the unique ESP account ID for ESP A or the unique ESP account ID for ESP D. In some embodiments, when an ESP personnel logs into the emergency response application 280, a communication is sent to the EMS that includes one or more unique ESP account IDs that the ESP personnel or their respective ESP is currently subscribed to.

Emergency Data Geofencing

Figure 3:
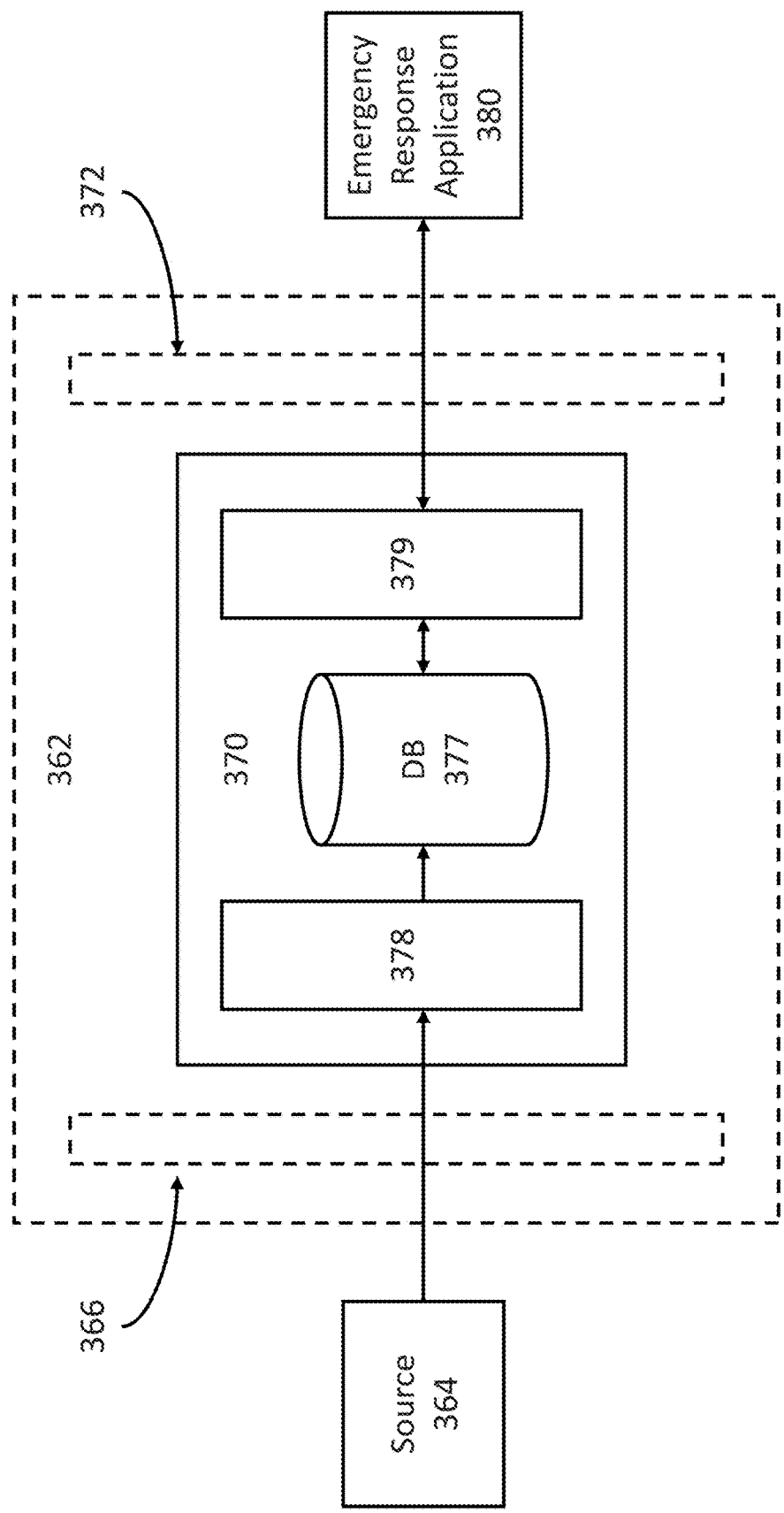
FIG. 3 depicts a diagram of a geofence applied to a clearinghouse for emergency data in accordance with one embodiment of the present disclosure.

FIG. 3 depicts a diagram of a geofence applied to a clearinghouse for emergency data. In some embodiments, a geofence module 362 is applied to the clearinghouse 370 to protect potentially sensitive emergency data using geospatial analysis. In some embodiments, as described above with respect to FIG. 2, the clearinghouse 370 includes a set of ingestion modules 378 and a set of retrieval modules 379. The set of ingestion modules can receive emergency data, or other information that can be useful in responding to an emergency, from a variety of sources. For example, in some embodiments, a smartphone sends emergency data to the clearinghouse 370 in the form of an HTTP POST API call in response to a user of the smartphone initiating a 911 emergency call. As depicted in FIG. 3, in some embodiments, when emergency data (e.g., an emergency location or additional emergency data) is sent from an electronic device 310 to the clearinghouse 370, the emergency data is first processed by a geofence module 362 before being received by the set of ingestion modules 378 within the clearinghouse 370. Similarly, in some embodiments, when an emergency data request is sent from a requesting party (e.g., the emergency response application 380, as described below), the emergency data request is processed by the geofence module 362 before being received by the set of retrieval modules 379 for display on a GUI of the emergency response application 380 on a computing device of the requesting party.

In some embodiments, as mentioned above, a geofence module 362 is applied to the clearinghouse 370 to protect potentially sensitive emergency data using geofences. Generally, a geofence is a virtual perimeter for a real-world geographic area. A geofence can be dynamically generated—as in a radius around a point location—or a geofence can be a predefined set of boundaries (such as school zones or neighborhood boundaries). The use of a geofence is called geofencing, and one example of usage involves a location-aware device of a location-based service (LBS) user entering or exiting a geofence. Entry or exit from a geofence could trigger an alert to the device's user as well as messaging to the geofence operator. The geofence information, which could contain the location of the device, could be sent to a mobile telephone or an email account.

For emergency response, an emergency service provider (public or private entities) may be given jurisdictional authority to a certain geographical region or jurisdiction (also referred to as "authoritative regions"). In the context of emergency services, one or more geofences may correspond to the authoritative region of an ESP. In many cases, the ESP is a public entity such as a public safety answering point (PSAP) or a public safety service (PSS; e.g., a police department, a fire department, a federal disaster management agency, national highway police, etc.), which have jurisdiction over a designated area (sometimes, overlapping areas). Geofences are used to define the jurisdictional authority by various methods and in various Geographic Information System (GIS) formats. In some embodiments, geofences only represent authoritative regions if the geofence has been assigned or verified by a local, state, or federal government. In some embodiments, geofences represent assigned jurisdictions that are not necessarily authoritative regions. For example, in some embodiments, a geofence is unilaterally created by its associated ESP without verification or assignment by a local, state, or federal government.

Geofences can be defined in various ways. For example, in some embodiments, a geofence comprises one or more of the following: a county boundary, a state boundary, a collection of postal/zip codes, a collection of cell sectors, simple shapes, complex polygons, or other shapes or areas. In some embodiments, geofences comprise approximations where the "approximated" geofence encloses an approximation of the authoritative region.

Updates to geofences may be required over time because the authoritative regions may change over time. Geofences may change over time (e.g., a new sub-division has cropped up) and require updates. In some embodiments, the systems and methods described herein allow geofences to be updated (e.g., a PSAP administrator can upload updated geofence GIS shapefiles).

For maintaining the privacy, security and integrity of the data, geofencing may be applied to emergency data. For example, applying geofence filters to the emergency data allows additional avenues for monitoring, both visibility and control, over the clearinghouse to detect anomalies/spikes and reduce the risk of security breaches.

In some embodiments, the emergency data is obtained from an emergency data source 364 (such as an electronic device or third-party server, as described above). On the retrieval side, in some embodiments, an emergency data recipient 380 accesses the clearinghouse 370 by sending an emergency data request to the clearinghouse 370, as described above. An ingestion geofence 366 (also referred to as "upstream filtering") is applied to restrict sending of data from emergency data sources 364 to the clearinghouse 370 from geographical areas that are not covered by the "combined authoritative jurisdiction" (e.g., covered one or more provisioned geofences in the geofence database (not shown)). In some embodiments, the ingestion geofence (also referred to as an "ingress filter") is applied to the ingestion module 378 to protect against accidental breaches of privacy. In some embodiments, the ingestion module 378 of the clearinghouse 370 drops location payloads that do fall within the geographical region covered by the "combined authoritative region."

In some embodiments, the clearinghouse 370 comprises one or more databases 377 (e.g., a database storing emergency data). For example, in some embodiments, the retrieval module 379 obtains emergency data from a clearinghouse database 377 to send to an emergency data recipient 380 (e.g., an ESP) in response to an emergency data request, as described above. In some embodiments, the retrieval geofence 372 (also referred to as an "egress filter") is applied at the retrieval module 379 of the clearinghouse 370. Applying geofencing to retrieved emergency data will protect against abuse and limit the scope of security breaches in cases where credentials have been compromised. In some embodiments, one or more geofences are associated with one or more credentials associated with an ESP agency or organization. In some embodiments, the credentials associated with an ESP agency or organization confers authorization to access data such as emergency data from the clearinghouse. In some embodiments, specific authorization to access data is granted individually to members of a PSAP through tokens derived from the credentials for that PSAP.

In some embodiments, when the retrieval module 379 checks the coordinates of current location data (within retrieved emergency data) associated with a device identifier with the geofence(s) associated with the credentials in an emergency data request. If the current location is within the geofence region (enclosed by the geofence(s)), the current location is returned to the ESP and displayed within the ESP console. If not, the module 379 will return a "not found" message (as opposed to the retrieved location is outside the geofence) to protect privacy.

In some embodiments, geofences can be used for reporting results for internal metrics and monitoring the system. For example, the number of emergency data requests, locations provided, "no location found" etc., can be obtained for a geofence(s) associated with a PSAP. Using single or combined geofences, the emergency data can be obtained on county-wide, city-wide, postal code, course grid (rectangle overlay), state-wide, or country-wide basis. In some embodiments, ingress and egress counters (e.g., percent of emergency sessions where the location data was received, but not queried) and other similar metrics can be calculated and analyzed to identify problems and spikes. In some embodiments, different geofences are used for retrieval and for reporting.

In some embodiments, a given incident (e.g., an incident associated emergency alert, as described below) can be determined to fall within a plurality of geofences, as described below. In some embodiments, emergency data for the incident is pushed to each PSAP having a geofence that the incident (e.g., a location associated with the incident) falls within. In some embodiments, emergency data for the incident is pushed to a subset of PSAPs having a geofence that encloses or encompasses the incident. In some embodiments, the location data of an individual device identifier is not pushed to more than one PSAP at one time. In some embodiments, wherein a device identifier egresses a geofence in which communication began and ingresses into a neighboring geofence, the location data is autocratically pushed to the neighboring PSAP with jurisdiction over the ingress geofence.

To determine the appropriate ESP(s) for sharing emergency data, the authoritative jurisdiction (defined by one or more geofences) of an ESP (e.g. primary agency) has to be evaluated. In case of irregularities (e.g. overlaps, islands, or other irregular features), steps may be taken to check with respective agency, geographical boundaries (national and international borders, county lines, rivers, hills, etc.), or other authority. In some embodiments, call routing data may be analyzed to see which ESP is answering the emergency call.

Raw geofences may be pre-processed to generate processed geofences using a variety of techniques. For removing irregularities, a geofence may be processed to resolve overlaps, remove islands and projections, smooth boundaries, modifying the file format or size, etc.

In some cases, there may be overlap between geofence of two or more ESPs. In some embodiments, the emergency data may be shared with the two or more ESPs to err on the side of making mission critical information to all entities that may be involved in the emergency response. In some embodiments, the two or more ESPs are primary agencies (e.g. PSAPs) and the emergency data has to be shared with one appropriate ESP. To determine the appropriate ESP(s) for sharing emergency data, the authoritative jurisdiction (defined by one or more geofences) of the overlapping ESPs by checking with respective agency, geographical boundaries (national and international borders, county lines, rivers, hills, etc.), sample routing data, etc. In contrast, if the overlapping ESPs include one or more secondary ESPs, the overlap may be retained and emergency data may be shared with one or more ESPs (e.g. one primary agency and two secondary agencies).

In some embodiments, a buffer (e.g., +10 km) is added to the geofence(s) so that results within the buffer zone are also returned. In many cases, PSAPs have discretion and incentive to respond to emergencies that are beyond their authoritative jurisdiction. As an example, a geofence that is a circular area with a radius of 10 km would have an area of 100 $\pi$ or ~314 km2, whereas the same area with a 10 km buffer around its circumference would have yield a combined radius of 20 km and a combined area of 400 $\pi$ or ~1256 km2. In some embodiments, the buffer is from 0.5 km to 5 km, from 0.5 km to 10 km, from 0.5 km to 15 km, from 0.5 km to 20 km, from 0.5 km to 25 km, or from 0.5 km to 30 km. In some embodiments, the buffer is from 1 km to 5 km, from 1 km to 10 km, from 1 km to 15 km, from 1 km to 20 km, or from 1 km to 30 km. In some embodiments, the buffer is at least 0.1 km, at least 0.2 km, at least 0.3 km, at least 0.4 km, at least 0.5 km, at least 0.6 km, at least 0.7 km, at least 0.8 km, at least 0.9 km, at least 1 km, at least 2 km, at least 3 km, at least 4 km, at least 5 km, at least 6 km, at least 7 km, at least 8 km, at least 9 km, at least 10 km, at least 11 km, at least 12 km, at least 9 km, at least 14 km, at least 15 km, at least 16 km, at least 17 km, at least 18 km, at least 19 km, at least 20 km, at least 25 km, or at least 30 km. In some embodiments, the buffer is no more than 0.1 km, no more than 0.2 km, no more than 0.3 km, no more than 0.4 km, no more than 0.5 km, no more than 0.6 km, no more than 0.7 km, no more than 0.8 km, no more than 0.9 km, no more than 1 km, no more than 2 km, no more than 3 km, no more than 4 km, no more than 5 km, no more than 6 km, no more than 7 km, no more than 8 km, no more than 9 km, no more than 10 km, no more than 11 km, no more than 12 km, no more than 9 km, no more than 14 km, no more than 15 km, no more than 16 km, no more than 17 km, no more than 18 km, no more than 19 km, no more than 20 km, no more than 25 km, or no more than 30 km.

Intelligent Multimedia System

Figure 4:
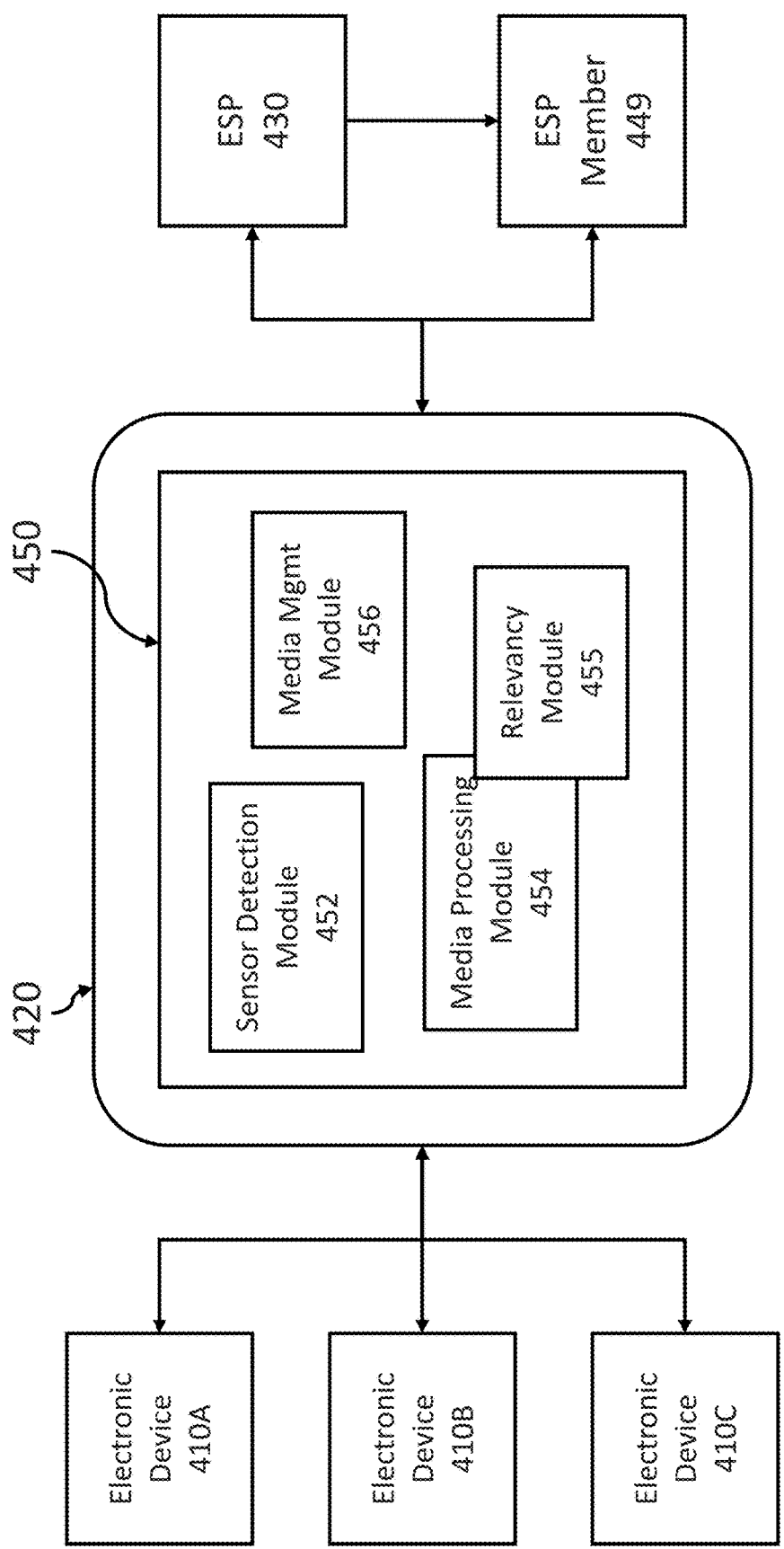
FIG. 4 depicts a diagram of an intelligent multimedia system in accordance with one embodiment of the present disclosure.

In some embodiments, as depicted in FIG. 4, the emergency management system (EMS) 420 includes an intelligent multimedia system (IMS) 450 for identifying electronic devices (e.g., sensors) pertinent to an emergency, receiving data or multimedia from the electronic devices pertinent to the emergency, determining which of the electronic devices pertinent to the emergency are the most relevant to the emergency, transmitting data or multimedia from the electronic devices to an emergency service provider (ESP) or a member of an ESP, and managing the transmission of the data or multimedia. In some embodiments, the IMS 450 includes a sensor detection module 452, a multimedia processing module 454, and a multimedia management module 456. In some embodiments, the multimedia processing module 454 includes a relevancy determination module 455. As will be described in further detail, the modules included in the IMS 450 work cooperatively to enable the functions of the IMS 450.

Figure 5:
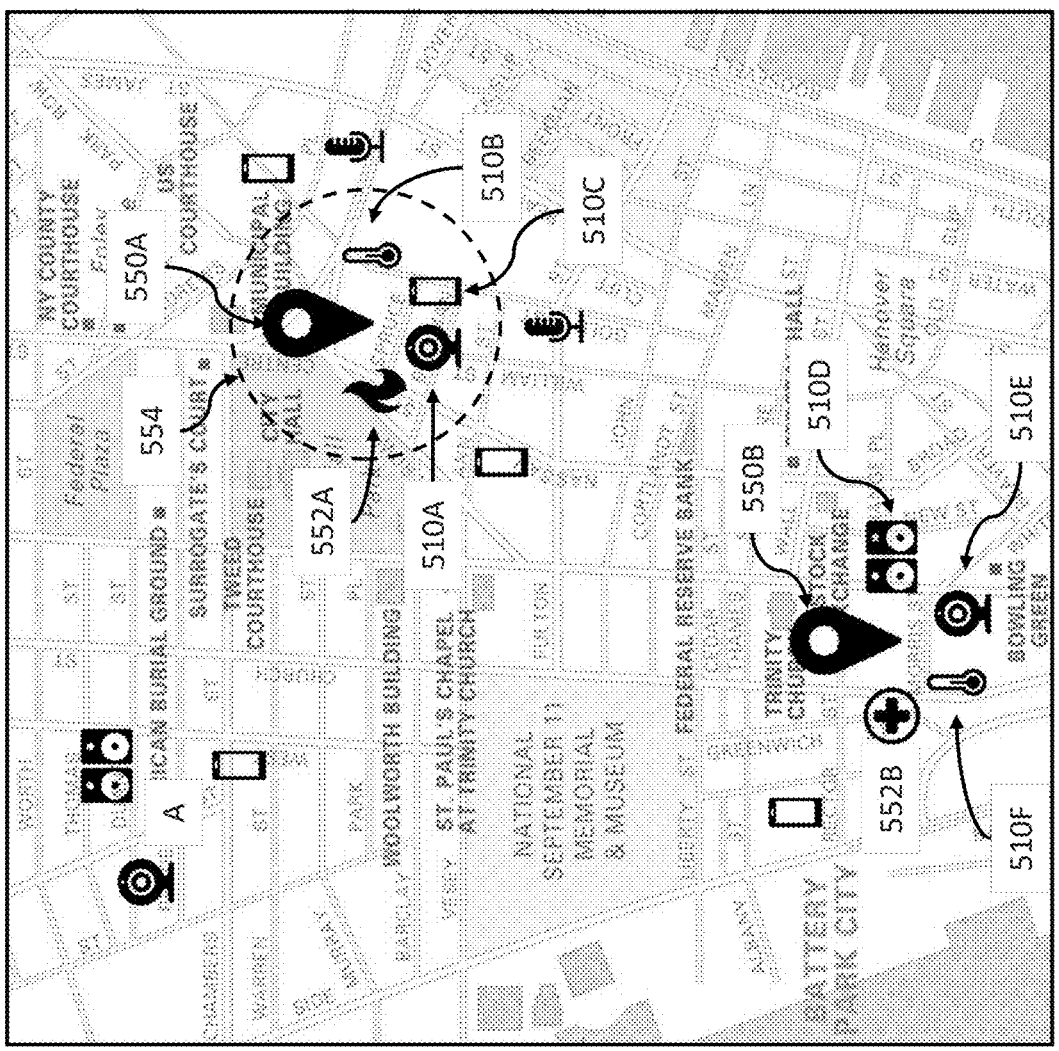
FIG. 5 illustrates a map of devices in accordance with one embodiment of the present disclosure.

For example, in some embodiments, an emergency alert is generated by an electronic device, such as electronic device 510A (see FIG. 5). For example, a woman, Suzy, is standing in her kitchen when a fire ignites in her oven and quickly begins spreading throughout her house. Suzy is able to escape from the kitchen and calls 9-1-1 from her cellphone, thereby initiating an emergency call. In some embodiments, in response to the emergency call being initiated, an emergency alert is generated by a program or application installed on the cellphone (e.g., emergency alert program 117), and the emergency alert is transmitted to the EMS 420. Alternatively, an intelligent smoke detector (e.g., a Nest Protect Smoke and Carbon Monoxide Alarm) installed in Suzy's kitchen detects the fire and generates an emergency alert in response to detecting the fire. The intelligent smoke detector can then transmit the emergency alert to the EMS 420. However, an emergency alert can be generated or transmitted to the EMS 420 in any other way. In some embodiments, an emergency alert includes information such as a location, the nature of the associated emergency, or user information about a user associated with the electronic device from which the emergency alert was generated. In some embodiments, an emergency alert includes an identifier of the electronic device from which the emergency alert was generated. In some embodiments, an emergency alert includes an identifier of a user associated with the electronic device from which the emergency alert was generated. In some embodiments, the EMS detects an emergency alert when an emergency call is made from an electronic device (e.g., a cellphone). In some embodiments, the EMS detects an emergency alert when the EMS receives a request for multimedia from an ESP, as described below. For example, in some embodiments, when a person calls 9-1-1 and connects with a 9-1-1 call taker, the call taker can generate and transmit a request for multimedia to the EMS, which the EMS detects as an emergency alert.

In some embodiments, after an emergency alert is detected by the EMS 420, the IMS 450 can identify sensors (e.g., electronic devices 410A-410C and/or 510A-510C) pertinent to the emergency associated with the emergency alert. For example, referring back to the fire in Suzy's kitchen, after the EMS 420 receives the emergency alert associated with the fire in the kitchen, the IMS 450 may identify both Suzy's cellphone and the intelligent smoke detector as sensors pertinent to the emergency. In some embodiments, identifying sensors pertinent to an emergency is performed by the sensor detection module 452. In some embodiments, after identifying the sensors pertinent to the emergency (e.g., Suzy's cellphone and the intelligent smoke detector), the IMS 450 can retrieve or receive data or multimedia from the sensors pertinent to the emergency. For example, Suzy may begin recording a video of the fire in her kitchen with her cellphone, and the IMS 450 can receive the video from the cellphone. In this example, the IMS 450 may additionally or alternatively receive data pertaining to the emergency from the intelligent smoke detector, such as the volume of smoke or type of gases being produced by the fire.

In some embodiments, after receiving data or multimedia from sensors pertinent to an emergency, the IMS 450 then processes the data or multimedia, such as through multimedia processing module 454, to determine which of the sensors pertinent to the emergency are the most relevant. For example, the IMS 450 may determine that, between the data from the data received from the intelligent smoke detector and the video received from Suzy's cellphone, the video is more relevant to the emergency. In some embodiments, in response to determining that the video (and therefore the cellphone) is more relevant than the intelligent smoke detector data, the EMS 420 then transmits the video received from Suzy's cellphone to an ESP 430 or a member of an ESP 449. In some embodiments, after the EMS 420 transmits data or multimedia to an ESP 430 or ESP member 449, the IMS 450 can actively manage the transmission of the data or multimedia, such as through multimedia management module 456, to ensure that the data or multimedia is properly received by the EMS 430 or ESP member 449. For example, in some embodiments, the IMS 450 can sample the connection quality between the EMS 420 and an ESP 430 and, in response to a poor connection quality, decrease the framerate and/or resolution of a video being transmitted from the EMS 420 to the ESP 430. In some embodiments, the video is converted into a series of still images when the connection is of sufficiently poor quality.

Sensor Detection and Identification

As described throughout the present disclosure, in some embodiments, after an emergency alert is generated and transmitted to the EMS, the intelligent multimedia system (IMS) identifies sensors pertinent to an emergency associated with the emergency alert. An emergency alert may be generated and transmitted to the EMS in a number of ways. For example, an emergency alert may be generated when a user dials an emergency number, such as 9-1-1 in the United States, from a cellphone. In this example, an emergency alert is generated by a program or application installed on the cellphone in response to the user dialing 9-1-1. In some embodiments, the emergency alert includes additional information, such as a location generated by the cellphone (e.g., via location services or hybrid device-based location). In some cases, the emergency alert is then transmitted to the EMS by the cellphone. In another example, an emergency alert is generated automatically by an IoT device, such as by an intelligent smoke detector device in response to detecting a fire, as discussed above. In this embodiment, the emergency alert optionally includes a location associated with the IoT device or a location associated with a wireless network or another electronic device that the IoT device is connected to. In this embodiment, the emergency alert is transmitted directly from the IoT device to the EMS or indirectly from another electronic device that the IoT device is communicatively coupled to, such a cellphone or smart home hub (e.g., the Amazon Echo).

In some embodiments, after the EMS receives an emergency alert, the IMS identifies a first set of sensors pertinent to an emergency associated with the emergency alert using a location associated with the emergency included in the emergency alert. FIG. 5 depicts a map of emergencies and sensors pertinent to the emergencies. In one example, a fire 552A ignites in a room and is detected by a smart camera 510A using video analysis. In this example, the smart camera 510A combines color and motion information received by the smart camera 510A and compares the information to predetermined models to detect a growing a fire. In response to detecting the fire 552A, the smart camera 510A generates an emergency alert including a location of the smart camera, inherently indicative of the location of the emergency 550A. In some embodiments, the owner or user of an electronic device 510 (e.g., smart camera 510A) inputs a location, such as a physical address of a building, for the electronic device 510 during the setup of the device. For example, if Suzy buys a smart camera for her home, Suzy may input her home address as the location of the smart camera while installing the device. A location of an electronic device 510 may be stored locally on the physical memory of the device or stored on a network server (e.g., a cloud network) associated with the device. In some embodiments, an electronic device 510 is tagged with a hierarchy of location data. For example, in some embodiments, an electronic device 510 is tagged with a physical address as well as a specific room within the physical address (e.g., Room 321, kitchen, or living room). In some embodiments, an electronic device 510 is associated with an account of a user, such as by associating the device with a username, email address, or phone number of the user. In some embodiments, an electronic device 510 associated with an account of a user can be tagged with different locations also associated with the user. For example, a user may be associated with a home, office, and vacation home in three separate locations. In this example, the user tags an electronic device with any of the three separate locations. In some embodiments, an electronic device 510 has a location component, such as a GPS system, installed on the device, from which the electronic device 510 can determine its own location. In some embodiments, an electronic device 510 does not have a location component but is communicatively coupled to a second electronic device 510 that does have a location component and is able to receive a location to include in the emergency alert from the second electronic device 510. In some embodiments, after receiving an emergency alert from an electronic device 510, the EMS can determine a location of the electronic device 510 based on an IP address of the electronic device 510 or a communication network that the electronic device 510 is connected to.

Referring again to the example of fire 552A, after smart camera 510A detects the fire 552A, generates an emergency alert including a location of the emergency 550A, and transmits the emergency alert to the EMS, the IMS can identify sensors pertinent to the emergency (e.g., fire 552A) using the location of the emergency 550A. In some embodiments, the EMS maintains a sensor database 125 that stores information (e.g., location, associated users, type of device/sensor, connectivity capabilities, etc.) regarding sensors that are or have been communicatively coupled with the EMS. In such embodiments, the IMS can identify sensors pertinent to the emergency by searching the sensor database 125 for sensors tagged with locations in the vicinity of the emergency, such as sensors within a predetermined radius 554 of the location of the emergency 550A. In some embodiments, the IMS can identify sensors pertinent to the emergency using the location of the emergency 550A by identifying a user account associated with the electronic device 510 from which the emergency alert was generated and identifying additional electronic devices associated with the user account. The additional electronic devices associated with the user account may be considered sensors pertinent to the emergency based on their association with the electronic device 510 that generated the emergency alert. In some embodiments, the IMS can further determine locations of the additional electronic devices associated with the user account associated with the electronic device 510 that generated the emergency alert. The IMS can then compare these locations to the location of the emergency and select the additional electronic devices tagged with locations within a predetermined radius of the location of the emergency as sensors pertinent to the emergency associated with the emergency alert. In some embodiments, the size of the predetermined radius may be based in part on the nature of the associated emergency. For example, in some embodiments, if the nature of the emergency is a fire, devices within 100 meters of the emergency may be considered pertinent; however, if the nature of the emergency is a medical emergency, only devices within 25 meters of the emergency may be considered pertinent. In this example, the medical emergency may be considered a more micro event than the fire; important information regarding a medical emergency would probably be observable on a much smaller scale than those of the fire.

In some embodiments, the EMS is able to communicate with third-party network services (e.g., cloud services) that host electronic devices 510. For example, a Nest Cam IQ (a smart camera device) may be hosted on a cloud network owned and managed by Nest, and an Amazon Echo (a smart home hub device) may be hosted on a cloud network owned and managed on Amazon. Or, for example, both the Nest Cam IQ and the Amazon Echo may be hosted on Amazon's cloud network. In such embodiments, the EMS may be able to communicate with the third-party networks to identify electronic devices hosted or managed by the third-party networks and tagged with locations in the vicinity of an emergency, such as by sending a query to the third-party networks including the location of the emergency. In such embodiments, a third-party network can respond to the query by returning a list of devices in the vicinity of the emergency and information about the devices on the list (e.g., location, associated users, type of device/sensor, connectivity capabilities, etc.). In some embodiments, when two or more electronic devices 510 are jointly owned or manufactured by the same producer, the devices will automatically sync in response to an emergency alert generated by one of the devices. For example, in some embodiments, when a Nest Protect smoke and carbon monoxide detector detects a fire and generates an emergency alert, a jointly owned Nest Cam will automatically activate and begin recording video to capture any possible causes or reactions of the fire. In such an embodiment, information regarding the Nest Cam may be included in the emergency alert generated by the Nest Protect.

In some embodiments, the IMS can identify sensors pertinent to an emergency by identifying a communication network that the electronic device 510 that generated the emergency alert associated with the emergency is connected to. The IMS can then detect additional electronic devices that are communicatively coupled to the same communication network and identify those additional electronic devices as sensors pertinent to the emergency. For example, in the case of fire 552A, the IMS may that cellphone 510C is connected to the same Wi-Fi network as smart camera 410a. In some embodiments, the EMS or IMS can identify sensors pertinent to an emergency by prompting the electronic device 510 that generated the emergency alert to broadcast a detection signal to additional electronic devices in the vicinity of the electronic device 510 that generated the emergency alert. Any additional electronic devices that are capable of receiving the broadcast signal may then send a signal back to the electronic device 510 that generated the emergency alert indicating that they are in the vicinity. The electronic device 510 that generated the emergency alert may then relay this information to the EMS or IMS. Alternatively, after receiving the detection signal, an additional electronic device may send a signal directly to the EMS or IMS indicating that it is in the vicinity of the emergency. In some embodiments, the IMS identifies the electronic device that generated an emergency alert as a sensor pertinent to the emergency associated with the emergency alert by default. In some embodiments, the IMS identifies only active (e.g., powered on) electronic devices as sensors pertinent to an emergency. However, the IMS can identify sensors pertinent to an emergency in any other way.

In the example of fire 552A, as depicted in FIG. 5, the IMS detects two other electronic devices within a predetermined radius of the location of the emergency 550A550A, smart thermometer 510B and cellphone 510C, and identifies them as sensors pertinent to the emergency. The IMS additionally identifies the smart camera 510A as a sensor pertinent to the emergency, since the smart camera 510A generated the emergency alert. In this example, although there are four additional electronic devices in the area surrounding the location of the emergency 550A550A, but they are located outside of the predetermined radius 554 and are therefore not identified as pertinent to the emergency. In this example, the IMS additionally identifies three additional electronic devices (the three devices in the area labeled A) that are associated with the same user account as the smart camera 510A that generated the emergency alert associated with the fire 552A. However, these devices are located far from the location of the emergency 550A550A and are likewise not identified by the IMS as sensors pertinent to the emergency.

In a second emergency, medical emergency 552B, as depicted in FIG. 5, William has fallen in his apartment and broken his leg. In this example, William gives a voice command to his smart speaker 510D (e.g., an Amazon Echo) to contact an emergency service provider, such as by saying "Alexa, call 9-1-1." In response, the smart speaker 510D initiates an emergency call, generates an emergency alert, and transmits the emergency alert to the EMS. In this example, the IMS identifies two additional electronic devices associated with William's user account, smart camera 510E and smart thermometer 510F. Because of their mutual affiliation with William, smart camera 510E and smart thermometer 510F are identified by the IMS as sensors pertinent to medical emergency 552B.

Gathering Multimedia

In some embodiments, after receiving an emergency alert and identifying sensors pertinent to the associated emergency, the EMS or IMS can receive data or multimedia (also referred to as "multimedia contents") from the set of sensors identified by the IMS as pertinent to the emergency. For example, referring again to the fire 552A depicted in FIG. 5, after identifying the smart camera 510A, the smart thermometer 510B, and the cellphone 510C as the set of sensors pertinent to the emergency, the EMS or IMS can receive data or multimedia from each of the sensors within the set of sensors pertinent to the emergency. For example, the EMS or IMS may receive a video recording or video feed from the smart camera 510A, temperature data from the smart thermometer 510B, and an audio recording or audio feed from the cellphone 510C. Alternatively, in some embodiments, the EMS or IMS receives a second video recording or video feed from the cellphone 510C. Referring now to the medical emergency 552B depicted in FIG. 5, after identifying the smart speaker 510D, the smart camera 510E, and the smart thermometer 510F as the set of sensors pertinent to the emergency, the EMS or IMS can receive data or multimedia from each of the sensors within the set of sensors pertinent to the emergency. In this example, the EMS or IMS receives an audio recording or audio feed from the smart speaker 510D, a video recording or video feed from the smart camera 510E, and temperature data from the smart thermometer 510F. In some embodiments, the EMS or IMS is configured to receive any type of data or multimedia from an electronic device. In some embodiments, data or multimedia is sent from an electronic device to the EMS through end-to-end encryption.

In some embodiments, the EMS or IMS receives data or multimedia from an electronic device by requesting data from the electronic device. For example, in some embodiments, after identifying an electronic device as a sensor pertinent to an emergency, the EMS or IMS can send a query (e.g., an HTTP GET request) to the electronic device or to a server hosting the electronic device. In some embodiments, the query includes credentials or accessing keys for verifying the EMS. In some embodiments, after receiving the query from the EMS, the electronic device or the server hosting the electronic device can transmit data gathered by the electronic device to the EMS or IMS. In some embodiments, after receiving the query from the EMS, the electronic device or the server hosting the electronic device verifies the credentials or access keys of the EMS before transmitting data gathered by the electronic device to the EMS.

In some embodiments, the EMS or IMS receives or obtains data or multimedia from an electronic device without sending a query. For example, in some embodiments, after an electronic device generates an emergency alert, the electronic device automatically transmits data or multimedia gathered by the electronic device to the EMS, such as by sending an HTTP POST to the EMS. In some embodiments, after the IMS identifies an electronic device as a sensor pertinent to an emergency, the IMS can send a signal, either directly to the electronic device or indirectly to the electronic device through a second electronic device communicatively coupled to the electronic device or through a server hosting the electronic device, indicating that the electronic device has been identified by the IMS as a sensor pertinent to the emergency. In response to receiving the signal, the electronic device can automatically transmit data or multimedia gathered by the electronic device to the EMS, such as by sending an HTTP POST to the EMS.

In some embodiments, the EMS is configured to wake an electronic device that the IMS has identified as a sensor pertinent to an emergency to receive data or multimedia from the electronic device. For example, referring again to the medical emergency 552B depicted in FIG. 5, if the smart camera 510E is in an inactive state (e.g., partially or completely powered off), after receiving the emergency alert from the smart speaker 510D and identifying the smart camera 510E as a sensor pertinent to the medical emergency 552B, the EMS can send a signal directly or indirectly to the smart camera 510E (such as through smart speaker, if the smart speaker 510D is communicatively coupled to the smart camera 510E, or through a third-party server hosting the smart camera 510E) prompting the smart camera 510E to enter an active state (e.g., powered on) and begin recording pictures or video. The smart camera 510E can then transmit the pictures or video to the EMS.

The EMS or IMS can receive data or multimedia from an electronic device in various ways. In some embodiments, the EMS receives a video stream from an electronic device (such as a cellphone or smart camera) directly from the electronic device. For example, in some embodiments, the EMS provides a streaming endpoint for the electronic device to transmit the video stream to. In some embodiments, the EMS receives a video stream from an electronic device by accessing a website provided by a third-party server or network that hosts the video stream from the electronic device. In some embodiments, the EMS receives a video stream by repeatedly querying an electronic device that is recording a video (such as a smart camera) for a still image. For example, in some embodiments, the EMS receives a video stream from a smart camera by querying the smart camera for an image once a second (or twice a second, etc.) for every second that the video stream is being recorded by the smart camera. The EMS can then patch the sequential still images together to recreate the video stream.

Data and Multimedia Processing and Relevancy Determination

After receiving an emergency alert, identifying a set of sensors pertinent to an emergency associated with the emergency alert, and receiving data or multimedia from the sensors pertinent to the emergency, the IMS can process and determine the relevancy of the data or multimedia received from the sensors pertinent to the emergency in various ways. Because emergency service providers operate in high pressure situations with lives at risk, they must be able to process information quickly and efficiently. Emergency service providers also need to be provided with only relevant information, as many emergency situations do not allow emergency service providers the time to sift through data to find the relevant information. In some embodiments, the IMS processes and determines the relevancy of data or multimedia received from sensors pertinent to an emergency so that the EMS can provide emergency service providers with only the most relevant data or multimedia.

In some embodiments, after receiving data or multimedia from sensors pertinent to an emergency, the IMS processes the data or multimedia (such as through multimedia processing module 454) for audio or visual cues. For example, in some embodiments, if the IMS receives an audio recording or stream, the multimedia processing module 454 can analyze the audio for key sounds, words, voices, etc. For example, in some embodiments, the multimedia processing module 454 can use speech recognition techniques to detect key words such as "emergency," "weapon," "fire," "help," and the like. If the multimedia processing module 454 detects a key word in the audio received from a particular sensor pertinent to an emergency, the IMS may select or identify the particular sensor as a relevant sensor. In some embodiments, the multimedia processing module 454 includes a list of predetermined key words. In some embodiments, the multimedia processing module 454 can detect a volume level (e.g., a decibel level) of an audio recording or stream received from a particular sensor pertinent to an emergency. If the multimedia processing module 454 detects a volume level that exceeds a threshold volume level, the IMS may select or identify the particular sensor as a relevant sensor. In some embodiments, the threshold volume level is a static value. In some embodiments, the threshold volume level is a predetermined value. In some embodiments, the multimedia processing module 454 compares the volume level to an average volume level of audio received from the particular sensor and the IMS may selects or identifies the particular sensor as a relevant sensor if the volume level exceeds the average volume level.

Figure 6:
FIG. 6 depicts audio transcriptions in accordance with one embodiment of the present disclosure.
Figure 6:

In some embodiments, if the IMS receives an audio recording or stream from a particular sensor pertinent to an emergency, the multimedia processing module 454 can use speech recognition techniques to transcribe the audio into a text transcription. FIG. 6 depicts two examples of text transcriptions of audio received from a sensor pertinent to an emergency by the IMS. In the first example, the text transcription (lines 656A-656B) is a transcription of an audio stream received from a recording device installed in a bank lobby. An armed robbery begins in the bank lobby and one of the bank's tellers presses a panic button under his desk, thereby generating an emergency alert that is subsequently transmitted to the EMS. In response to receiving the emergency alert, the IMS identifies sensors pertinent to the emergency (e.g., the armed robbery), including the recording device installed in the bank lobby, and begins receiving an audio stream from the recording device. The multimedia processing module 454 is able to transcribe two lines of audio into text transcriptions, "Help, I've been shot and I can't get up. Active shooter." (line 656A) and "Officer down!" (line 656B).

In the second example, the text transcription (lines 656C-656D) is a transcription of an audio stream received from a cellphone communicatively coupled to an intelligent vehicle system at the scene of a car accident in which a van has struck a pedestrian in an inner-city intersection. The pedestrian was wearing a smartwatch (e.g., an Apple Watch) with a heartrate monitor that detected, such as through the impact of the van colliding with the pedestrian and the resulting change in the pedestrian's heartrate, that the pedestrian may be experiencing an emergency. In response, the smartwatch automatically generated an emergency alert including the location of the smartwatch (e.g., the location of the emergency) and transmitted the emergency alert to the EMS. In response to receiving the emergency alert, the IMS uses the location included in the emergency alert to identify sensors pertinent to the emergency. In this example, the IMS detects a car with an intelligent vehicle system stopped as a result of the accident near the intersection. For example, an OnStar intelligent vehicle system is integrated into the car. The IMS, in response to receiving the emergency alert, sends a query including the location of the emergency to the OnStar network and the OnStar network returns information regarding any OnStar integrated vehicle in the vicinity of the emergency. In this example, the IMS then communicates with the OnStar network to prompt a microphone within the car to begin recording audio and transmits the audio to a cellphone communicatively coupled to the OnStar system integrated into the car. The cellphone then transmits the audio recorded by the vehicle to the EMS. The multimedia processing module is then able to transcribe the audio into text transcriptions, "Oh my god, look, did that man just get run over?" (line 656C), "I think he just got hit by that van!" (line 656D), and "Someone call 9-1-1! Quick! That man needs help!" (line 656E).

In some embodiments, after receiving audio from a sensor pertinent to an emergency and transcribing the audio into a text transcription, the multimedia processing module can then parse the text transcriptions for key words or key terms. As depicted in FIG. 6, in the first example, the multimedia processing module identifies the following underlined words and terms as key words and key terms: ""Help, I've been shot and I can't get up. Active shooter." (line 656A) and "Officer down!" (line 656B). In response to detecting key words in the text transcription of the audio received from the recording device, the IMS can select the recording device as a relevant sensor. In the second example, the multimedia processing module identifies the following underlined words and terms as key words and key terms: "Oh my god, look, did that man just get run over?" (line 656C), "I think he just got hit by that van!" (line 656D), and "Someone call 9-1-1! Quick! That man needs help!" (line 656E). In response to detecting key words in the text transcription of the audio received from the cellphone, the IMS can select the car as a relevant sensor. In some embodiments, the IMS selects a particular sensor as a relevant sensor only if the multimedia processing module identifies a threshold number of key words or key terms within the audio or within a text transcription of the audio received from the particular sensor. In some embodiments, the multimedia processing module (or the relevancy determination module 455) weighs different key words or key terms with different amounts of relevance. For example, the key term "active shooter" may be given a value of high relevance, the key word "help" may be given a value of medium relevance, and the key word "officer" may be given a value of low relevance. In some embodiments, the IMS selects a particular sensor as a relevant sensor only if the multimedia processing module identifies key words or key terms, within the audio or within a text transcription of the audio received from the particular sensor, having an aggregate amount of relevance greater than a threshold amount of relevance (hereinafter, "relevance threshold"). For example, in an embodiment wherein key words or key terms are given a value of low relevance, medium relevance, or high relevance, the relevance threshold may be three or more low relevance key words/terms, two or more medium relevance key words/terms, or one or more high relevance key words/terms. Or, for example, the relevance threshold may be two or more low relevance key words/terms and one or more medium relevance key words/terms.

In some embodiments, the multimedia processing module additionally or alternatively performs a sentiment analysis on a text transcription to determine the sentiment of an audio recording or stream. In some embodiments, the multimedia processing module then uses the sentiment to determine the relevancy of a particular sensor pertinent to an emergency.

In some embodiments, if the IMS receives a video recording or video stream from a particular sensor pertinent to an emergency, the multimedia processing module 454 analyzes the video for visual cues such as key images, colors, movement/activity, animate objects, inanimate objects, people, animals, etc. For example, in some embodiments, the multimedia processing module identifies an amount of movement (e.g., activity or activity level) in a video, and, if the multimedia processing module detects activity exceeding a threshold activity level, the IMS selects the particular sensor from which the video was received as a relevant sensor. In some embodiments, the multimedia processing module compares the activity level to an average activity level received from the particular sensor and selects the particular sensor as a pertinent sensor if the activity level exceeds the average activity level.

Figure 7A:
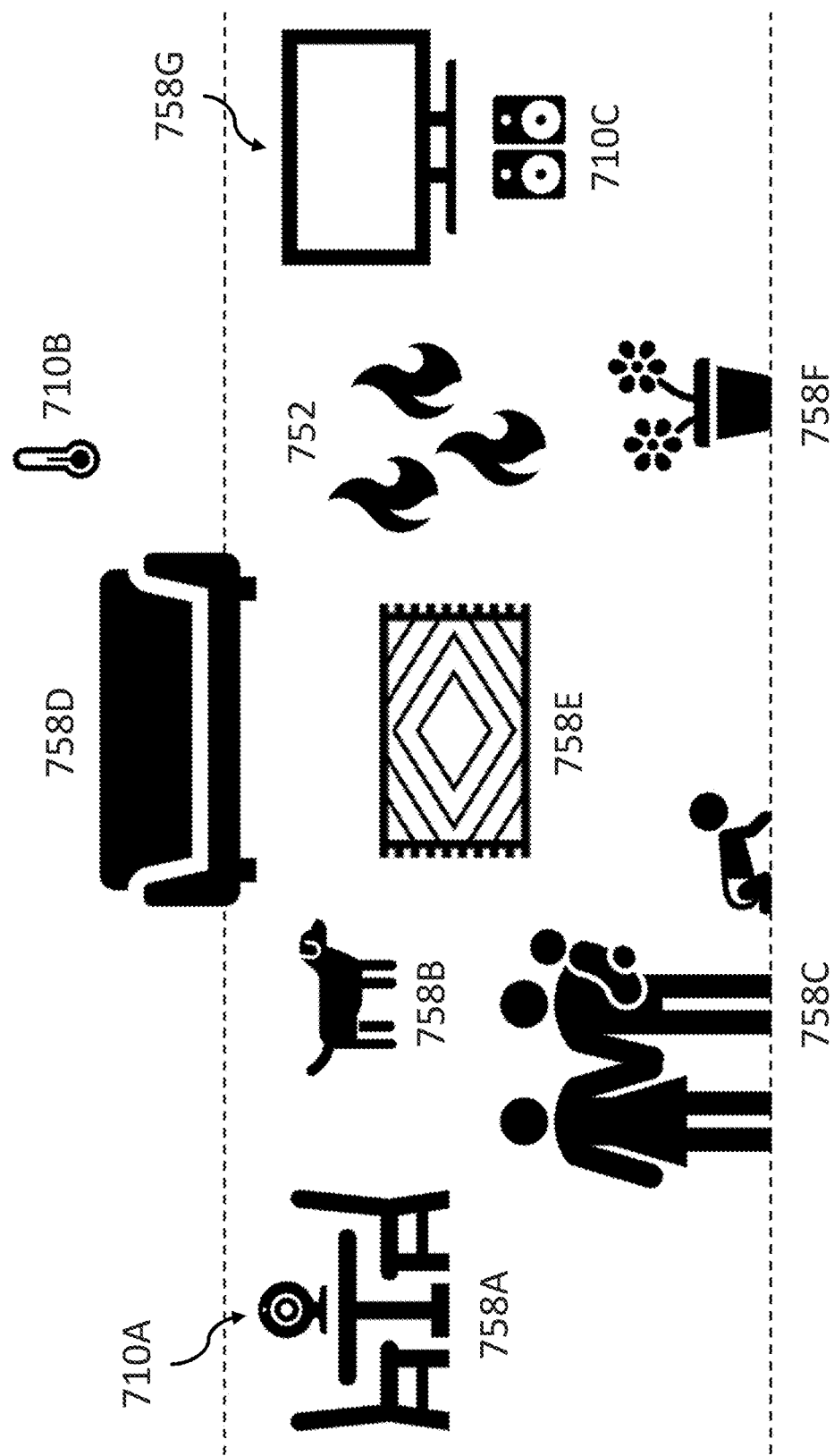
FIGS. 7A, FIG. 7B, and FIG. 7C illustrate multimedia analysis processes in accordance with one embodiment of the present disclosure.
Figure 7B:
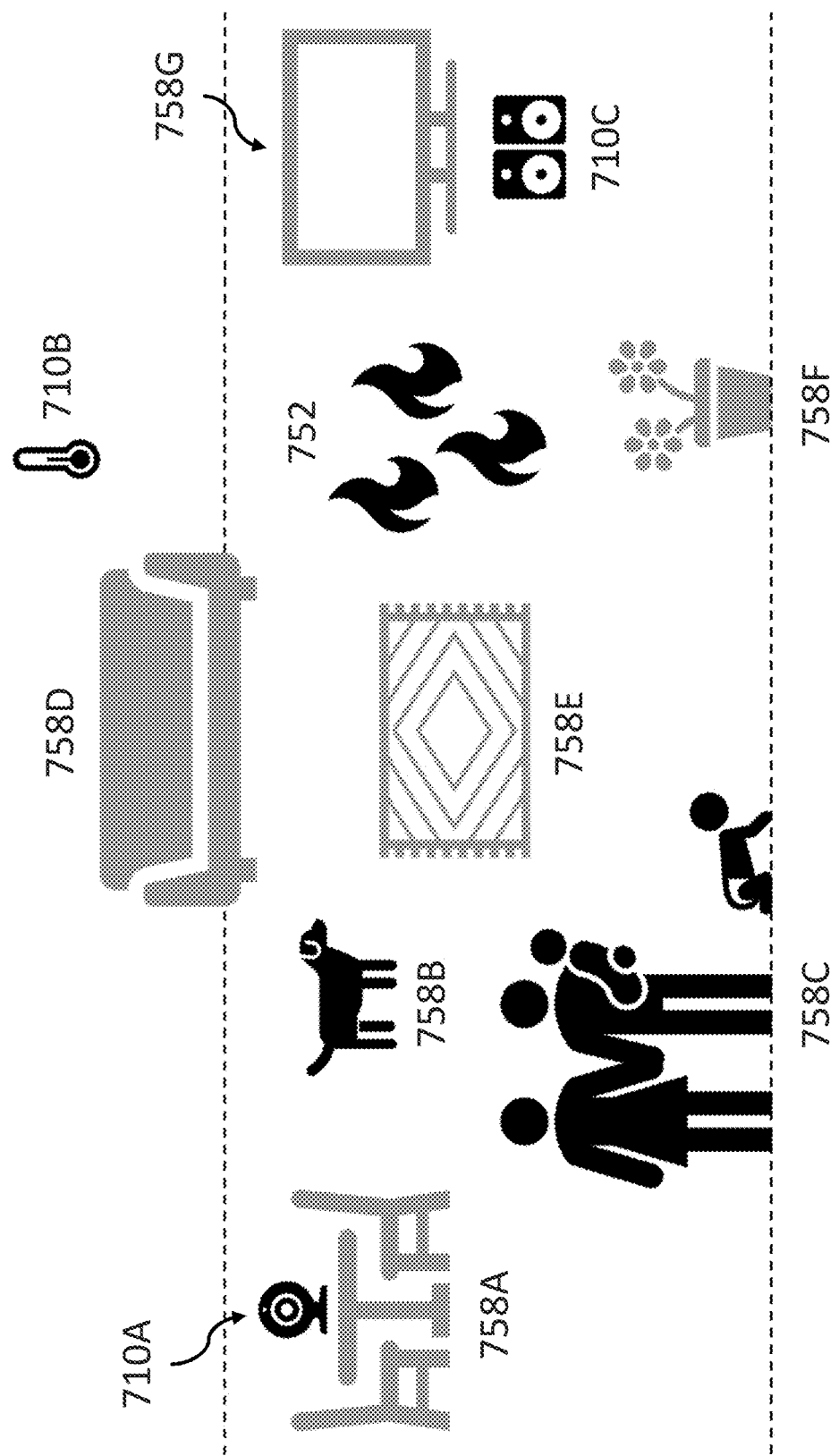
Figure 7C:
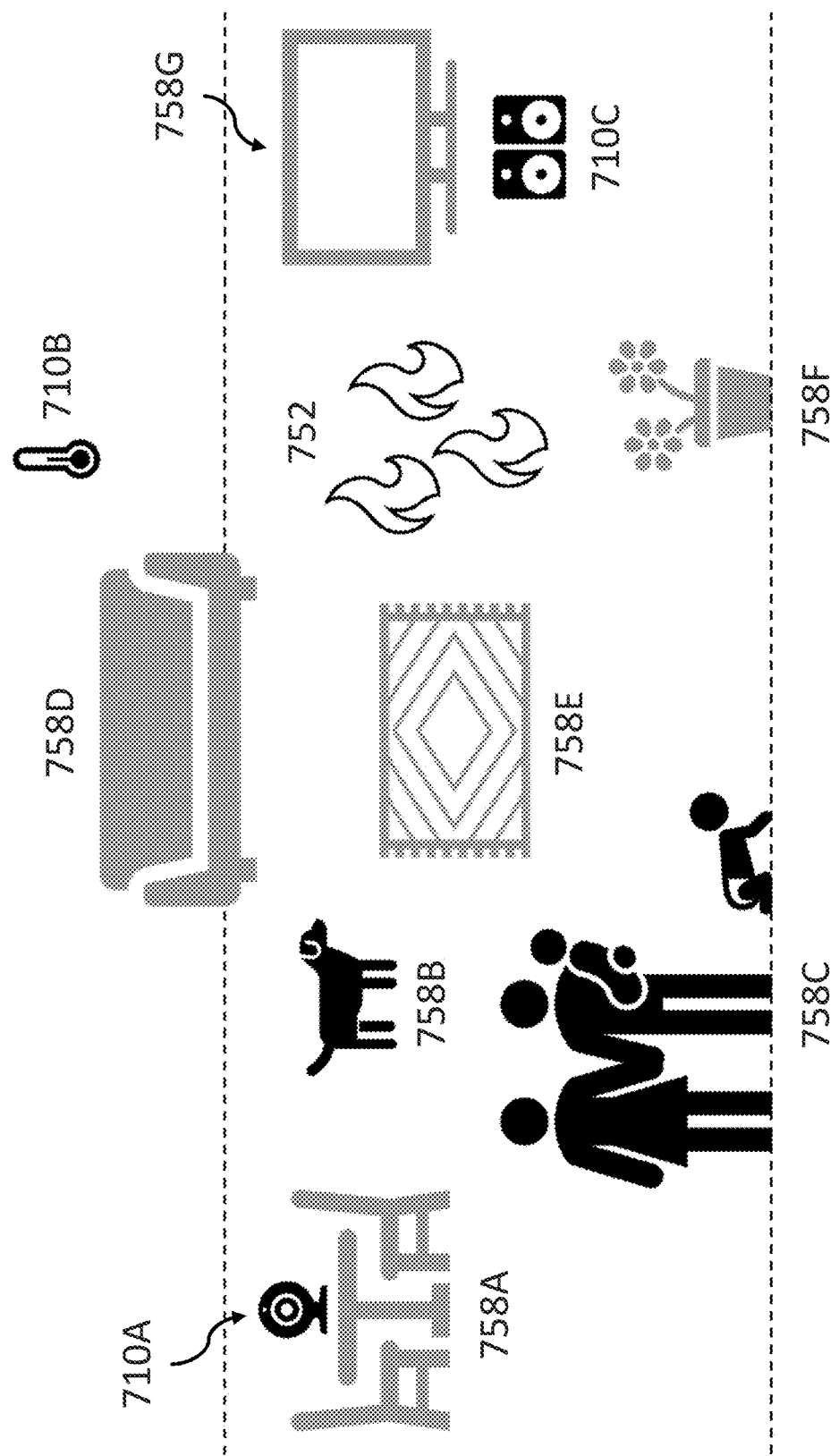

FIGS. 7A-7C depict embodiments of a room, such as a living room, with various electronic devices 710. As depicted in FIG. 7A, the room may be populated or occupied by any number of animate and inanimate objects, such as table 758A, dog 758B, family 758C, couch 758D, rug 758E, plant 758F, and television 758G. As depicted in FIG. 7A, the room may include different types of electronic devices 710, such as smart camera 710*a*, smart thermometer 710B, and smart speaker 710C. Different electronic devices 710 may have different technical capabilities and may therefore be capable of gathering different types of information regarding an emergency. For example, as depicted in FIG. 7A, the room may experience a fire 752. In this example, after the fire 752 ignites in the room, a member of the family 758C gives a voice command to the smart speaker 710C (e.g., a Google Home device) to initiate a 9-1-1 call, such as by audibly saying, "Hey Google, call 9-1-1." In some embodiments, in response to receiving the voice command, the smart speaker 10C can generate an emergency alert, transmit the emergency alert to the EMS, and initiate a 9-1-1 call. In this example, after the EMS receives the emergency alert, the IMS determines that smart camera 710A and smart thermometer 710B are associated with the same user account as smart speaker 710C and thus identifies smart camera 710A, smart thermometer 710B, and smart speaker 710C as the set of sensors pertinent to the emergency (e.g., fire 752).

After identifying the smart camera 710A, smart thermometer 710B, and smart speaker 710C as the set of sensors pertinent to the fire 752, the IMS then begins receiving data or multimedia from the three devices. For example, the IMS can receive an audio stream from the smart speaker 710C, temperature data from the smart thermometer 710B, and a video stream from the smart camera 710A. After the IMS receives the video stream from the smart camera 710A, the multimedia processing module can analyze the video received from the smart camera 710A. As depicted in FIG. 7B, in this example, the multimedia processing module analyzes the video feed and detects the following key objects: dog 758B, family 758C, and fire 752. In some embodiments, the multimedia processing module detects other objects in the room, such as table 758A, couch 758D, rug 758E, plant 758F, and television 758G, and identifies the other objects as not relevant to the emergency. For example, in some embodiments, pyroelectric infrared (PIR) analysis can be used to detect the presence of humans or animals. In some embodiments, the multimedia processing module uses facial recognition software to identify faces of people in videos received by the IMS. The multimedia processing module can identify faces as key objects. In some embodiments, the multimedia processing module uses voice or facial recognition software to distinguish between users (e.g., user identification). In response to detecting the key objects, the IMS selects the smart camera 710A (the sensor from which the video feed was received) as a relevant sensor. In some embodiments, the IMS selects a particular sensor from a set of pertinent sensors as a relevant sensor if a video received from the particular sensor includes one or more key objects. In some embodiments, the IMS selects the particular sensor from the set of pertinent sensors as a relevant sensor if the video includes a threshold rate of key objects per unit of time. For example, the threshold rate of key objects per unit of time may be one or more key objects per second. Alternatively, the threshold rate of key objects per unit of time may be 0.5 key objects per second. In another example, the IMS selects the particular sensor from the set of pertinent sensors as a relevant sensor if the video includes a threshold rate of key objects per video frame.

In some embodiments, the multimedia processing module can analyze data or multimedia received from a sensor pertinent to an emergency to determine a likely nature of the emergency or potential threat. For example, as depicted in FIG. 7C, the multimedia processing can analyze video received from smart camera 710A to detect the fire 752, such as by combining motion and color information received by the smart camera 710A. The multimedia processing module can then identify the fire 752 as the likely nature of the emergency. In another example, the multimedia processing module can detect a rapid increase in the temperature of the room in the temperature data received from the smart thermometer 710B and determine that the likely nature of the emergency is a fire based on the rapid increase in temperature. In some embodiments, the multimedia processing module can combine data and multimedia received from multiple sensors pertinent to an emergency to determine a likely nature of the emergency. For example, the multimedia processing module may combine the rapid increase in temperature detected in the temperature data received from the smart thermometer 710B and the color and motion information gathered from the video received from the smart camera 710A to determine that the fire 752 is the likely nature of the emergency.

In some embodiments, the IMS selects one or more sensors from a set of sensors pertinent to an emergency as relevant sensors (e.g., a set of relevant sensors). For example, for the fire 752, the IMS may select the smart camera 710A and the smart speaker 710C as the set of relevant sensors for the fire 752. In another example, the IMS may select the smart camera 710A, the smart thermometer 710B, and the smart speaker 710C as the set of relevant sensors for the fire 752. The IMS may select any number of sensors from a set of pertinent sensors as relevant sensors based on any criteria. In some embodiments, the IMS selects each sensor within the set of sensors pertinent to an emergency, from which data or multimedia was received and assigned a relevancy score exceeding a predetermined relevancy score threshold, as a relevant sensor.

In some embodiments, the IMS selects a limited number of sensors from a set of sensors pertinent to an emergency as relevant sensors. For example, in some embodiments, the IMS selects a maximum of one relevant sensor from a set of sensors pertinent to an emergency. In some embodiments, the IMS selects a maximum of two relevant sensors from a set of sensors pertinent to an emergency. In some embodiments, the relevancy determination module 455 can calculate and assign a relevancy score to the data or multimedia received from the sensors within the set of sensors pertinent to an emergency. For example, in some embodiments, when the multimedia processing module analyzes data or multimedia received from a sensor pertinent to an emergency, the relevancy determination module assigns the data or multimedia a normalized relevancy score between 1 and 10, wherein 10 is the highest possible relevancy score. In some embodiments, the relevancy determination module determines a relevance score for data or multimedia received from a sensor pertinent to an emergency in various ways. In some embodiments, a relevancy score is based at least in part on the type of electronic device from which the data or multimedia was received. For example, in some embodiments, a video stream received from a smart camera may be given a higher relevancy score than a video stream received from a cellphone, or vice versa. In some embodiments, a relevancy score is based at least in part on the distance of the sensor from which the data or multimedia was received from the location of the emergency. In some embodiments, the relevancy score is based at least in part on the likely nature of the emergency. For example, in some embodiments, if the likely nature of an emergency is a fire, a video stream may be given a higher relevancy than an audio stream. In some embodiments, the relevancy score is based at least in part on audio or visual cues detected in the data or multimedia, as discussed above. In some embodiments, each audio or visual cue detected in the data or multimedia is given the same weight by the relevancy determination module. In some embodiments, different audio or visual cues are given different weights by the relevancy determination module. For example, in some embodiments, a human detected in a video received by the IMS may be given more weight by the relevancy determination module when calculating a relevancy score for the video than a dog detected in the video.

In some embodiments, the relevancy determination module employs machine learning techniques when calculating a relevancy score for data or multimedia received from a sensor pertinent to an emergency. For example, in some embodiments, when the relevancy determination module calculates and assigns a relevancy score to data or multimedia received from a sensor pertinent to an emergency, the relevancy determination module stores information regarding the data or multimedia along with the relevancy score in a database (hereinafter "relevancy score database"). In some embodiments, the information regarding the data or multimedia stored in the relevancy score database can include sensor type, device type, timestamp, likely nature of emergency, audio or visual cues, or any other information regarding the data or multimedia. In some embodiments, as will be described below, after identifying a set of sensors pertinent to an emergency, receiving data or multimedia from the set of sensors pertinent to the emergency, and determining a set of relevant sensors from the set of sensors pertinent to the emergency, the IMS or EMS can transmit data or multimedia from the relevant sensors to an emergency service provider (ESP). In some embodiments, the IMS can then receive feedback on the data or multimedia from the relevant sensors from the ESP and store the feedback alongside the information regarding the data or multimedia and the relevancy score in the relevancy score database. For example, in some embodiments, after the data or multimedia is transmitted to the ESP, a member of the ESP may identify or tag the data or multimedia as relevant (e.g., positive affirmation), such as through feedback module 148. Conversely, the member of the ESP may tag the data or multimedia as irrelevant (e.g., negative affirmation). In some embodiments, the member of the ESP may request data or multimedia from another sensor and the IMS can interpret this request as negative affirmation of the original data or multimedia transmitted to the ESP. However, the IMS or EMS may receive feedback (e.g., positive or negative affirmation) regarding the data or multimedia transmitted to an ESP in any other way. In this way, over time, the IMS can assemble a large amount of data within the relevancy score database, which the IMS can then use to train the ability of the relevancy determination module to calculate relevancy scores. For example, in some embodiments, the IMS can apply a convolutional neural network to the relevancy score database to determine how much weight the relevancy determination module should give to various audio cues when determining the relevance of an audio stream received from a sensor pertinent to an emergency.

In some embodiments, after the IMS identifies a set of sensors pertinent to an emergency, the IMS can select one or more relevant sensors from the set of sensors pertinent to the emergency based on one or more prioritization rules. Prioritization rules may be based on various factors, including, but not limited to: device type, media type, location, nature of emergency, or ESP capabilities. For example, in some embodiments, if the EMS is aware that an ESP that is to receive data or multimedia is not capable of receiving a particular type of data or multimedia, the IMS can prioritize other types of data or multimedia when selecting relevant sensors. For example, if an ESP that is to receive data or multimedia cannot receive or process video, the IMS can prioritize an audio stream over a video stream when selecting relevant sensors. In some embodiments, the IMS can prioritize one type of data or multimedia over another. For example, the IMS may prioritize video streams over audio streams when selecting relevant sensors. In some embodiments, the IMS can prioritize one type of data or multimedia over another based on the nature of an emergency or the likely nature of the emergency. For example, if the nature of an emergency is a fire, the IMS may prioritize video streams over audio streams. In some embodiments, the IMS can prioritize one type of data or multimedia over another based on distance from an emergency. For example, the IMS may give priority to video streams within 50 meters of an emergency but prioritize audio streams outside of 50 meters from the emergency. In some embodiments, prioritization rules are predetermined within the IMS (e.g., within the relevancy determination module). In some embodiments, prioritization rules are received from ESPs. For example, in some embodiments, a member of an ESP (e.g., an administrator of the ESP) can submit prioritization rules to the EMS, such as by accessing a software program or website associated with the EMS.

In some embodiments, after the IMS receives data or multimedia from a sensor pertinent to an emergency, the multimedia processing module can summarize the data or multimedia into a summarization, such as a text summary. FIG. 8 depicts (i) an embodiment of a summarization of an audio stream received from a sensor pertinent to an emergency and (ii) an embodiment of a summarization of a video stream received from a sensor pertinent to an emergency. In the first example, the audio summary (i) is a summarization of the audio represented by lines 656C-656E depicted in FIG. 6, wherein the audio was received by the EMS from cellphone communicatively coupled to an intelligent vehicle system that recorded the audio. In this example, the multimedia processing module determines, such as by analyzing the transcription depicted in FIG. 6 (as described above), that the incident is a possible collision involving a vehicle and a pedestrian. The multimedia processing module can use this information to create a description of the audio and incorporate the description into the audio summary (i). In the second example, the video summary (ii) is a summarization of the video received by the smart camera 710A depicted in FIG. 7. In this example, the multimedia processing module determines, such as by analyzing the video recorded by the smart camera 710A (as described above), that the likely nature of the emergency is a fire, and that there is a family and dog present in the room. The multimedia processing module can use this information to create a description of the video and incorporate the description into the video summary (ii). In some embodiments, along with a description of the data or multimedia received from a sensor, a summarization can include information such as media type, device type, location, and timestamp. However, a summarization may include any information regarding an emergency or a sensor. In some embodiments, the multimedia processing module can dynamically update summarizations of data or multimedia received by the EMS. For example, in some embodiments, the multimedia processing module generates a new summarization of the data or multimedia received from a sensor pertinent to an emergency every five or ten seconds. In some embodiments, the multimedia processing module generates a video summarization by selecting one or more key frames within a video and patching the one or more key frames into a video summarization. In some embodiments, a video summarization is a sequence of still images (e.g., KeyFrames). In some embodiments, a video summarization is a sequence of moving images (e.g., video skims). In some embodiments, the multimedia processing module employs clustering techniques, which utilize fuzzy logic, to select one or more key frames from a cluster of frames.

Figure 9A:
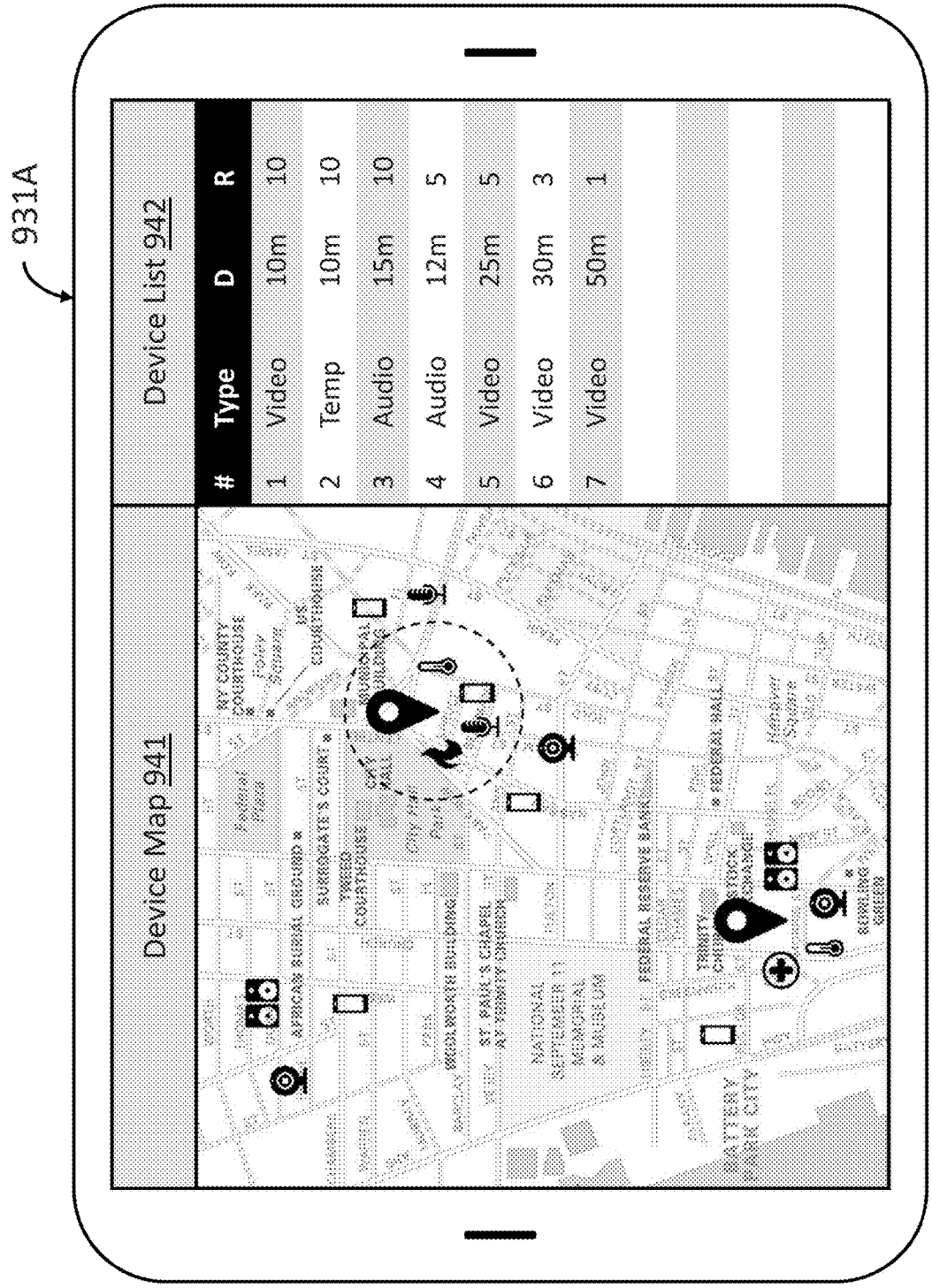
FIG. 9A and FIG. 9B depict ESP systems in accordance with one embodiment of the present disclosure.
Figure 9B:
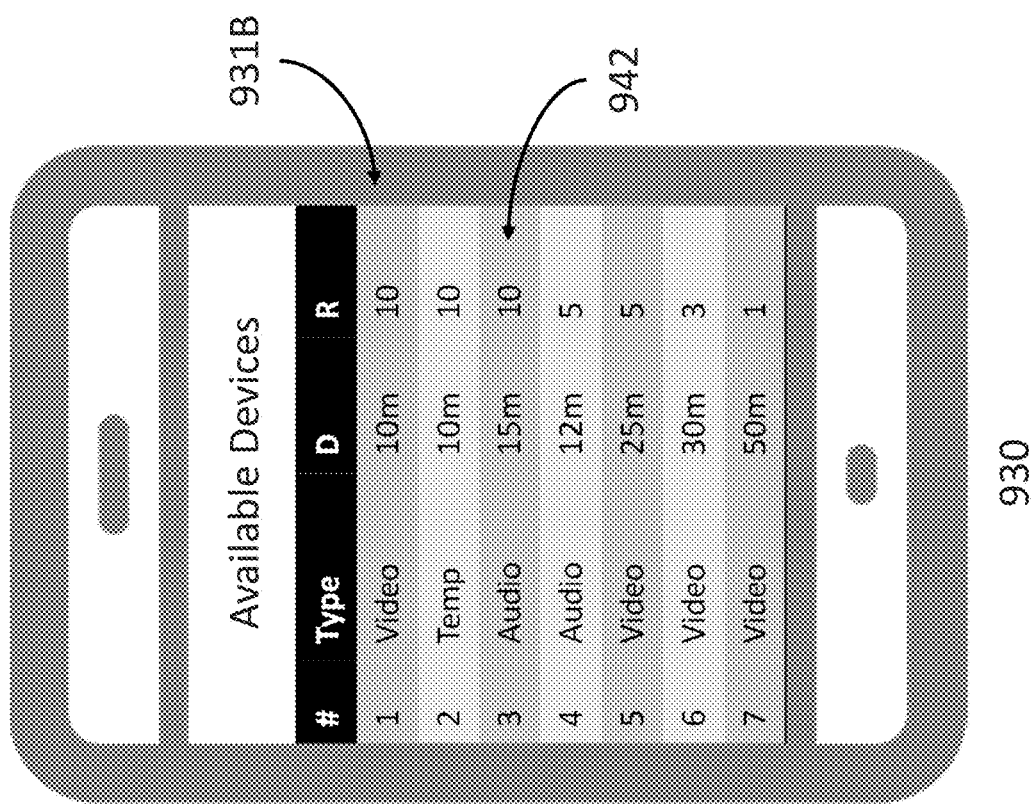
Figure 9B:
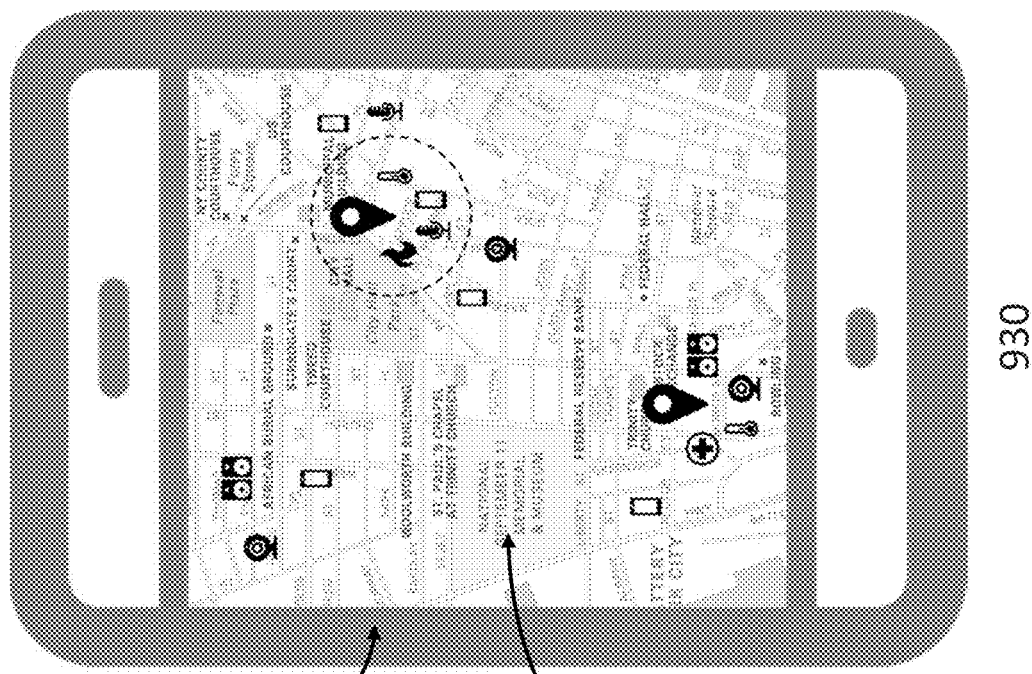

In some embodiments, the IMS can select a sensor from a set of sensors pertinent to an emergency as a relevant sensor based at least in part on input received from an ESP or a member of an ESP. An ESP may be uniquely qualified to determine which data or multimedia is most relevant or most helpful in providing emergency response services. For example, in some embodiments, after the IMS identifies a set of sensors pertinent to an emergency and receives data or multimedia from the set of sensors pertinent to the emergency, the IMS generates a summarization (as described above) of the data or multimedia received for each of the sensors within the set of sensors pertinent to the emergency and transmits the summarizations to an ESP. A member of the ESP can then read the summarizations and, using their experience and trained intuition, select the summarizations that they believe to be most relevant. After receiving selection of a summarization from an ESP, the IMS can select the sensor from which the summarization was generated as a relevant sensor. In some embodiments, after the IMS identifies a set of sensors pertinent to an emergency, the EMS or IMS can generate a map 941 of the sensors pertinent to the emergency and/or a list 942 of the sensors pertinent to the emergency and transmit the map 941 or list of sensors 942 to an ESP. The map 941 or list 942 can then be displayed through the ESP system, such as through a desktop ESP display 931*a* (as depicted in FIG. 9A) or a mobile ESP display 931*b* (as depicted in FIG. 9B). The map 941 and list 942 can present, graphically and textually, respectively, information regarding the emergency and the set of sensors pertinent to the emergency. For example, the map 941 and list 942 can include the location of the emergency, the nature (or likely nature) of the emergency, the types of electronic devices, the types of data or multimedia, the distances of the sensors from the location of the emergency, or relevancy scores of the data or multimedia. In some embodiments, a member of the ESP then selects one or more sensors through the desktop or mobile ESP display 931, such as by clicking on a sensor on the map 941 or list 942, and the IMS can select the one or more sensors selected by the member of the ESP as relevant sensors. In some embodiments, a member of an ESP can submit a radius from the location of an emergency through the map 941 and the IMS can select the sensors within the radius from the set of sensors pertinent to the emergency as relevant sensors.

Transmission and Management

In some embodiments, after receiving an emergency alert, identifying a set of sensors pertinent to an emergency, and selecting a set of relevant sensors from the set of sensors pertinent to the emergency, the EMS or IMS can transmit data or multimedia from the set of relevant sensors to an emergency service provider (ESP). For example, referring again to the fire 752 depicted in FIGS. 7A-7C, after receiving an emergency alert generated by the smart speaker 710C in response to a voice command by the smart speaker 710C from a member of the family 758C, the IMS identifies the smart camera 710A, the smart thermometer 710B, and the smart speaker 710C as the set of sensors pertinent to the emergency (e.g., the fire 752), as described above. In this example, the IMS then receives data or multimedia from the smart camera 710A, the smart thermometer 710B, and the smart speaker 710C (e.g., a first set of multimedia contents received from the set of sensors pertinent to the emergency), as described above, and selects the smart camera 710A as a relevant sensor (e.g., the set of relevant sensors), as described above. In this example, after selecting the smart camera 710A as a relevant sensor, the IMS then transmits the data or multimedia received from the smart camera 710A (e.g., a second set of multimedia contents received from the set of relevant sensors) to an ESP.

In some embodiments, an ESP responding to an emergency sends a request for multimedia regarding the emergency to the EMS, and the EMS transmits the second set of multimedia contents received from the set of relevant sensors the ESP in response to receiving the request for multimedia. For example, an ESP may receive a 9-1-1 call regarding an emergency and submit a request for multimedia regarding the emergency to the EMS. In some embodiments, the request for multimedia includes a phone number. In some embodiments, the EMS uses a phone number included in the request for multimedia to locate associated emergency or a set of sensors pertinent to the emergency. In some embodiments, the request for multimedia includes a location of the emergency. In some embodiments, a member of an ESP submits a request for multimedia to the EMS through the ESP system, such as by selecting a button on the ESP display. In some embodiments, the EMS identifies an ESP responsible for responding to a particular emergency or actively responding to the particular emergency and transmits an alert to the ESP notifying the ESP that the EMS has access to electronic devices that may provide data or multimedia pertinent to the emergency. In such embodiments, the EMS may present an option (e.g., a button) to submit a request for multimedia to the ESP alongside the alert. In some embodiments, the EMS can transmit data or multimedia received from a relevant sensor to an ESP without receiving a request for multimedia.

In some embodiments, the EMS transmits data or multimedia received from an electronic device directly to an ESP by connecting the ESP system to the outbound stream of data from the electronic device. For example, if the EMS receives a stream of temperature data from a smart thermometer, the EMS can redirect (or additionally direct) the stream of temperature directly to an endpoint of the ESP system, such that the ESP system receives the stream of temperature data from the smart thermometer without the stream of data passing through the EMS first. In another example, if the EMS receives a video stream from a smart camera, the EMS can direct the video stream directly to an endpoint of the ESP system. Alternatively, the EMS can provide the ESP with a weblink to a domain hosting the video stream. In some embodiments, the EMS transmits data or multimedia received from an electronic device indirectly to an ESP (e.g., the EMS consumes the data or multimedia before relaying the data or multimedia to the ESP). For example, if the EMS can receive a video stream from a smart camera to an endpoint of the EMS and then transmit the video stream from the EMS to an endpoint of the ESP system. Alternatively, the EMS can generate a video stream from a smart camera by continuously querying the smart camera for a still image (e.g., two still images per second) and patching the images together to form a video stream after the still images are received by the EMS. The EMS can then transmit the patched together video stream to the ESP. In some embodiments, after receiving multimedia contents from a set of relevant sensors, the IMS can generate one or more summarizations of the multimedia contents (as described above) and transmit the one or more summarizations to an ESP alternatively or additionally to the multimedia contents. However, in some embodiments, the EMS transmits data or multimedia received from an electronic device to an ESP in any other way.

Figure 10A:
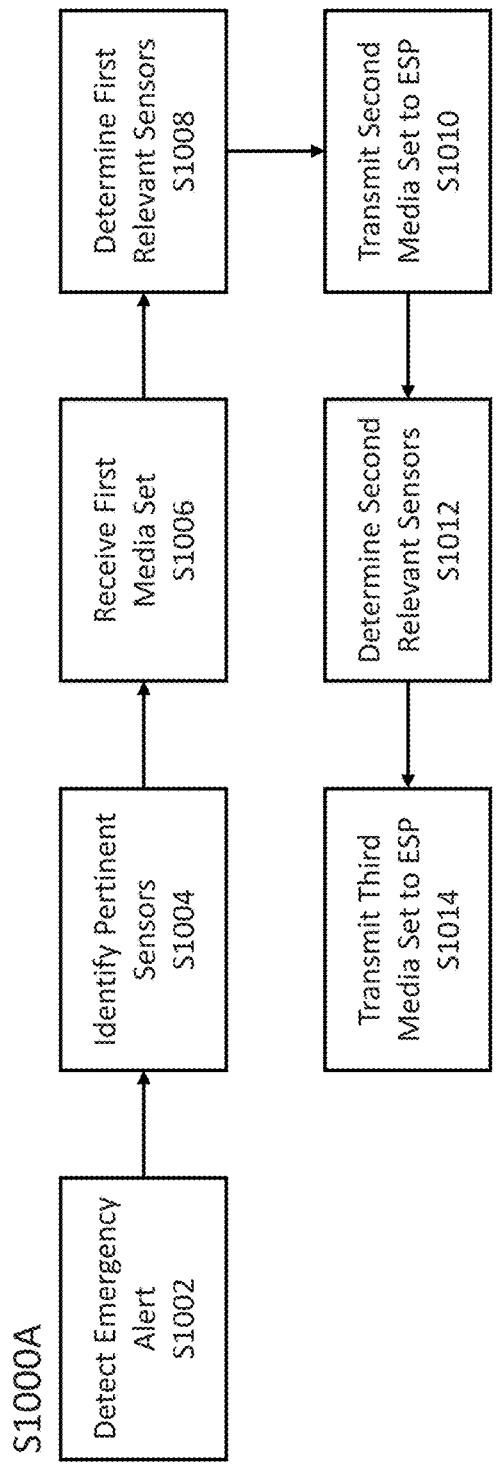
FIG. 10A and FIG. 10B depict method flow diagrams in accordance with one embodiment of the present disclosure.
Figure 10B:
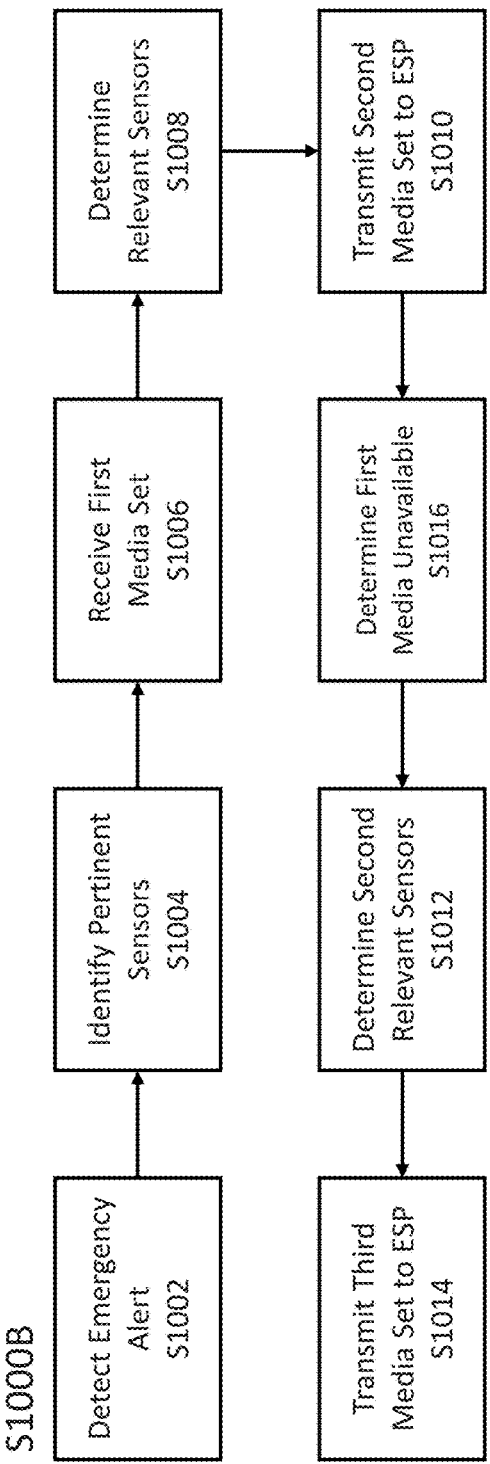

In some embodiments, after transmitting data or multimedia to an ESP, the EMS actively manages the transmission of the data or multimedia to the ESP. In some embodiments, the EMS can manage the transmission of data or multimedia to an ESP by dynamically changing the data or multimedia transmitted to the ESP. FIGS. 10A and 10B depict method flow diagrams of a method for transmitting multimedia from an electronic device to an emergency service provider (ESP) by an emergency management system (EMS) and managing the transmission of the multimedia. In FIG. 10A, the method S1000A begins with the steps of detecting an emergency alert S1002, identifying a set of sensors pertinent to an emergency associated with the emergency alert S1004, receiving a first set of multimedia contents from the set of sensors pertinent to the emergency S1006, selecting a first set of relevant sensors from the set of sensors pertinent to the emergency S1008, and transmitting a second set of multimedia contents from the first set of relevant sensors to an ESP S1010, as described above. In this example, the method continues with selecting a second set of relevant sensors from the set of sensors pertinent to the emergency S1012. In some embodiments, the ESP chooses to receive data or multimedia from a different set of sensors. For example, in some embodiments, a member of the ESP indicates that one or more of the multimedia contents is not relevant (or less relevant) to the emergency. In this example, in response to receiving the indication, the IMS can select one or more additional or alternative relevant sensors (e.g., the second set of relevant sensors) from the set of sensors pertinent to the emergency and transmit multimedia contents from the second set of relevant sensors to the ESP (e.g., transmitting a third set of multimedia contents from the second set of relevant sensors to the ESP S1014). In some embodiments, the IMS selects the second set of relevant sensors in response to determining that one or more of the first set of multimedia contents has become unavailable S1016, as depicted in method S1000B in FIG. 10B. For example, during an emergency, an active sensor pertinent to the emergency may become inactive. For example, a user recording a video of the emergency on their cellphone may stop recording. In another example, a fire may destroy a smart camera recording a video of the fire or otherwise render the smart camera incapable of recording or transmitting the video.

In some embodiments, the IMS selects the second set of relevant sensors by selecting the next most relevant sensor(s) from the set of sensors pertinent to the emergency that were not included in the first set of relevant sensors. In some embodiments, the IMS selects the second set of relevant sensors by recalculating the relevancy score for each sensor within the set of sensors pertinent to the emergency. As an emergency situation progresses, sensors pertinent to the emergency may become more or less relevant. For example, the location of the emergency may change during the course of the emergency, and sensors that were closer to the location of the emergency may become farther than some others, rendering them less relevant. In some embodiments, the EMS can actively monitor the relevancy of the sensors within the set of sensors pertinent to an emergency. For example, in some embodiments, the EMS recalculates the relevancy score of each sensor within the set of sensors pertinent to an emergency every five or ten seconds. In some embodiments, the EMS can select the second set of relevant sensors in response to determining that a relevancy score of a sensor within the set of sensors pertinent to the emergency or the set of relevant sensors has changed. In some embodiments, a member of an ESP can select one or more additional or alternative sensors from the set of sensors pertinent to the emergency as relevant sensors. For example, in some embodiments, the EMS or IMS generates and provides an ESP with a map or list of the sensors pertinent to an emergency. In such an embodiment, after receiving multimedia contents from a first set of relevant sensors selected from the set of sensors pertinent to the emergency, a member of the ESP may select a second set of relevant sensors from the map or list of the sensors pertinent to the emergency. However, the IMS may select a second set of relevant sensors in any other way. In some embodiments, the IMS may select multiple additional or alternative sets of relevant sensors as necessary.

Figure 11:
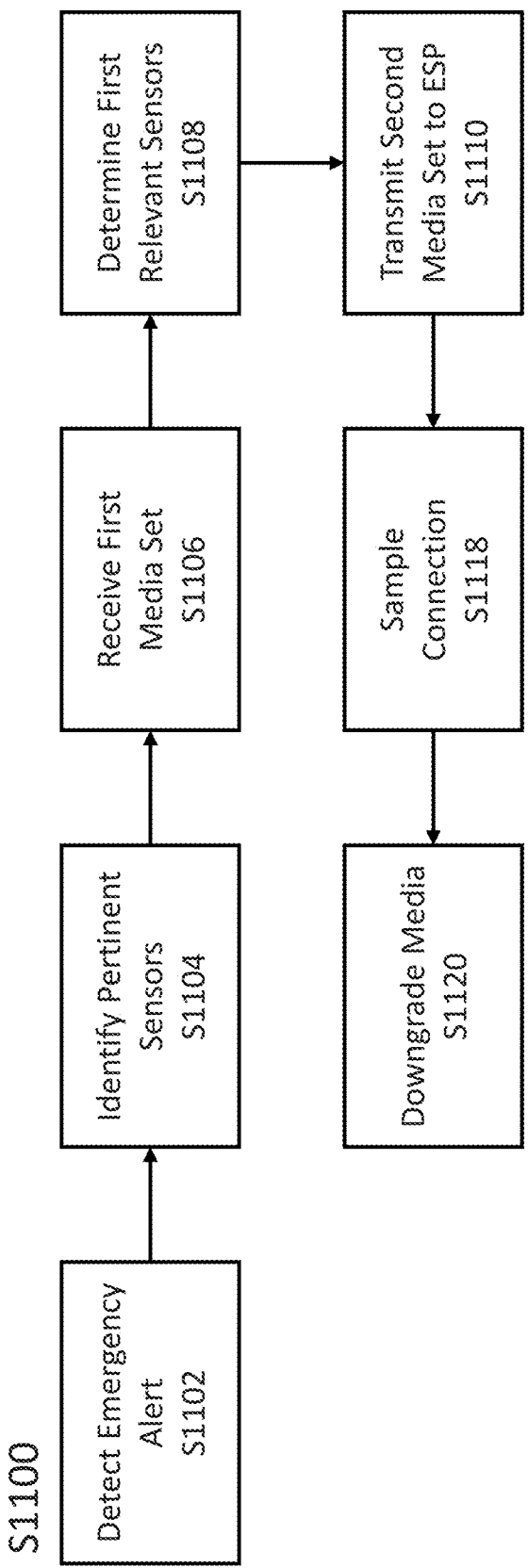
FIG. 11 depicts a method flow diagram in accordance with one embodiment of the present disclosure.

In some embodiments, the EMS actively manages the transmission of multimedia contents to an ESP by monitoring the transmission. FIG. 11 depicts an embodiment of a method flow diagram of a method S1100 for transmitting multimedia from an electronic device to an emergency service provider (ESP) by an emergency management system (EMS) and managing the transmission of the multimedia. In this embodiment, the method S1100 begins with the steps of detecting an emergency alert S1102, identifying a set of sensors pertinent to an emergency associated with the emergency alert S1104, receiving a first set of multimedia contents from the set of sensors pertinent to the emergency S1106, selecting a first set of relevant sensors from the set of sensors pertinent to the emergency S1108, and transmitting a second set of multimedia contents from the first set of relevant sensors to an ESP S1110, as described above. In this embodiment, the method continues by sampling a connection quality of the transmission of a multimedia content within the second set of multimedia contents to the ESP S1118. For example, the EMS can sample the bandwidth of a communication link between the EMS and the ESP. Alternatively, in some embodiments, the EMS samples the success rate of data packet transmission to the EMS. In some embodiments, in response to the connection quality falling below a threshold value, the EMS downgrades the multimedia content S1120. For example, in some embodiments, the EMS downgrades an audio recording or audio stream into a text transcription (e.g., the EMS stops transmitting the audio and begins transmitting a text transcription of the audio). In some embodiments, the text transcription is transmitted to the ESP as an SMS or MMS text message. In some embodiments, the EMS downgrades a video recording or video stream into still images. In some embodiments, the EMS downgrades a video stream by lowering the framerate of the video stream. In some embodiments, the EMS downgrades an audio or video recording or stream into a summarization, as described above. However, the EMS can downgrade a multimedia content in any other way.

In some embodiments, the EMS transmits emergency data or multimedia to ESPs using web real-time communication (WebRTC). WebRTC is a set of protocols used to provide internet browsers and mobile applications with real-time communications capabilities using application programming interfaces (APIs). In some embodiments, the EMS transmits emergency data or multimedia to ESPs using the real-time transport protocol (RTP) and manages the transmission of the emergency data or multimedia using RTP control protocol (RTCP). In some embodiments, the EMS additionally or alternatively utilizes the real time streaming protocol (RTSP) when transmitting emergency data or multimedia to ESPs. However, the EMS may use any system or protocol or combination of systems and protocols when transmitting emergency data or multimedia.

Contextual Relevance

In some embodiments, an electronic device or sensor can autonomously transmit emergency data or multimedia to the emergency management system (EMS) when the electronic device or sensor independently determines that it has collected relevant emergency data or multimedia. For example, in some embodiments, if a smart camera or smart thermostat autonomously detects a fire (such as in the example emergency illustrated by FIG. 7A), the smart camera or smart thermostat can autonomously transmit an emergency alert along with any emergency data or multimedia gathered by the device (e.g., video or temperature data; location) to the EMS without first being accessed by the EMS. The EMS can then determine an appropriate emergency service provider (ESP) to receive the emergency alert and any accompanying emergency data or multimedia (such as by using a geofence system or emergency data subscription system, as described above) and transmit the emergency alert and accompanying emergency data or multimedia to the ESP. In another example, in some embodiments, if a camera integrated into a vehicle detects a license plate of a wanted vehicle (e.g., a stolen vehicle or a vehicle listed in an AMBER alert), an intelligent vehicle system integrated into the vehicle can autonomously transmit an emergency alert along with any emergency data or multimedia (e.g., photos or videos; location of the vehicle) captured by the camera to the EMS. The EMS can then determine an appropriate ESP to receive the emergency alert and transmit the emergency alert and the accompanying multimedia to the ESP. In some embodiments, the EMS can receive updated emergency data or multimedia and transmit the updated emergency data or multimedia to the ESP. For example, in some embodiments, an intelligent vehicle system integrated into a private vehicle, after detecting a license plate of a vehicle listed in an AMBER alert using a camera integrated into the private vehicle, can transmit the location of the private vehicle to the EMS, which can then transmit the location to an ESP. The driver of the private vehicle can decide to follow the vehicle listed in the AMBER alert, and the intelligent vehicle system can periodically transmit updated locations of the private vehicle to the EMS and ultimately to the ESP. The ESP can then use the updated locations to track and find the vehicle listed in the AMBER alert.

Privacy and Access Control

Devices capable of generating and sharing emergency data and multimedia that may be useful for emergency service providers (ESPs) and first responders when they are responding to emergencies have become plentiful. In many cases, a single person or home may possess multiple devices capable of generating and sharing emergency data and multimedia. For example, a person may have both a cell phone and a wearable device (e.g., a smartwatch) that can gather data and multimedia during an emergency. In another example, a single room within a home may contain a smart camera, a smart thermostat, and a smart speaker (such as the room depicted in FIG. 9A). In some embodiments, various IoT devices like temperature sensors and motion sensors function via a hub or intermediary device, which may be controlled via a user's mobile phone. However, because these devices are all around users at all times, there may be certain devices that a user may not want to provide access to. For example, a person may not want to provide access a smart camera installed in their bedroom under any circumstances. Or, for example, they may not want to provide access to the smart camera installed in their bedroom unless the emergency is a fire.

Figure 12A:
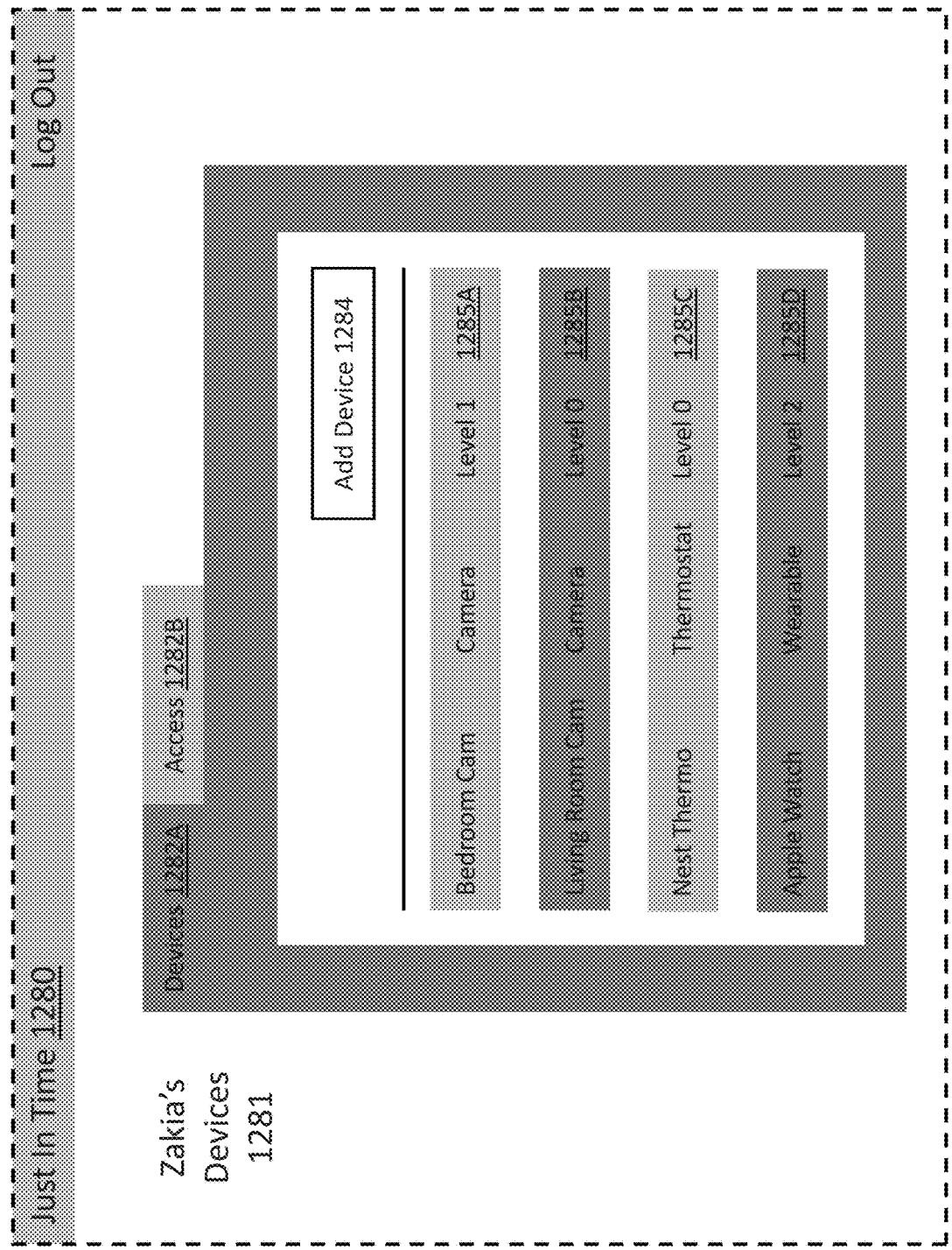
FIGS. 12A, 12B, 12C, and 12D illustrate examples of an emergency access management portal in accordance with one embodiment of the present disclosure.

Provided herein are systems and methods for managing access to connected devices during emergencies. In some embodiments, an emergency management system (EMS) provides an emergency access management portal for users to register their connected devices and assign various levels of permission or access to those registered devices during emergencies. FIGS. 12A-12D depict various embodiments of an emergency access management portal 1280. In some embodiments, the emergency access management portal 1280 is a web application accessible through a standard internet browser using a URL. In some embodiments, as depicted by FIG. 12A, the emergency access management portal 1280 includes two tabs 1282, a Devices tab 1282A and an Access tab 1282B. In the Devices tab 1282A, users can register their devices under their account, such as by selecting the Add Device button 1284. In some embodiments, when a user selects the Add Device button 1284 to register a new device under their account, the emergency access management portal 1280 prompts the user to enter information about the device, such as the device's IP address, the make and model of the device, the type of data or multimedia that the device is able to produce or capture, a name of the device, or a type of the device. In some embodiments, the EMS additionally or alternatively provides mobile applications that can be downloaded onto connected devices and used to register the devices with the emergency access management portal 1280. Once a device has been registered with the emergency access management portal 1280, the user can assign an access level to the device, as described below. In the example depicted by FIG. 12A, four devices 1285 have been registered under "Zakia's Devices" 1281—"Bedroom Cam" 1285A, "Living Room Cam" 1285B, "Nest Thermo" 1285C, and "Apple Watch" 1285D. The name of the device, type of the device, and the access level assigned to the device is displayed for each device 1285. For example, "Bedroom Cam" 1285A is a Camera device type and has been assigned an access level of Level 1. "Living Room Cam" 1285B is also a Camera device type but has been assigned an access level of Level 0. In some embodiments, a user can access or edit information or the access level of a device by selecting the device 1285 within the interface (e.g., a graphical user interface) of the emergency access management portal 1280.

Figure 12B:
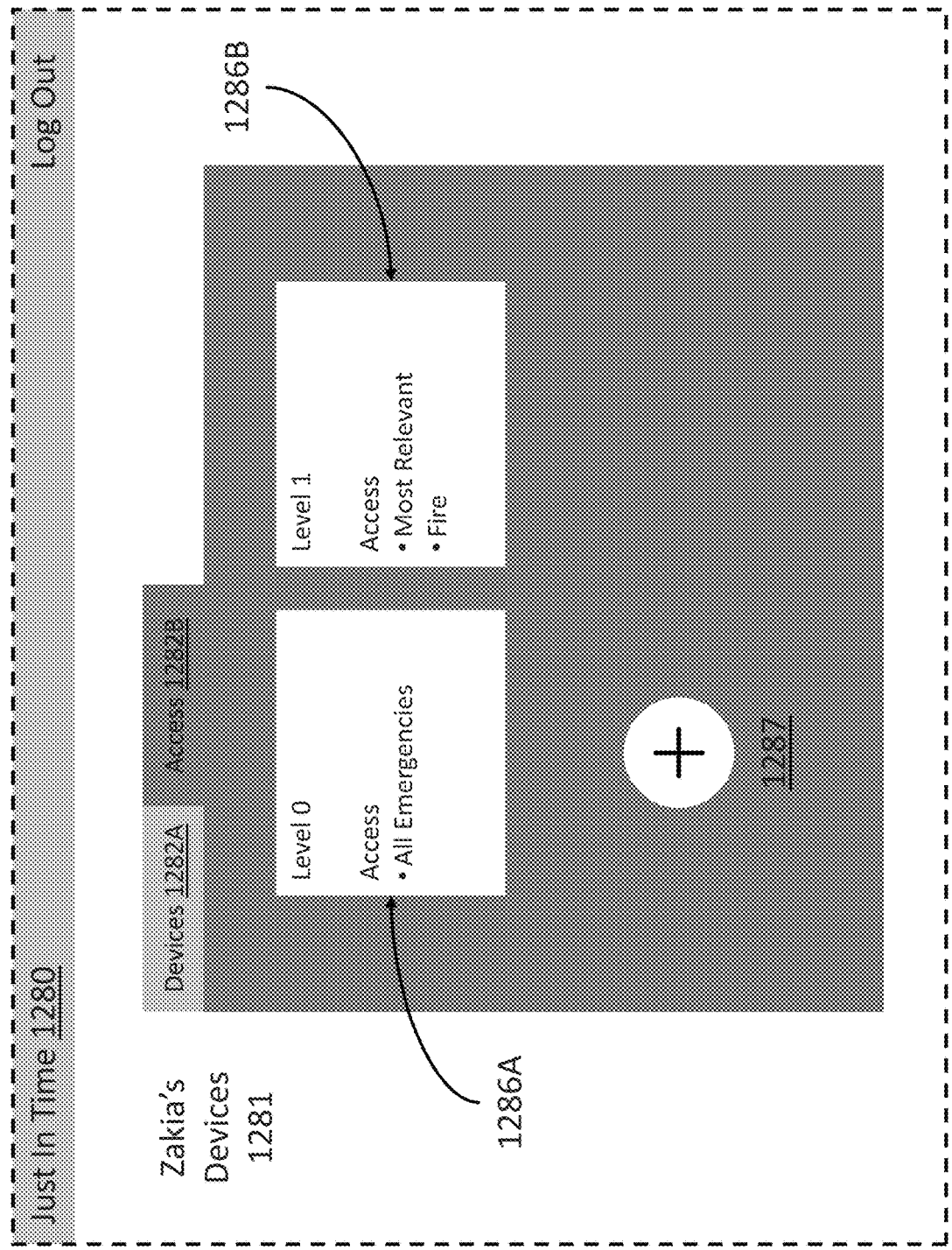

In some embodiments, the access level for a particular device can be customized so that the emergency management system (EMS) can only access the particular device in certain situations, such as during particular times or types of emergencies. In some embodiments, access levels are created on a per device basis. For example, in some embodiments, when a user registers a device with the emergency access management portal 1280, the user must select the particular circumstances for which the EMS can access the device during emergencies. In some embodiments, access levels are created independently of devices and can be later assigned to particular devices, as depicted by FIG. 12A, wherein each device 1285 has been assigned an access level. In some embodiments, a user can access an Access tab 1282B within the interface of the emergency access management portal 1280 to create, edit, or delete access levels 1286 that can be assigned to the user's connected devices, as illustrated by FIG. 12B. In the example illustrated by FIG. 12B, a user has previously created two different access levels 1286, Level 0 1286A and Level 1 1286B. As shown in FIG. 12B, Level 0 1286A allows the EMS to access a device assigned to Level 0 during any and all emergencies, while Level 1 1286B allows the EMS to access a device assigned to Level 1 when the device is determined to be the most relevant device (as described above) or when the emergency type is a fire. For example, as depicted in FIG. 12A, the device named "Bedroom Cam" 1285A has been assigned to Level 1. This might make sense for the user because the bedroom is often a private space, but the user may want to provide the EMS access to a camera in their bedroom during an emergency when the camera is the most relevant sensor (as described above) or when a visual of the emergency may be particularly helpful, such as in the case of a fire. In this way, access levels 1286 can create rules for when the EMS can access a particular device or sensor. For example, the rule defined by Level 1 1286B is "the EMS can access a device assigned to Level 1 during an emergency when the device is determined to be the most relevant sensor OR when the emergency type is a fire."

Figure 12C:
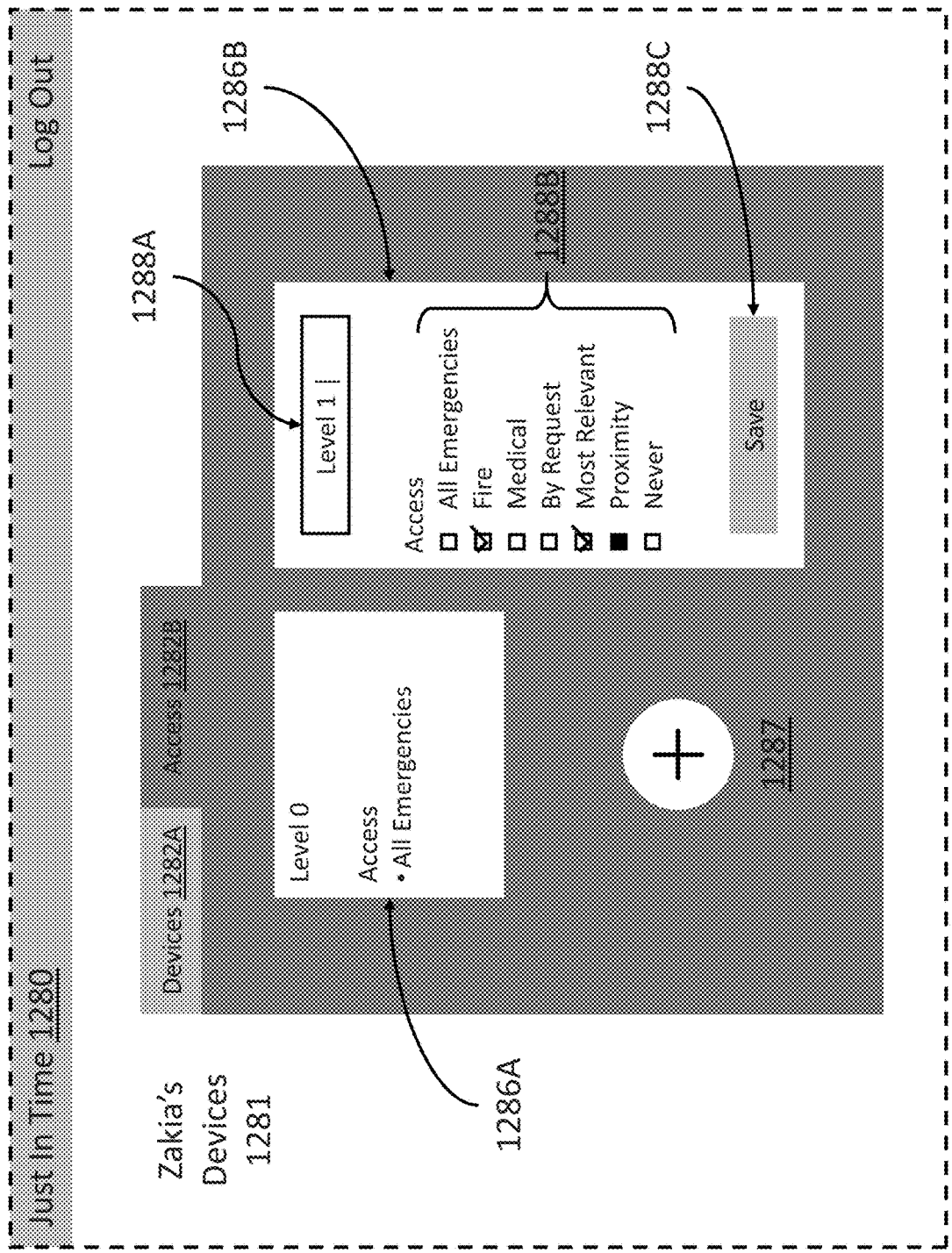
Figure 12D:
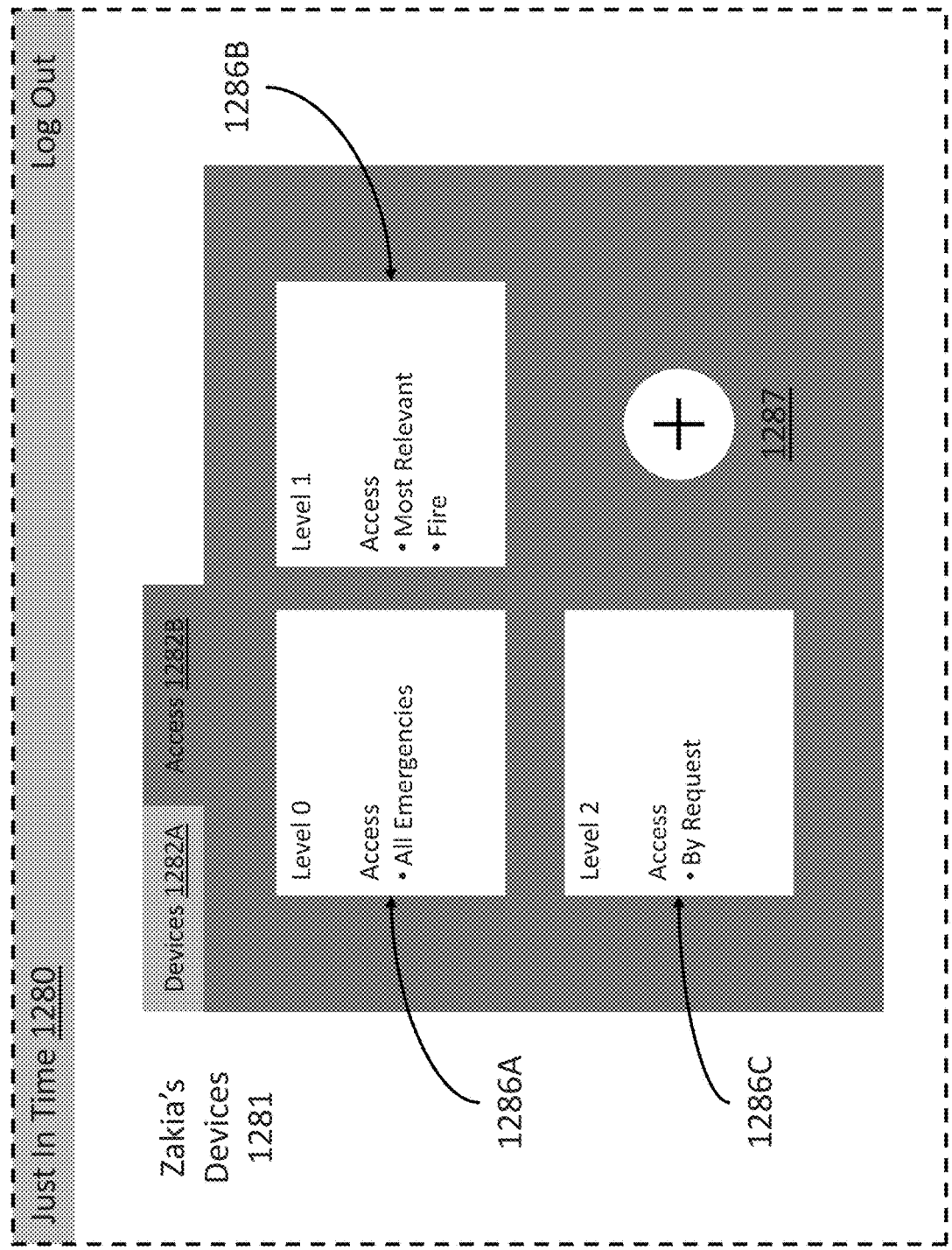

In some embodiments, a user can edit an access level 1286 by selecting the access level 1286 within the emergency access management portal 1280, as illustrated by FIG. 12C. In the example illustrated by FIG. 12C, a user has selected to edit Level 1 1286B. In some embodiments, a user can edit the name of an access level 1288A and the permissions of an access level 1288B. In the example illustrated by FIG. 12C, the emergency access management portal 1280 displays various permissions 1288B that may be selected for an individual access level 1286, including (but not limited to): All Emergencies (e.g., the EMS can access a device assigned to this level during any and all emergencies), Fire (e.g., the EMS can access a device assigned to this level during fire emergencies), Medical (e.g., the EMS can access a device assigned to this level during medical emergencies), By Request (e.g., the EMS must request access to a device assigned to this level during emergencies, as described below), Most Relevant (e.g., the EMS can access a device assigned to this level during an emergency when the device is determined to be the most relevant sensor, as described above), Proximity (e.g., the EMS can access a device assigned to this level during an emergency when the device is determined to be within a threshold distance from a location associated with the emergency), and Never (e.g., the EMS can never access a device assigned to this level during any emergency). In some embodiments, a user can select a permission as optional or required. For example, in the edited version of Level 1 1286B illustrated by FIG. 12C, the Fire and Most Relevant permissions have been selected as optional (marked with a check mark) and the Proximity permission has been selected as required. The new ruled defined by the edited Level 1 would be "the EMS can access a device assigned to Level 1 during an emergency when the device is determined to be within a threshold distance from a location associated with the emergency AND (when the device is determined to be the most relevant sensor OR when the emergency type is fire)." This means that EMS could access a device assigned to the edited Level 1 during an emergency when the device is determined to be the most relevant sensor or when the emergency type is fire, but the device must always be within a threshold distance from a location associated with the emergency. In some embodiments, the threshold distance is determined by the EMS (e.g., based on the type of emergency, as described above). In some embodiments, the threshold distance is defined by the user (e.g., set within the emergency access management portal 1280). In some embodiments, a user can create new permissions 1288B that can be selected for an individual access level 1286, such as a Morning permission (e.g., the EMS can access a device assigned to this level during AM hours). In some embodiments, after editing an access level 1286, a user can save the edited access level by selecting the Save button 1288C. In some embodiments, a user can create a new access level 1286 by selecting a create new access level button 1287. For example, as illustrated by FIG. 12D, a user has selected the create new access level button 1287 and created a new access level, Level 2 1286C. The only permission selected for Level 2 1286C is By Request. The rule defined by Level 2 1286C would be "the EMS must request to access a device assigned to this level during emergencies (as described below)."

In some embodiments, before the emergency management system (EMS) access a device during an emergency to obtain emergency data or multimedia from the device and transmit the emergency data or multimedia to an emergency service provider (ESP) (as described above), the EMS must first identify an access level assigned to the device and determine if the EMS has permission to access the device for the emergency based on the access level. For example, in the emergency illustrated by FIG. 7A, there are three connected devices 710 in a living room during a fire 752: a smart camera 710A, a smart thermometer 710B, and a smart speaker 710C. In this example, the owner of the three devices has registered all three devices with the emergency access management portal 1280 and assigned all three devices a respective access level 1286. In this example, smart camera 710A has been assigned Level 1 1286B; smart thermometer 710B has been assigned Level 0 1286A, and smart speaker 710C has been assigned Level 2 1286C, as illustrated by FIG. 12D. In this example, after detecting the fire 752, the EMS identifies all three connected devices 710 as relevant sensors to the emergency (as described above) and attempts to obtain emergency data or multimedia from each of the three connected devices 710 and transmit the emergency data or multimedia to an appropriate ESP. However, in this embodiment, the EMS must first identify the access levels 1286 assigned to the respective devices 710 and determine if the EMS has permission to access each of the devices 710.

In some embodiments, the EMS determines if the EMS has permission to access a device during an emergency according to the rule defined by an access level assigned to the device. In this example, the EMS identifies that the smart camera 710A has been assigned Level 1 1286B. The rule defined by Level 1 1286B is "the EMS can access a device assigned to Level 1 during an emergency when the device is determined to be the most relevant sensor OR when the emergency type is a fire" (as described above). Thus, in this example, the EMS does have permission to access and obtain emergency data or multimedia from the smart camera 710A because the emergency type has been identified as a fire. Because the emergency type has been identified as a fire, whether or not the smart camera 710A has been determined to be the most relevant sensor is rendered immaterial to determining if the EMS can access the smart camera 710A. In this example, the EMS also identifies that the smart thermometer 710B has been assigned Level 0 1286A. The rule defined by Level 0 1286 is "the EMS can access a device assigned to Level 1 during any and all emergencies." Thus, in this example, the EMS does have permission to access and obtain emergency data or multimedia from the smart thermometer 710B. Finally, in this example, the EMS also identifies that the smart speaker 710C has been assigned Level 2 1286C. The rule defined by Level 2 1286C is "the EMS must request access to a device assigned to Level 2 during emergencies." Thus, in this example, the EMS does not have permission to access and obtain multimedia from the smart speaker 710C, but may request access, as described below. For example, the EMS can deliver a multimedia inquiry (e.g., "911 would like to access this speaker, please confirm") to the smart speaker to be played audibly through the smart speaker. A person (e.g., the man or woman within the family 758C illustrated by FIG. 7A) may confirm the multimedia inquiry by audibly responding in the affirmative (e.g., "access granted"), thereby giving permission to the EMS to access and obtain emergency data or multimedia from the smart speaker 710C. Or, for example, the EMS can deliver a multimedia inquiry to a second device associated with the smart speaker (e.g., a cell phone or smart watch belonging to the man or woman within the family 758C) to request access to the smart speaker 710C, as described below.

Requesting Emergency Data and Multimedia

In some embodiments, as mentioned above, when the EMS identifies a device or sensor associated with an emergency, the EMS must request access to the device or sensor before accessing and obtaining emergency data or multimedia from the device or sensor. In some embodiments, a method for transmitting multimedia from an electronic device to an emergency service provider (ESP) by an emergency management system (EMS) comprises: (a) identifying an electronic device associated with an emergency alert; (b) delivering a multimedia inquiry to the electronic device; (c) receiving a confirmation of the multimedia inquiry from the electronic device; (d) determining an emergency service provider (ESP) to receive multimedia from the electronic device using a location of the electronic device and a geofence system; (e) establishing a communication link between the electronic device and the ESP; and (f) transmitting multimedia content from the electronic device to the ESP via the communication link. In some embodiments, the multimedia content comprises a video feed. In some embodiments, transmitting the multimedia content from the electronic device to the ESP via the communication link comprises: (a) hosting the video feed at a remote server; and (b) providing a web link to the ESP, wherein the web link points to the video feed hosted on the remote server. In some embodiments, identifying the electronic device associated with the emergency alert comprises autonomously receiving the emergency alert from the electronic device when the electronic device executes an emergency phone call. In some embodiments, the method further comprises: (a) displaying a multimedia access button within an emergency response application executed on a computing device at the ESP; (b) establishing the communication link between the electronic device and the ESP in response to receiving selection of the multimedia access button; and (c) displaying the multimedia content through the emergency response application. In some embodiments, the method further comprises: (a) displaying a media access button within an emergency response application executed on a computing device at the ESP; (b) receiving selection of the multimedia access button; and (c) delivering the multimedia inquiry to the electronic device in response to receiving the selection of the multimedia access button. In some embodiments, identifying the electronic device associated with the emergency alert comprises receiving an emergency data request from the ESP, wherein the emergency data request is generated and transmitted by the emergency response application in response to receiving the selection of the multimedia access button and wherein the emergency data request comprises an identifier of the electronic device. In some embodiments, the identifier of the electronic device is a phone number. In some embodiments, the emergency response application is a web application accessible via a web browser using a URL. In some embodiments, the emergency alert is an emergency call made from the electronic device and wherein identifying the electronic device associated with the emergency alert comprises [autonomously] detecting the emergency call made by the electronic device. In some embodiments, determining the ESP to receive multimedia from the electronic device comprises: (a) retrieving a plurality of geofences associated with a plurality of ESPs including the ESP; and (b) determining that the location of the electronic device is within a geofence associated with the ESP. In some embodiments, the multimedia inquiry is an SMS message comprising a web link and wherein confirmation of the multimedia inquiry comprises selection of the web link. In some embodiments, the multimedia inquiry is a push notification and wherein confirmation of the multimedia inquiry comprises selection of the push notification. In some embodiments, the method further comprises: (a) sampling a connection quality of the transmission of the multimedia content; and (b) in response to the connection quality falling below a threshold value, downgrading the multimedia content. In some embodiments, the multimedia media content comprises a video feed; and the video feed is downgraded to image stills or reduced framerate or resolution. In some embodiments, the multimedia content comprises a video file; and the video file is downgraded to a summarization. In some embodiments, the multimedia content comprises an audio feed or audio file; and the audio feed or audio file is downgraded to a text transcription.

Figure 13:
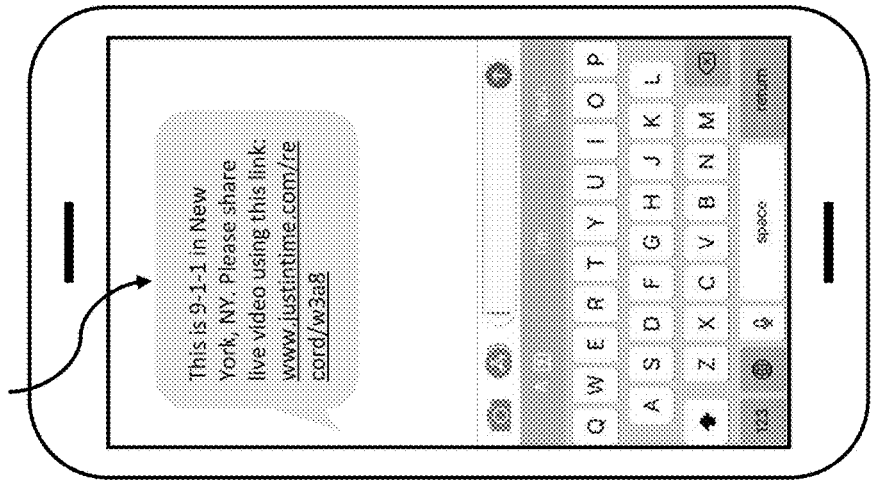
FIG. 13 illustrates an example of a multimedia inquiry in accordance with one embodiment of the present disclosure.
Figure 13:
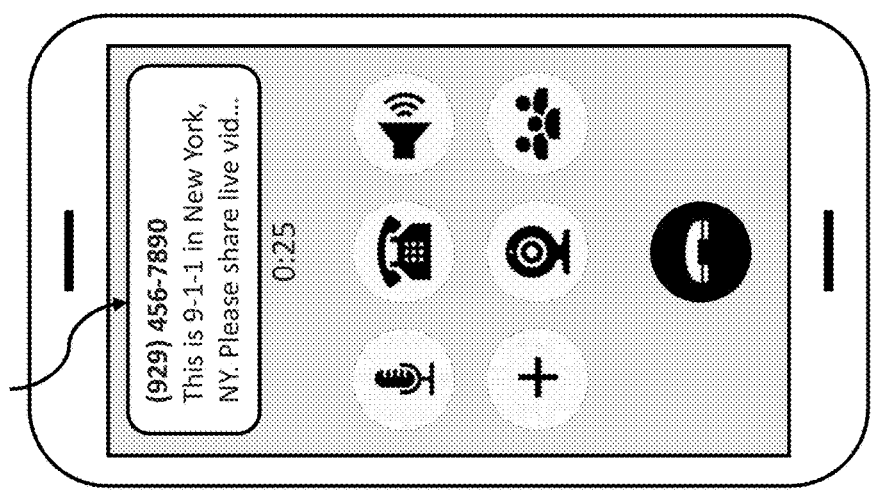
Figure 13:
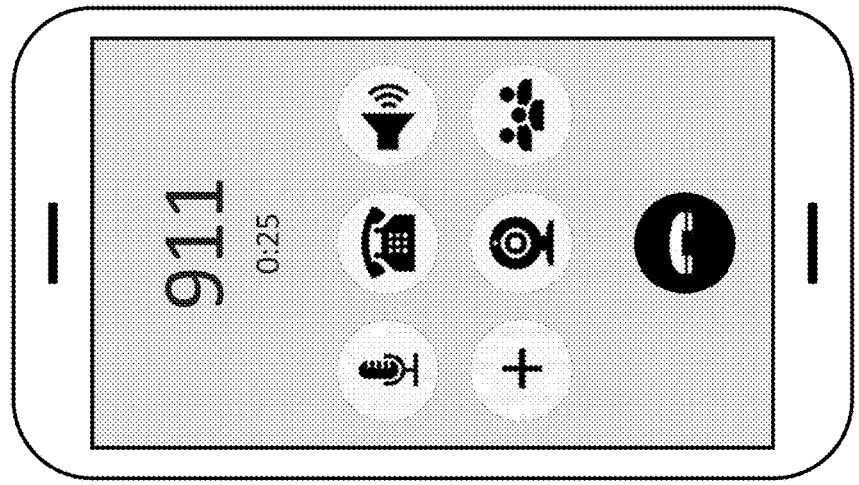

For example, FIG. 13 illustrates a multimedia inquiry delivered to an electronic device. In some embodiments, the emergency management system (EMS) identifies an electronic device (e.g., a cell phone) as associated with an emergency alert when an emergency call is made from the electronic device, which generates and transmits the emergency alert to the EMS in parallel. Thus, the EMS identifies the electronic device as associated with an emergency alert by receiving the emergency alert from the electronic device. In some embodiments, the electronic device generates the emergency alert and transmits the emergency alert to a third-party server system, which then transmits the emergency alert to the EMS, allowing the EMS to identify the electronic device as associated with the emergency alert. However, in some embodiments, the EMS identifies an electronic device as associated with an emergency alert by receiving an emergency data request or multimedia request including an identifier of the electronic device (e.g., a phone number) from an emergency service provider (ESP), as described below. In the example illustrated by FIG. 13, an emergency call has been made from electronic device 1310, thereby generating an emergency alert. The EMS has identified the electronic device as associated with the emergency alert, as described above. After identifying the electronic device as associated with the emergency alert, the EMS has delivered a multimedia inquiry 1304 to the electronic device 1310 to request access to the electronic device 1310 from a user of the electronic device. In this embodiment, the multimedia inquiry 1304 is a text message that includes a written request for multimedia ("This is 9-1-1 in New York, NY. Please share live video using this link:") and a weblink (e.g., a URL) that the user can use to confirm the multimedia inquiry 1304 and allow the EMS to access the electronic device 1310. In some embodiments, the EMS autonomously delivers a multimedia inquiry 1304 to an electronic device in response to receiving an emergency alert associated with the electronic device. In some embodiments, the EMS delivers a multimedia inquiry 1304 to an electronic device only in response to receiving a multimedia request from an ESP. In this example, the electronic device 1310 displays a notification 1304A regarding the multimedia inquiry 1304 during the emergency call that the user can select to view the multimedia inquiry text message 1304B within the user's message viewer. The user can then select the link within the message viewer to confirm the multimedia inquiry 1304 and allow the EMS to access the electronic device 1310. In some embodiments, the multimedia inquiry 1304 is sent to an electronic device as a push notification or an audible message, as described above. However, the multimedia inquiry 1304 may take any suitable or necessary form. In some embodiments, the EMS is integrated into the electronic device, and the multimedia inquiry 1304 is presented to the user in response to the user making an emergency call from the electronic device.

Figure 14:
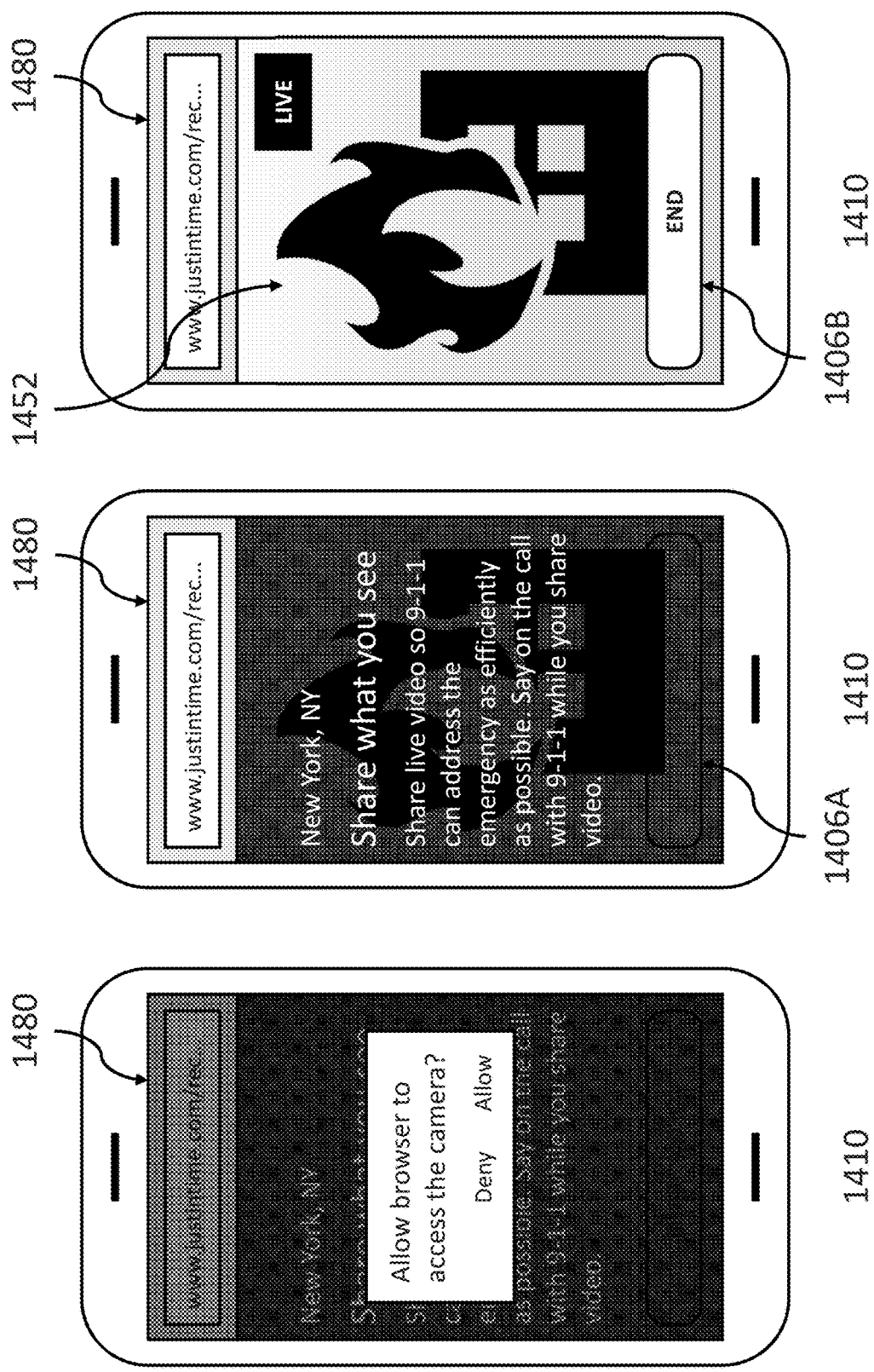
FIG. 14 illustrates an example of a mobile application for sharing emergency data and multimedia in accordance with one embodiment of the present disclosure.

FIG. 14 illustrates a web application provided by an emergency management system (EMS) for obtaining multimedia content from an electronic device. As illustrated in FIG. 14, in some embodiments, when the user selects the link within their message viewer, the electronic device opens an internet browser and navigates to the address of the weblink, where the EMS provides a web application 1480 for sharing multimedia content from the electronic device to an emergency service provider (ESP). In this example, the EMS is attempting to obtain video from a camera integrated into the electronic device 1410 and transmit the video to an ESP. In some embodiments, the web application 1480 prompts the user to provide access to the camera integrated into the electronic device, as illustrated by FIG. 14. In some embodiments, the web application 1480 includes a Share Video button 1406A that the user can select to begin recording video that will be sent to an ESP, as illustrated by FIG. 14. In this example, the electronic device records a video of a building fire 1452. In some embodiments, the web application 1480 includes an End button 1406B that the user can select to stop sharing video. In some embodiments, in which the EMS is integrated into the electronic device, when the user confirms the multimedia inquiry, a native application is executed on the electronic device that performs any and all of the functions of the web application accessed using the weblink.

Figure 15:
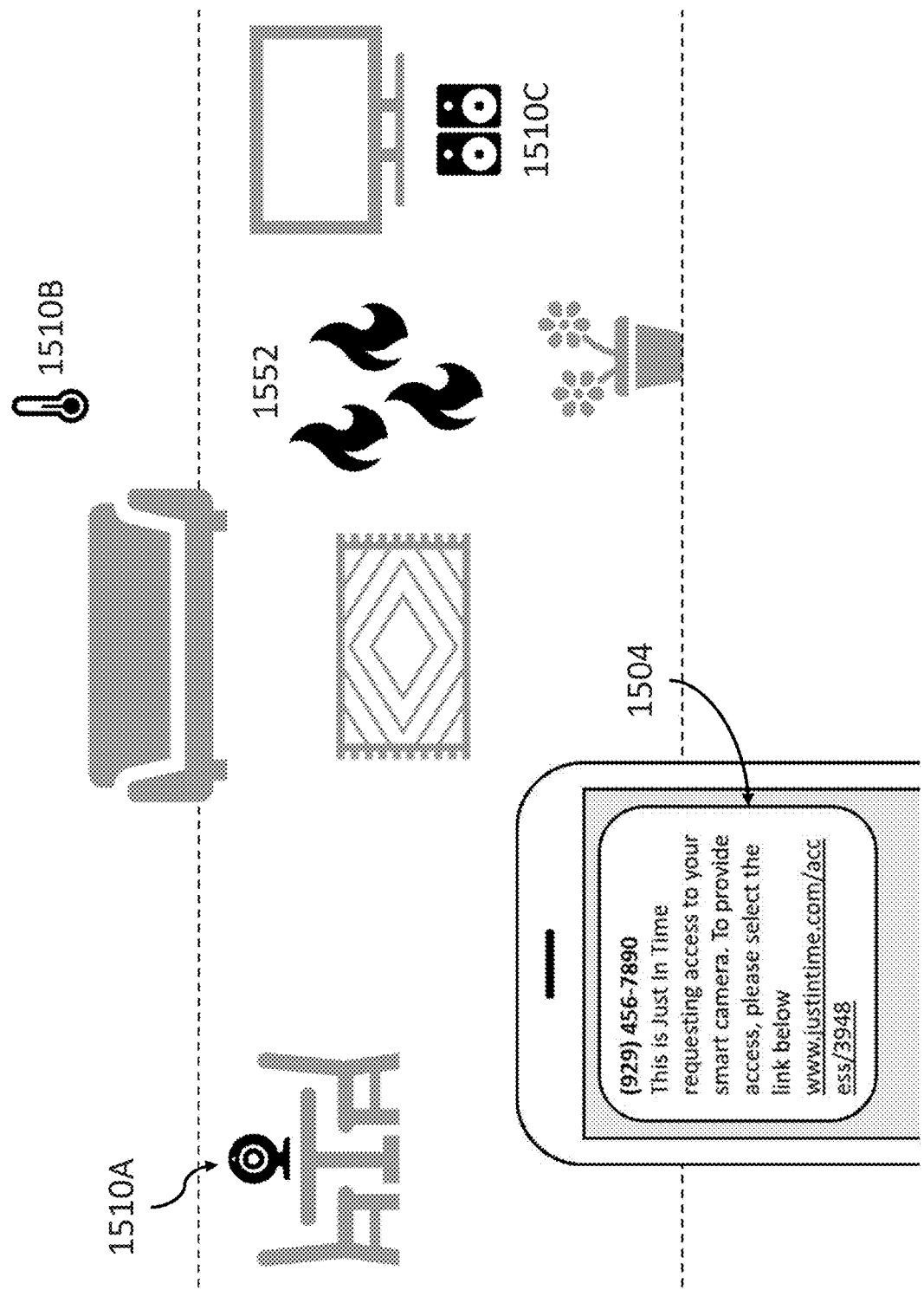
FIG. 15 illustrates an example of multimedia inquiry in accordance with one embodiment of the present disclosure.

In some embodiments, when the EMS attempts to access a first electronic device associated with an emergency alert, the EMS can deliver a multimedia inquiry to a second electronic device associated with the emergency alert or the first electronic device. For example, FIG. 15 illustrates a fire 1552 that has ignited in a living room of a home while all of the occupants were out of the home. In this example, an emergency alert was generated by the smart thermostat 1510B after the smart thermostat 1510B autonomously detected the fire 1552. In this example, the EMS then identifies both smart camera 1510A and smart speaker 1510C as relevant sensors (as described above). The EMS attempts to access the smart camera 1510A but the smart camera 1510A is assigned an access level that requires the EMS to request access to the smart camera 1510A (as described above). In this example, the EMS identifies cell phone 1510D as associated with the smart camera 1510A (e.g., both are registered to the same account), and delivers a multimedia inquiry 1504 to the cell phone 1510D to request access to the smart camera 1510A. In this example, the multimedia inquiry 1504 includes a link that the user of the cell phone 1510D can select to authorize the EMS to access the smart camera 1510A.

Figure 16A:
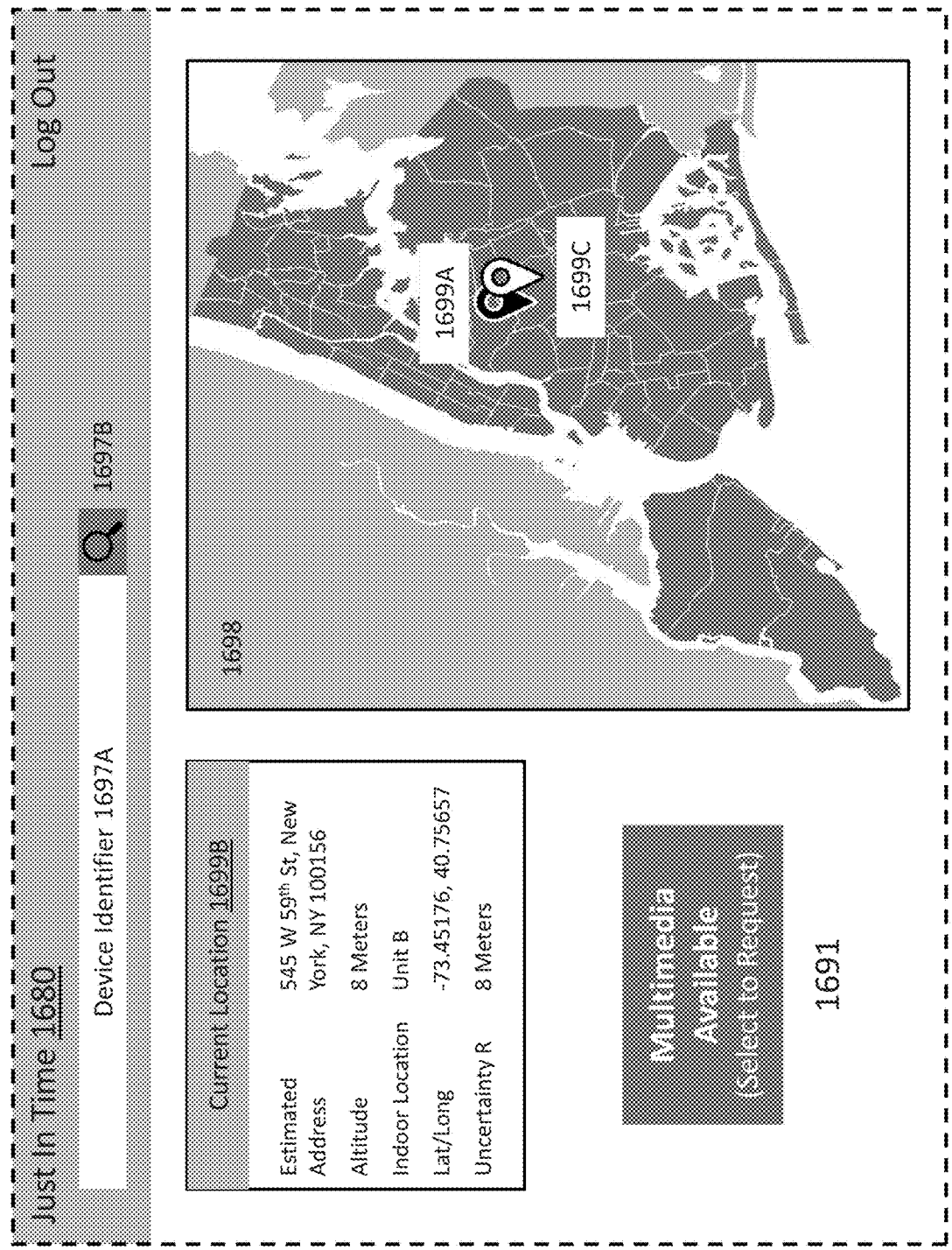
FIGS. 16A and 16B illustrate an example of an emergency response application in accordance with one embodiment of the present disclosure.
Figure 16B:
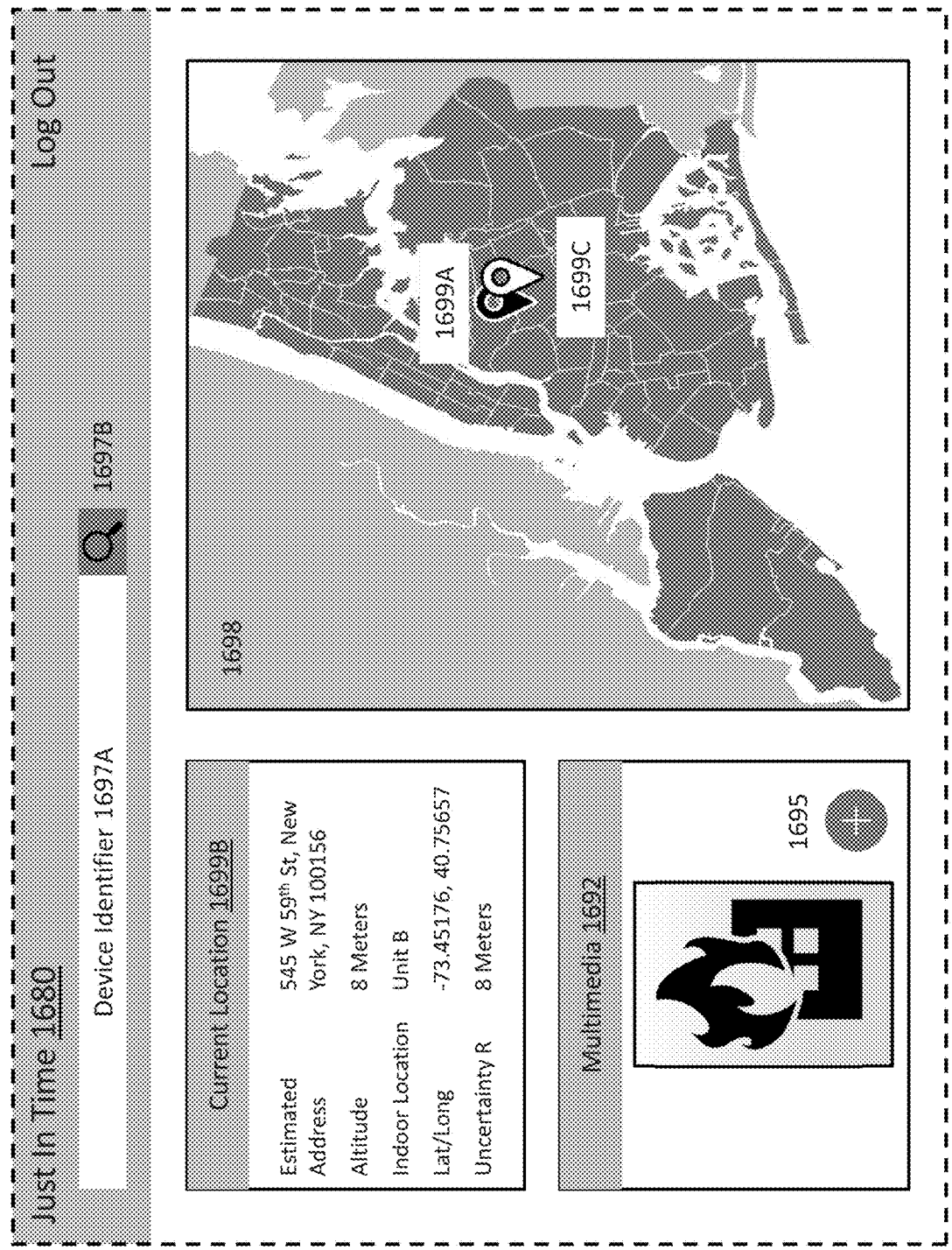

FIGS. 16A and 16B illustrate examples of a graphical user interface (GUI) of an emergency response application. In some embodiments, the emergency response application 1680 is provided by the emergency management system (EMS). In some embodiments, the emergency response application 1680 is a web application accessible through a standard internet browser using a URL. In some embodiments, the EMS provides an emergency response application 1680 to share and display emergency data and multimedia to emergency service providers (ESP; e.g., a public safety answering point (PSAP)). In some embodiments, when an ESP (e.g., a PSAP) receives an emergency alert (e.g., an emergency call), a member of the ESP (e.g., a PSAP call taker) can use the emergency response application 1680 to receive emergency data and multimedia associated with the emergency alert from the EMS. For example, in some embodiments, when a PSAP receives an emergency call, a call taker at the PSAP can enter the phone number into the emergency response application 1680 in the Device Identifier input box 1697A and select the search button 1697B to transmit an emergency data request including a device identifier associated with the emergency alert (e.g., the phone number of the phone that the emergency call was made from) to the EMS, as described above. In some embodiments, when the EMS receives an emergency data request including a device identifier from an ESP, the EMS returns any and all emergency data associated with the device identifier to the ESP, such as any available location associated with the device identifier, as described above. In the example illustrated in FIG. 16A, the EMS has returned a location associated with an electronic device associated with the emergency alert to an ESP. The location is displayed graphically within a map 1698 as an emergency location marker 1699A. In this example, the location is also displayed textually at Current Location 1699B. In some embodiments, when the EMS receives an emergency alert including a location associated with the emergency alert, the EMS determines an appropriate ESP to receive emergency data or multimedia associated with the emergency alert using a geofence system, as described above, and autonomously pushes emergency data or multimedia associated with the emergency alert to the ESP through the emergency response application 1680 without first receiving an emergency data request or multimedia request. In some embodiments, the ESP uses a geospatial query (e.g., the emergency location 1699A) to locate multimedia sources in the vicinity (e.g., the smart camera represented by multimedia location 1699C). In some embodiments, a multimedia device is in the vicinity of the emergency location when it is within a certain distance (e.g., threshold distance or vicinity) as described elsewhere in the specification herein. In some embodiments, a multimedia device is in the vicinity of the emergency location when it is within about 1, 5, 10, 20, 30, 40, 50, 60, 70, 80, 90, 100, 150, 200, 250, 300, 350, 400, 450, 500, 600, 700, 800, 900, or 1000 meters from the emergency location. In some embodiments, the user or owner of the triggering device (the device that has triggered the emergency) sets the distance parameter for searching for multimedia devices in the vicinity. In some embodiments, the user or owner of the triggering device identifies specific multimedia in the vicinity for obtaining contextual information (e.g., multimedia data) during an emergency.

In some embodiments, the emergency response application 1680 includes a multimedia access button 1691. In some embodiments, the multimedia access button 1691 is only displayed within the emergency response application 1680 after the EMS has delivered a multimedia inquiry to an electronic device associated with the emergency alert for which emergency data is being viewed or requested and the multimedia inquiry has been confirmed. In such an embodiment, a user of the emergency response application 1680 can select the multimedia access button 1691 to begin receiving multimedia from an electronic device associated with the emergency alert for which emergency data is being viewed or requested. In some embodiments, the EMS displays the multimedia access button 1691 before delivering a multimedia inquiry to an electronic device associated with an emergency alert, and a user of the emergency response application 1680 can select the multimedia access button 1691 to transmit a multimedia request including an identifier of an electronic device associated with the emergency alert (e.g., a phone number of a phone from which an emergency call was made). In such an embodiment, the EMS can then deliver a multimedia inquiry to the electronic device, obtain multimedia content from the electronic device, and transmit multimedia content from the electronic device to the requesting ESP. FIG. 16B illustrates an example of multimedia content being transmitted to an ESP through the emergency response application 1680. In some embodiments, the multimedia content is displayed in a multimedia section 1692 of the emergency response application 1680. In some embodiments, when the multimedia content includes a video, the video may be enlarged by selecting an enlarge button 1695. In the example illustrated by FIG. 16B, the multimedia content transmitted through the emergency response application 1680 is the video of the building fire recorded by the electronic device illustrated in FIG. 14. In some embodiments, video transmitted to an ESP is presented in a window separate from the emergency response application 1680. In some embodiments, video transmitted to an ESP is hosted on a separate server. In some embodiments, a link to the separate server is provided to the ESP through the emergency response application 1680. In some embodiments, when the device from which multimedia is available or requested is not the device that generated the emergency alert, the map 1698 displays a multimedia location marker 1699C representing the location of the device from which multimedia is available or requested. In some embodiments, the multimedia location marker 1699C is visually distinct from the emergency location marker 1699A. For example, the multimedia location marker 1699C may be displayed in a different color or size than the emergency location marker 1699A.

The present methods and systems disclose partially or fully integrated solutions emergency management systems, dispatch centers and electronic devices. Previous systems were not integrated and could not provide secured pathways, user privacy and software compatibilities. In some embodiments, partial integration with a dispatch center or first responder comprises adding the emergency management system as a "trusted link" on their systems or devices. In some embodiments, end-to-end software solutions are beneficial, e.g., for video feed from a sensor to be available to first responders.

Algorithms

In some embodiments, the systems, methods, and media described herein use one or more algorithms analyzing multimedia content. In some embodiments, machine learning algorithms are used for training prediction models and/or making predictions such as predicting an emergency or relevance to an emergency. Various algorithms can be used to generate models that are used to identify a first set of sensors pertinent to an emergency and/or a second set of sensors relevant to the emergency. In some instances, machine learning methods are applied to the generation of such models.

In some embodiments, a machine learning algorithm uses a supervised learning approach. In supervised learning, the algorithm generates a function from labeled training data. Each training example is a pair consisting of an input object and a desired output value. In some embodiments, an optimal scenario allows for the algorithm to correctly determine the class labels for unseen instances. In some embodiments, a supervised learning algorithm requires the user to determine one or more control parameters. These parameters are optionally adjusted by optimizing performance on a subset, called a validation set, of the training set. After parameter adjustment and learning, the performance of the resulting function is optionally measured on a test set that is separate from the training set. Regression methods are commonly used in supervised learning. Accordingly, supervised learning allows for a model or classifier to be generated or trained with training data in which the expected output is known in advance such as when the relevance is known (e.g., based on historical relevance scores).

In some embodiments, a machine learning algorithm uses an unsupervised learning approach. In unsupervised learning, the algorithm generates a function to describe hidden structures from unlabeled data (e.g., a classification or categorization is not included in the observations). Since the examples given to the learner are unlabeled, there is no evaluation of the accuracy of the structure that is output by the relevant algorithm. Approaches to unsupervised learning include: clustering, anomaly detection, and neural networks.

In some embodiments, a machine learning algorithm learns in batches based on the training dataset and other inputs for that batch. In other embodiments, the machine learning algorithm performs on-line learning where the weights and error calculations are constantly updated.

In some embodiments, a machine learning algorithm is applied to new or updated emergency data to be re-trained to generate a new prediction model. In some embodiments, a machine learning algorithm or model is re-trained periodically. In some embodiments, a machine learning algorithm or model is re-trained non-periodically. In some embodiments, a machine learning algorithm or model is re-trained at least once a day, a week, a month, or a year or more. In some embodiments, a machine learning algorithm or model is re-trained at least once every 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days or more.

In some instances, machine learning methods are applied to select, from a plurality of models generated, one or more particular models that are more applicable to certain attributes. In some embodiments, different models are generated depending on the distinct sets of attributes obtained for various communications.

In some embodiments, the classifier or trained algorithm of the present disclosure comprises one feature space. In some cases, the classifier comprises two or more feature spaces. In some embodiments, the two or more feature spaces are distinct from one another. In various embodiments, each feature space comprise types of attributes associated with a communication such as network carrier, make/model of the communication device, reported geographic location, or other information relevant to location accuracy. In some embodiments, the accuracy of the classification or prediction is improved by combining two or more feature spaces in a classifier instead of using a single feature space. The attributes generally make up the input features of the feature space and are labeled to indicate the classification of each communication for the given set of input features corresponding to that communication. In many cases, the classification is the location accuracy metric or a prediction of location accuracy.

In some embodiments, an algorithm utilizes a predictive model such as a neural network, a decision tree, a support vector machine, or other applicable model. Using the training data, an algorithm is able to form a classifier for generating a classification or prediction according to relevant features. The features selected for classification can be classified using a variety of viable methods. In some embodiments, the trained algorithm comprises a machine learning algorithm. In some embodiments, the machine learning algorithm is selected from at least one of a supervised, semi-supervised and unsupervised learning, such as, for example, a support vector machine (SVM), a Naïve Bayes classification, a random forest, an artificial neural network, a decision tree, a K-means, learning vector quantization (LVQ), regression algorithm (e.g., linear, logistic, multivariate), association rule learning, deep learning, dimensionality reduction and ensemble selection algorithms. In some embodiments, the machine learning algorithm is a support vector machine (SVM), a Naïve Bayes classification, a random forest, or an artificial neural network. Machine learning techniques include bagging procedures, boosting procedures, random forest algorithms, and combinations thereof.

In some embodiments, a machine learning algorithm such as a classifier is tested using data that was not used for training to evaluate its predictive ability. In some embodiments, the predictive ability of the classifier is evaluated using one or more metrics. These metrics include accuracy, specificity, sensitivity, positive predictive value, negative predictive value, which are determined for a classifier by testing it against a set of independent cases (e.g., communications). In some instances, an algorithm has an accuracy of at least about 75%, 80%, 85%, 90%, 95% or more, including increments therein, for at least about 50, 60, 70, 80, 90, 100, 110, 120, 130, 140, 150, 160, 170, 180, 190, or 200 independent cases, including increments therein. In some instances, an algorithm has a specificity of at least about 75%, 80%, 85%, 90%, 95% or more, including increments therein, for at least about 50, 60, 70, 80, 90, 100, 110, 120, 130, 140, 150, 160, 170, 180, 190, or 200 independent cases, including increments therein. In some instances, an algorithm has a sensitivity of at least about 75%, 80%, 85%, 90%, 95% or more, including increments therein, for at least about 50, 60, 70, 80, 90, 100, 110, 120, 130, 140, 150, 160, 170, 180, 190, or 200 independent cases, including increments therein. In some instances, an algorithm has a positive predictive value of at least about 75%, 80%, 85%, 90%, 95% or more, including increments therein, for at least about 50, 60, 70, 80, 90, 100, 110, 120, 130, 140, 150, 160, 170, 180, 190, or 200 independent cases, including increments therein. In some instances an algorithm has a negative predictive value of at least about 75%, 80%, 85%, 90%, 95% or more, including increments therein, for at least about 50, 60, 70, 80, 90, 100, 110, 120, 130, 140, 150, 160, 170, 180, 190, or 200 independent cases, including increments therein.

In some embodiments, the multimedia content undergoes natural language processing using one or more machine learning algorithms. In some embodiments, the one or more machine learning algorithms utilize word embedding(s) that map words or phrases to vectors of real numbers. In some embodiments, the mapping is generated by a neural network. In some embodiments, a machine learning algorithm is applied to parse the text obtained from multimedia content (e.g., extracted text from a video or audio recording). In some embodiments, a machine learning algorithm is applied to segment words into morphemes and identify the class of the morphemes. In some embodiments, a machine learning algorithm is applied to identify and/or tag the part of speech for the words in the multimedia content (e.g., tagging a word as a noun, verb, adjective, or adverb). In some embodiments, a machine learning algorithm is applied to classify multimedia content into a category such as relevance (e.g., relevant or irrelevant to an emergency). In some embodiments, the application applies at least one machine learning algorithm to multimedia content to determine an emergency type (e.g., injury or accident, medical problem, shooting, violent crime, robbery, tornado, or fire) and/or emergency level (e.g., safe, low, medium, high).

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X©, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm© WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the non-volatile memory comprises magnetoresistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer-Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash© Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PUP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash©, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB NET, or combinations thereof. Compilation is often performed, at least in part, to create an executable program. In some embodiments, a computer program includes one or more executable complied applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm© WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, a "device" or "electronic device" is a digital processing device designed with one or more functionalities such as, for example, a communication device or sensor device. A "triggering device" refers to an electronic device with a communication component, which will allow it to send and receive information over a wireless channel, a wired channel, or any combination thereof (e.g., sending/receiving information over the Internet). Examples of triggering devices include a mobile phone (e.g., a smartphone), a laptop, a desktop, a tablet, a radio (e.g., a two-way radio), and a vehicular communication system. In some embodiments, a triggering device includes a car security system (e.g., OnStar®), a home security system, or a home control system (e.g., a networked control system for providing network controlled and/or smart temperature control such as a Wi-Fi smart thermostat, lighting, entertainment, and/or door control, such as Nest®). In some embodiments, the triggering device is a physical panic button or software "panic" button. In some embodiments, a triggering device is an Internet of Things (IoT) device. In some embodiments, an electronic device is a sensor for sensing environmental or health indicators. In some embodiments, the sensor may include a sensing component and a communication component. In some embodiments, the triggering device is a sensor in a sensor network or a device that controls a sensor network.

In some embodiments, a triggering device is a wearable device (e.g., a communication device worn by a user, such as an Apple Watch). In some embodiments, a triggering device (e.g., a wearable device) comprises one or more sensors. The one or more sensors may include, but are not limited to: a gyroscope, an accelerometer, a thermometer, a heart rate sensor, a barometer, or a hematology analyzer. As used herein, a "mobile wireless device" refers to a device that is portable and communicates wirelessly. In some embodiments, a user wears or carries the mobile wireless device on the user's person or in the user's vehicle. Examples of mobile wireless devices include mobile or cellular phones, wearable devices (e.g., smart watch, fitness tracker, wearable sensor, smart glasses, etc.).

As used herein, a "pertinent sensor" refers to an electronic device including at least one sensing component (e.g., a sensor) and identified as having or potentially having information pertaining to an emergency based on attributes of the electronic device. An electronic device may be identified as a pertinent sensor based on attributes of the electronic device including, but not limited to: device type, location, manufacturer, associated user(s), sensor(s), battery level, and power status (e.g., powered on or powered off, active or inactive). A "set of pertinent sensors" refers to one or more electronic devices (e.g., sensors) identified as pertinent sensors having or potentially having information pertaining to the same emergency. In some embodiments, the electronic device is identified as a pertinent sensor with respect to an emergency based on an analysis and/or comparison of at least one attribute of the device with information for the emergency. In some embodiments, an electronic device is identified as a pertinent sensor based on a determination that the location of the device is in proximity to the location of the emergency. For example, a device is determined to be in proximity to the location of the emergency when their respective locations are within a threshold distance from each other. In some embodiments, the threshold distance is no more than about 10 meters, 20 meters, 30 meters, 40 meters, 50 meters, 60 meters, 70 meters, 80 meters, 90 meters, 100 meters, 150 meters, 200 meters, 250 meters, 300 meters, 350 meters, 400 meters, 450 meters, 500 meters, 600 meters, 700 meters, 800 meters, 900 meters, or no more than about 1000 meters.

As used herein, a "relevant sensor" refers to an electronic device having at least one sensing component (e.g., a sensor) determined to have useful (or relatively useful) information pertaining to an emergency based at least in part on information, data, or multimedia gathered by the sensing component(s) of the electronic device. An electronic device may be determined to be a relevant sensor based on information, data or multimedia including, but not limited to: audio, video, pictures, temperature data, health data, and environmental data. A "set of relevant sensors" refers to one or more electronic devices (e.g., sensors) determined to have useful (or relatively useful) information pertaining to the same emergency. In some embodiments, a set of relevant sensors is selected from a set of pertinent sensors (e.g., a subset of pertinent sensors).

As used herein, an "associated device" refers to a communication device that is associated with an electronic device. For example, a user may be using several communication devices such as a mobile phone, a wearable, a home security system, a car computer. The user may have registered these devices with his or her account(s) and linked these devices with a user name, user number(s), email address(es), home or other physical address(es). In some embodiments, associated devices may include communication devices of at least one additional user who is associated with user, e.g., a husband and wife, a father and son, a patient and doctor, friends, work colleagues, etc. In some cases, the user may have added the second user as an emergency contact, a primary contact, a secondary contact, or a member of a group (e.g., part of the same club, organization, or workplace). In some cases, user may have agreed to share location and other data with the second user. In some embodiments, the second user may be someone who is frequently contacted by the user and the communication device identifies the second user from the "Recently called" or "Frequently called" list. In some embodiments, the associated devices may be devices that are proximal or near-by to the triggering device such as obtained through a Wi-Fi scan. In some embodiments, an associated device is proximal to the triggering device when the location of the associated device is within 1, 5, 10, 15, 20, 25, 30, 35, 40, 45, 50, 60, 70, 80, 90, 100, 200, 300, 400, or 500 meters of the location of the triggering device.

As used herein, the "list of associated devices" refers to a list of communication devices that are associated with the user or the triggering device (e.g., a second resident in a smart home). The list of associated devices may be listed by user name, phone number, email address, physical address, coordinates etc. The device entry in the list may include phone number, email address, physical address, coordinates, BSSID, SSID or MAC address. The list may be user defined or generated by the device or the EMS. An entry in the list of associated devices may also be referred to as an account associated with the user.

As used herein, an "emergency alert" refers to a communication relating to an emergency or non-emergency situation. In some embodiments, an emergency alert is an emergency request for assistance (e.g., the request is associated with an emergency situation). In some embodiments, an emergency alert comprises an emergency indication. In further embodiments, an emergency indication is selected from one or more of the group consisting of traffic accident, police emergency, medical emergency, and fire emergency. In some embodiments, an emergency alert is associated with a non-emergency situation (e.g., request for a tow truck after car breaks down). In some embodiments, an emergency alert is associated with a device sending the alert. In other embodiments, an emergency alert is associated with a device not sending the alert (e.g., a proxy request on behalf of a second device and/or a member device in a group of devices). As used herein, an emergency alert is "associated" with a device or user when the emergency alert relates to an emergency or non-emergency situation involving the device or user. In some embodiments, an emergency alert comprises data associated with a device (or user thereof). In some embodiments, an emergency alert comprises data associated with an electronic device sending the alert or another device. For example, in some embodiments, an emergency alert comprises data associated with a device, wherein the data set comprises current and/or past location data. In another example, the data set comprises current and/or past health data associated with the user of an electronic device. In other embodiments, an emergency alert is sent and/or received separately from data associated with a device. For example, in some embodiments, an alert is sent first, and the recipient subsequently queries the device that sent the alert for data associated with the emergency and/or device or user involved in the emergency as part of an emergency flow script.

As used herein, a "first responder" refers to any person or persons responsible for addressing an emergency situation. A first responder may also be referred to as an "emergency responder." In some embodiments, a first responder refers to government personnel responsible for addressing an emergency situation. In some embodiments, a first responder is responsible for a particular jurisdiction (e.g., a municipality, a township, a county, etc.). In some embodiments, a first responder is assigned to an emergency by an emergency dispatch center (hereinafter, "EDC"). In some embodiments, a first responder responds to a request for emergency assistance placed by a user via a user communication device. In some embodiments, a first responder includes one or more firefighters, police officers, emergency medical personnel, community volunteers, private security, security personnel at a university, or other persons employed to protect and serve the public and/or certain subsets of the population.

As used herein, an "emergency service provider" (ESP) is a public or private organization or institution responsible for providing emergency services. For example, in some embodiments, an EDC (e.g., a PSAP, as described above), a fire department, a police department, and a hospital may all be considered emergency service providers. In some embodiments, an emergency responder is a member of an ESP.

As used herein, a "recipient" refers to one or more persons, services, or systems that receive a request for assistance (e.g., an emergency alert). The recipient varies depending on the type of request. In some embodiments, a recipient is an emergency service. In some embodiments, a recipient is an emergency service when the request for assistance pertains to an emergency (e.g., a tier 2 emergency). In some embodiments, a recipient is an emergency management system. In some embodiments, a recipient is an emergency dispatch center (e.g., a public safety answering point or PSAP). In some embodiments, a recipient is an emergency dispatch center, wherein the request is first routed through an emergency management system (e.g., request is sent to the EMS, but ultimately is sent to an EDC). In some embodiments, a recipient is a first responder (e.g., a communication device of a first responder). In some embodiments, a recipient is an associated device of a user or an account associated with the user. In some embodiments, a recipient is a non-emergency service or personnel, for example, a relative or friend. In such situations, a user of a communication device (or member device or second device) may not require emergency assistance, but does need help.

As used herein, a "user" refers to one or more person or persons associated with a system, server, or device (e.g., electronic device, member device, second device, device of a first responder, etc.). In some embodiments, a user is an administrator and/or authorized user who has authorization for generating or customizing an emergency flow script. In some embodiments, the administrator and/or authorized user works for or acts on behalf of an organization that utilizes the systems, servers, devices, methods, and media of the instant application for managing emergency communications. In some embodiments, the organization is a public or private organization. In some embodiments, the organization provides a transportation service (e.g., taxi company, ride-sharing company, shipping company, railroad company, etc.). In some embodiments, a user utilizes a device to send an emergency alert or request for assistance. In some embodiments, user refers to one or more persons who are paid subscribers of a network access service, for example, cellular service subscribers. In some embodiments, a user refers to anyone who gains access to a network via a router, for example, a Wi-Fi router, and is not a paid subscriber of any access service. In some embodiments, a device associated with a user is a device carried or worn on the person of the user (e.g., a phone or wearable device). In some embodiments, a device associated with a user is not carried or worn on the person of the user (e.g., a home security sensor or camera installed in the home of the user, a vehicle tracking system installed in a vehicle of the user, etc.).

As used herein, "data" refers to a collection of information about one or more entities (e.g., user of a user communication device) and/or an environment that pertains to characteristics of the one or more entities. In some embodiments, an entity is a person such as a user. In some embodiments, an entity is a thing (e.g., a house). For example, in some embodiments, data comprises sensor data from home sensors associated with a house. In this example, the data is also associated with one or more persons (e.g., the homeowner(s) and/or inhabitant(s)). In some embodiments, data refers to meta-data. In some embodiments, data comprises health information about the user of a communication device. In some embodiments, data comprises information about the surrounding environment of the user of the user communication device (e.g., surrounding temperature, location, elevation, barometric pressure, ambient noise level, ambient light level, surrounding geography, etc.). In some embodiments, data comprises information about other users that is pre-stored in a device or in a database (e.g., a database within a group of devices who are related to the user of the user communication device as predefined by the user). In some embodiments, the data set comprises information from two or more users of user communication devices, wherein each user is affected by an emergency situation. As an example, two unrelated users are involved in a vehicular collision, and each user sends a separate emergency alert (for traffic accident) using his/her communication device. In this example, the separate emergency alerts are associated (e.g., by an emergency management system and/or emergency dispatch center) with the same emergency based on the proximity of time, location, and emergency indication of the emergency requests. As a result, the data set for this accident comprises information from both user communication devices. In this example, the data set comprises location data from both devices (e.g., GPS coordinates), biosensor data for one or both devices (e.g., biosensor data such as heart rate and blood pressure can be important in case of injury), and information about the vehicle driven by each user (e.g., make, model, and year of manufacture information stored on the device). In some embodiments, data comprises current data. In further embodiments, current data comprises information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old, including increments therein. In further embodiments, current data comprises information that equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, data comprises historical data. In further embodiments, historical data comprises information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old, including increments therein. In further embodiments, historical data comprises information that equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, the age of information is calculated from the date the information is first collected (e.g., when a sensor first detects a sensed parameter such as, for example, heart rate).

As used herein, "health data" refers to medical information associated with a user of a device. In some embodiments, health data comprises medical history such as, for example, past illnesses, surgery, food and/or drug allergies, diseases, disorders, medical diagnostic information (e.g., genetic profile screen), or any combination thereof. In some embodiments, health data comprises family medical history (e.g., family history of breast cancer). In some embodiments, health data comprises current health information such as, for example, current symptoms, current medications, and/or current illnesses or diseases. In some embodiments, health data comprises user age, height, weight, blood type, and/or other biometrics. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old. In some embodiments, current health information comprises information that is equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, current health information comprises medical information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old.

As used herein, "user data" refers to general information associated with a user of a device. In some embodiments, user data comprises user identity, user name, height, weight, eye color, hair color, ethnicity, national origin, religion, language(s) spoken, vision (e.g., whether user needs corrective lenses), home address, work address, occupation, family information, user contact information, emergency contact information, social security number, alien registration number, driver's license number, vehicle VIN, organ donor (e.g., whether user is an organ donor), or any combination thereof. In some embodiments, user data is obtained via user input.

As used herein, "sensor data" refers to information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof, and in some embodiments, sensor data comprises information obtained from any of the preceding sensors. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component).

As used herein, "communication link" refers to a communication pathway from a device (e.g., communication device) to another device or to an intermediate device (e.g., a router) such as over a network. In some embodiments, the communication device establishes a communication link with another device or an intermediate device to transfer information (e.g., a location of the device) or to obtain information from a recipient such as, for example, location of a first responder assigned to a request for assistance associated with the communication device (e.g., device of first responder). In some embodiments, a communication link refers to the point-to-point communication channels, point-to-point and end-to-end data sessions, and/or the physical hardware facilitating the communication channel(s) (e.g., antennas used to communicate/transmit information). In some embodiments, a data session comprises session parameters and the network route taken from one device to another device.

As used herein, a "data channel" refers to a communication session between two devices wherein data packets are exchanged between the devices. In some embodiments, a data session is setup using exchange of certain data packets, also called as "handshake signals," which are able to define the capabilities of the data session. For example, in some embodiments, the data session "handshake" provides for the ability to transfer multi-media data, voice data, and other data via the data session. In some embodiments, the data session is setup without the use of handshake signals, wherein the two devices involved share data packets according to a predefined protocol (e.g., a previously agreed upon protocol). In some embodiments, the data session is routed through an EMS, which stores the multi-media, voice, and/or other data from any of the devices that are part of the data session. In further embodiments, the EMS shares the data from the data session with the other device (e.g., device of a first responder). In some embodiments, the EMS manages the data session.

Modern communication devices, for example, smart phones, tablet computers, wearable communication devices, smart sensor devices and/or systems are often equipped with a variety of features for determining location information of the communication device using, for example, GPS, or triangulation with cellular phone towers. Modern communication devices also often include functionality to store data regarding a user of the communication device, for example, health information about the user.

In some embodiments, the communication device (or communication module of the device) communicates with a recipient through one or more data channels. In some embodiments, the recipient is an emergency management system. In some embodiments, the EMS routes communications to an EDC. In further embodiments, the EMS establishes a first data channel with the communication device and a second data channel between the EMS and the EDC, wherein the EMS bridges the first and second data channels to enable the communication device and the EDC to communicate. In some embodiments, the EMS converts data (e.g., data set) from the communication device into a format suitable for the EDC (e.g., analog or digital, audio, SMS, data, etc.) before sending or routing the formatted data to the EDC. In some embodiments, the EMS routes communications to a device associated with a first responder. In some embodiments, the communication device relays additional communications, information, and/or data sent or shared between member devices in the group of devices to the EMS or EDC after a request for assistance has been sent. In further embodiments, the additional information is relayed to the EMS or EDC after the request for assistance has been sent in order to provide current information that is relevant to the request. For example, in some instances, communications between member devices contain information relevant to the emergency (e.g., information that the user of member device who is experiencing a medical emergency suffers from diabetes). Accordingly, in some embodiments, the information is sent autonomously, at request of a user of the communication device, or at request of the recipient (e.g., EMS, EDC, first responder, etc.).

The following illustrative examples are representative of embodiments of the invention described herein and are not meant to be limiting in any way.

Examples

Just In Time, an emergency response company, aids emergency service providers (such as public safety answering points, or "PSAPs") by gathering emergency data from a variety of sources and delivering the data directly to the emergency service providers. Traditionally, PSAPs are only technologically capable of receiving telephone calls (e.g., 9-1-1 emergency calls) with no additional data. Thus, when an emergency call is made to a PSAP from a mobile phone (with a dynamic and uncertain location), PSAP operators or call-takers must speak directly to the caller to determine the caller's location and the nature of the caller's emergency. Unfortunately, many people involved in emergency situations are unable to articulate their location or may not even know—and even if they do, the time spent articulating their location to the PSAP operator can often be the difference between life and death. Similarly, PSAP operators are forced to respond to emergencies with little or no information about the persons involved (e.g., health data or medical histories) or context of the emergencies (e.g., type of emergency, audio/video of the surroundings, etc.). Just In Time knows just how critical it is to quickly and accurately provide locations and situational/contextual information during emergencies to emergency service providers.

To aid emergency service providers (hereinafter, "ESPs"), Just In Time maintains and provides an emergency management system (hereinafter, "EMS") that receives and stores data, information, and multimedia from a plurality of sources, such as mobile phones and mobile applications, internet of things (IoT) devices, intelligent vehicle systems, and other electronic devices. During an emergency the EMS can gather data, information, and multimedia from multiple sources in real-time and intelligently determine which of the sources (and, by extension, which of the data, information, and multimedia) are the most relevant to the emergency. The EMS can then provide ESPs with the most relevant emergency data without bogging down response times, as ESPs are often under tremendous pressure, and the decisions they make must be quick. Therefore, great care must be taken to avoid overwhelming an ESP with the wrong information or too much information.

Henry, a middle-aged man, and his wife Michelle live together in a house in Boston. Henry has bought and outfitted their house with two Nest Cam devices (smart cameras), one in the kitchen and one in the living room, and an Amazon Echo (smart speaker) located in the living room. Michelle owns an Apple Watch (smart watch) that she wears every day. One day, Henry collapses in the living room while on his way to the kitchen for a glass of water. From the bedroom, Michelle hears Henry fall and runs over to check on him. Distraught, Michelle yells "Alexa, call 9-1-1!" The Amazon Echo recognizes Michelle's voice command, and, in response to receiving the voice command, generates an emergency alert and initiates a 9-1-1 call to a public safety answering point (PSAP). The emergency alert, which includes the location of the Amazon Echo and the email address Henry used to set up the Amazon Echo, is instantly received by Just In Time's EMS. When the PSAP receives the 9-1-1 call, the PSAP sends an identifier of the 9-1-1 call (e.g., the inbound phone number) to the EMS, which the EMS uses to associate the PSAP with the emergency alert.

In response to receiving the emergency alert, the EMS attempts to detect and identify all sensor devices pertinent to Henry's fall. First, the EMS queries Nest's network system with Henry's email address (received in the emergency alert) for devices associated with Henry's email address. Nest's network system returns identifiers and information regarding both the Nest Cam in Henry and Michelle's kitchen and the Nest Cam in their living room. The EMS recognizes the locations of the Nest Cams to be in the vicinity of the location of the Amazon Echo. Additionally, the EMS prompts the Amazon Echo to broadcast a distress signal to all sensor devices in the vicinity. Michelle's Apple Watch receives the distress signal from the Amazon Echo and returns information regarding the Apple Watch and a signal to the Amazon Echo indicating that the Apple Watch is active and available, which are then relayed to the EMS by the Amazon Echo. The EMS thus identifies the four sensor devices—the Amazon Echo, both Nest Cams, and Michelle's Apple Watch—as a first set of sensors pertinent to the emergency (e.g., Henry's fall).

Then, after identifying the Amazon Echo, Nest Cams, and Apple Watch as sensors pertinent to the emergency, the EMS connects to each of the four devices using the information received regarding the devices. In this case, the EMS establishes a direct communication link with the Amazon Echo and the Apple Watch and establishes an indirect communication link with the two Nest Cams, wherein the EMS can query the Nest network to receive data from the Nest Cams. The EMS then receives multimedia contents including an audio stream from the Amazon Echo, a second audio stream from the Apple Watch, a video stream from the Nest Cam in the kitchen, and a second video stream from the Nest Cam in the living room. As the 9-1-1 call initiated by the Amazon Echo commences, the EMS analyzes the multimedia received from each of the sensor devices in real time to determine which of the sensors is the most relevant to the emergency.

A PSAP call-taker answers Michelle's 9-1-1 call through a computer aided dispatch (CAD) system at the PSAP and asks (through the Amazon Echo speakers) for the nature of the emergency. Michelle responds by saying aloud that her husband has fallen and can't get up. Concurrently, Henry begins moaning "my back, my back, I can't move my back." The Amazon Echo receives Michelle's response to the PSAP call-taker, but Henry's moans are too faint to be picked up by the Amazon Echo's microphones. However, Michelle's Apple Watch, positioned close to both Michelle and Henry, is able to pick up Henry's moans as well as Michelle's responses to the PSAP call-taker. Using voice and speech recognition software to analyze the audio streams received from the Amazon Echo and the Apple Watch, the EMS recognizes two different voices (Michelle's and Henry's) in the audio stream received from the Apple Watch, and only one voice in the audio stream received from the Amazon Echo. The EMS also identifies more key words and key terms in the audio stream received from the Apple Watch than in the audio stream received from the Amazon Echo. The EMS thus concludes that the audio stream received from the Apple Watch is more relevant to the emergency than the audio stream received from the Amazon Echo. Concurrently, the EMS uses video analysis software to analyze the video stream received from the kitchen Nest Cam and the living room Nest Cam. The EMS identifies two humans in the video stream received from the living room Nest Cam and none in the video stream received the kitchen Nest Cam. The EMS thus concludes that the video stream received from the living room Nest Cam is more relevant to the emergency than the video stream received from the kitchen Nest Cam.

Furthermore, through the analysis of the audio streams (e.g., natural language processing of an audio transcription), the EMS determines that the nature of the emergency is likely a medical emergency. The EMS then applies a prioritization rule wherein audio streams are prioritized over video streams during a medical emergency, and ultimately concludes that the Apple Watch is the sensor most relevant to the emergency. In response to identifying that there are sensors pertinent to the emergency, the EMS sends an indicator of available multimedia to the PSAP. The PSAP call-taker then sends a request for multimedia to the EMS, and the EMS transmits the audio stream received from the Apple Watch to the PSAP, which the PSAP call-taker uses to determine that Henry has suffered a back injury. The PSAP call-taker uses the CAD system to dispatch an ambulance to Henry and Michelle's location and, because of the multimedia received from the EMS, is able to tell the first responders in the ambulance that they will be dealing with a back injury. The PSAP call-taker additionally opts to transmit the audio stream received from the Apple Watch to the first responders in the ambulance, so that the first responders may have additional situational awareness regarding the emergency as they navigate to Henry and Michelle's home.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for providing multimedia to an emergency service provider (ESP) by an emergency management system (EMS), the system comprising:
　a network server comprising one or more processors and communicatively coupled to one or more emergency service providers (ESPs); and
　an emergency management system (EMS) executed on the network server and operable to:
　　receive a location of an electronic device in response to an emergency phone call executed by the electronic device;

identify, from the one or more ESPs communicatively coupled to the network server, an ESP having jurisdictional authority for the location of the electronic device;

provide an instance of an emergency response application to the ESP via a web browser executed at the ESP, wherein the instance of the emergency response application includes a graphical user interface (GUI) for display on a computing device of the ESP;

provide a map view in the GUI, the map view comprising a first location indicator corresponding to the location of the electronic device;

detect one or more sensor devices in a vicinity of the location of the electronic device, the one or more sensor devices being separate from the electronic device;

display one or more second location indicators for the one or more sensor devices in the map view; and display multimedia content from a selected one of the one or more sensor devices with the GUI at the ESP.

2. The system of claim 1, wherein the one or more sensor devices include one or more cameras, wherein the multimedia content includes a video feed.

3. The system of claim 1, wherein the EMS is further operable to:
detect a selection of one of the one or more second location indicators corresponding to the selected one of the one or more sensor devices, wherein the selection is by an operator of the GUI at the ESP;
request access to the multimedia content from the selected one of the one or more sensor devices;
receive the multimedia content from the selected one of the one or more sensor devices; and
provide the multimedia content to the computing device of the ESP for display in the GUI.

4. The system of claim 3, wherein the EMS is further operable to:
host the multimedia content with the network server; and
establish a communication link between the GUI and the network server to provide the multimedia content for the selected one of the one or more sensor devices to the ESP.

5. The system of claim 1, wherein the EMS is further operable to:
search a geofence boundary database for the one or more ESPs to identify the ESP to receive the multimedia content based on the location of the electronic device and based on a geofence for the ESP.

6. The system of claim 1, wherein the EMS is further operable to:
display a multimedia access button within the GUI;
receive selection of the multimedia access button; and
deliver a multimedia request to the selected one of the one or more sensor devices, in response to receiving the selection of the multimedia access button.

7. The system of claim 1, wherein at least some of the one or more sensor devices are access restricted, wherein the EMS is further operable to:
query an account database to identify an account associated with the at least some of the one or more sensor devices;
transmit an access request message to a mobile device associated with the account;
responsive to receiving access permission from the mobile device, access the multimedia content from the at least some of the one or more sensor devices.

8. The system of claim 7, wherein the access request message includes a hyperlink, wherein selection of the hyperlink on the mobile device provides the access permission to the EMS.

9. The system of claim 1, wherein at least some of the one or more sensor devices are access restricted based on a nature of the emergency phone call, wherein the EMS is further operable to:
identify the nature of the emergency phone call; and
access the at least some of the one or more sensor devices based on the nature of the emergency phone call.

10. The system of claim 1, wherein detecting the one or more sensor devices in the vicinity includes:
query one or more third-party networks associated with at least some of the one or more sensor devices;
in response to querying the one or more third-party networks, receive a list of sensor devices in the vicinity of the location of the electronic device.

11. The system of claim 1, wherein at least some of the one or more sensor devices are in an inactive state when detected by the EMS, wherein the EMS is further operable to:
send a wake-up signal to the at least some of the one or more sensor devices that are in the inactive state to prompt the at least some of the one or more sensor devices to enter an active state; and
receive the multimedia content from the at least some of the one or more sensor devices that are in the active state.

12. The system of claim 11, wherein the wake-up signal is sent to a third-party server that hosts the at least some of the one or more sensor devices.

13. The system of claim 1, wherein the vicinity includes a predetermined radius from the location of the electronic device.

14. The system of claim 13, wherein the predetermined radius is based on a nature of the emergency phone call, wherein the nature of the emergency phone call includes: fire, flood, burglary, active assailant, car accident, or medical.

15. A method for providing multimedia to an emergency service provider (ESP) by an emergency management system (EMS), the method comprising:
receiving a location of an electronic device in response to an emergency communication from the electronic device;
identifying an ESP having jurisdictional authority for a region that includes the location of the electronic device;
providing an instance of an emergency response application to the ESP via a web browser executed at the ESP, wherein the instance of the emergency response application includes a graphical user interface (GUI) for display on a computing device of the ESP;
providing a map view in the GUI, the map view comprising a first location indicator corresponding to the location of the electronic device;
detecting one or more sensor devices within a predetermined radius of the location of the electronic device, the one or more sensor devices being separate from the electronic device;
displaying one or more second location indicators for the one or more sensor devices in the map view; and
displaying multimedia content from a selected one of the one or more sensor devices with the GUI at the ESP.

16. The method of claim 15, wherein the one or more sensor devices include a plurality of cameras, wherein at least some of the plurality of cameras are in an active state.

17. The method of claim 15, wherein the emergency communication is an emergency alert that is transmitted to the EMS.

18. The method of claim 17, wherein the emergency alert includes a device type for the electronic device and an emergency type associated with the emergency communication.

19. The method of claim 15, further comprising:
displaying the device type and the emergency type in the GUI.

20. The method of claim 19, wherein displaying the device type and the emergency type includes displaying a first icon for the device type on the map view or displaying a second icon for the emergency type on the map view.

21. The method of claim 15, wherein detecting the one or more sensor devices in the vicinity includes:

querying one or more third-party networks associated with at least some of the one or more sensor devices;

in response to querying the one or more third-party networks, receiving a list of sensor devices in the vicinity of the location of the electronic device.

22. The method of claim 15, wherein the emergency communication includes a 911 phone call executed by the electronic device.

23. The method of claim 22, wherein the location of the emergency device is based on a device-based hybrid location transmitted by the electronic device.

24. The method of claim 15, wherein the location of the device is based on a WiFi router location, a GPS-based location, or an address associated with an account for a third-party service that is configured to host the electronic device.

* * * * *